US011891099B1

(12) United States Patent
Byrne et al.

(10) Patent No.: US 11,891,099 B1
(45) Date of Patent: Feb. 6, 2024

(54) FAN CART

(71) Applicant: HKC-US, LLC, Memphis, TN (US)

(72) Inventors: Brendan Byrne, Germantown, TN (US); Jeff Newman, Cornelius, NC (US); Kent Mathis, Oakland, TN (US); Matt Willard, Olive Branch, MS (US); Michael Starkey, Kent, OH (US)

(73) Assignee: HKC-US, LLC, Memphis, TN (US)

( * ) Notice: Subject to any disclaimer, the term of this patent is extended or adjusted under 35 U.S.C. 154(b) by 0 days.

(21) Appl. No.: 17/748,514

(22) Filed: May 19, 2022

Related U.S. Application Data

(60) Provisional application No. 63/241,340, filed on Sep. 7, 2021.

(51) Int. Cl.
| | |
|---|---|
| *B62B 1/14* | (2006.01) |
| *F04D 29/64* | (2006.01) |
| *B60R 16/04* | (2006.01) |
| *B60R 9/00* | (2006.01) |
| *F21V 33/00* | (2006.01) |
| *B62B 1/12* | (2006.01) |
| *F21V 21/14* | (2006.01) |
| *F21V 21/30* | (2006.01) |

(52) U.S. Cl.
CPC ............... *B62B 1/145* (2013.01); *B60R 9/00* (2013.01); *B60R 16/04* (2013.01); *B62B 1/12* (2013.01); *F04D 29/646* (2013.01); *F21V 21/145* (2013.01); *F21V 21/30* (2013.01); *F21V 33/00* (2013.01)

(58) Field of Classification Search
CPC ....................................................... B62B 1/14

USPC ........................................... D23/378; 416/63
See application file for complete search history.

(56) References Cited

U.S. PATENT DOCUMENTS

| | | | |
|---|---|---|---|
| 2,521,920 A | 9/1950 | Koch | |
| 2,628,020 A * | 2/1953 | Koch | ..................... F04D 29/646 D23/378 |
| 2,830,779 A | 4/1958 | Wentling | |
| 2,868,558 A | 1/1959 | Krauss | |
| 2,884,075 A * | 4/1959 | Poon | ..................... A62C 25/005 169/48 |
| D187,026 S * | 1/1960 | Lambert | ..................... 280/47.24 |

(Continued)

OTHER PUBLICATIONS

NPL Magline; "Magline 302680 Accessory Bag, 13" Length × 8" Width"; published Mar. 9, 2016 (Year: 2016).*

(Continued)

*Primary Examiner* — Topaz L. Elliott
*Assistant Examiner* — Wesley Le Fisher
(74) *Attorney, Agent, or Firm* — Brian S. Steinberger; Hilary F. Steinberger; Law Offices of Brian S. Steinberger, P.A.

(57) ABSTRACT

Devices, apparatus, systems and methods for providing a usable hand truck with a tiltable electrical fan, power strip for powering electrical equipment, a storage compartment/tray for supplies and a moveable electrical LED (light emitting diodes) light source. The moveable light can rotate up and down, and be able to pivot to a left direction and to a right direction. The power strip can include a rechargeable battery supply with USB ports and outlets to allow the fan and light source to be connected. The power strip can include a power cord to plug in the power strip to an electrical outlet.

12 Claims, 46 Drawing Sheets

(56) References Cited

U.S. PATENT DOCUMENTS

| | | | | |
|---|---|---|---|---|
| 3,788,659 | A * | 1/1974 | Allen | B62B 1/12 |
| | | | | 280/654 |
| 4,235,449 | A * | 11/1980 | Tarran | B62B 1/12 |
| | | | | 280/30 |
| 4,974,862 | A * | 12/1990 | Maupin | B62B 1/12 |
| | | | | 280/47.27 |
| D340,339 | S | 10/1993 | Kean et al. | |
| D340,355 | S | 10/1993 | Little | |
| 5,265,895 | A | 11/1993 | Barrett | |
| 5,860,728 | A * | 1/1999 | Maglica | F16M 11/2078 |
| | | | | 362/396 |
| 5,941,314 | A * | 8/1999 | Weinmeister | A62C 8/00 |
| | | | | 169/48 |
| 6,789,787 | B2 * | 9/2004 | Stutts | F24F 5/0035 |
| | | | | 261/28 |
| 7,488,203 | B2 * | 2/2009 | Leddusire | H01R 13/60 |
| | | | | 439/535 |
| 7,530,579 | B2 | 5/2009 | Butler | |
| 9,605,854 | B2 * | 3/2017 | Zimmerman | A47K 10/00 |
| 10,531,716 | B2 * | 1/2020 | Sluder | A45C 13/28 |
| 2014/0238799 | A1 * | 8/2014 | Sharma | B62B 1/125 |
| | | | | 108/18 |
| 2015/0027836 | A1 * | 1/2015 | Zhou | A45C 5/14 |
| | | | | 190/12 A |

OTHER PUBLICATIONS

Mole-Richardson Type 1971 Wind Machine (Year: 2013).*
NPL CCCEI Heavy Duty Power Strip Surge Protector, first available Dec. 16, 2019; Amazon (Year: 2019).*
NPL Nilight—70003C-A 22in 120w LED Light Bar, first available Jul. 23, 2015; Amazon (Year: 2015).*

* cited by examiner

FIG. 13A
FIG. 13B
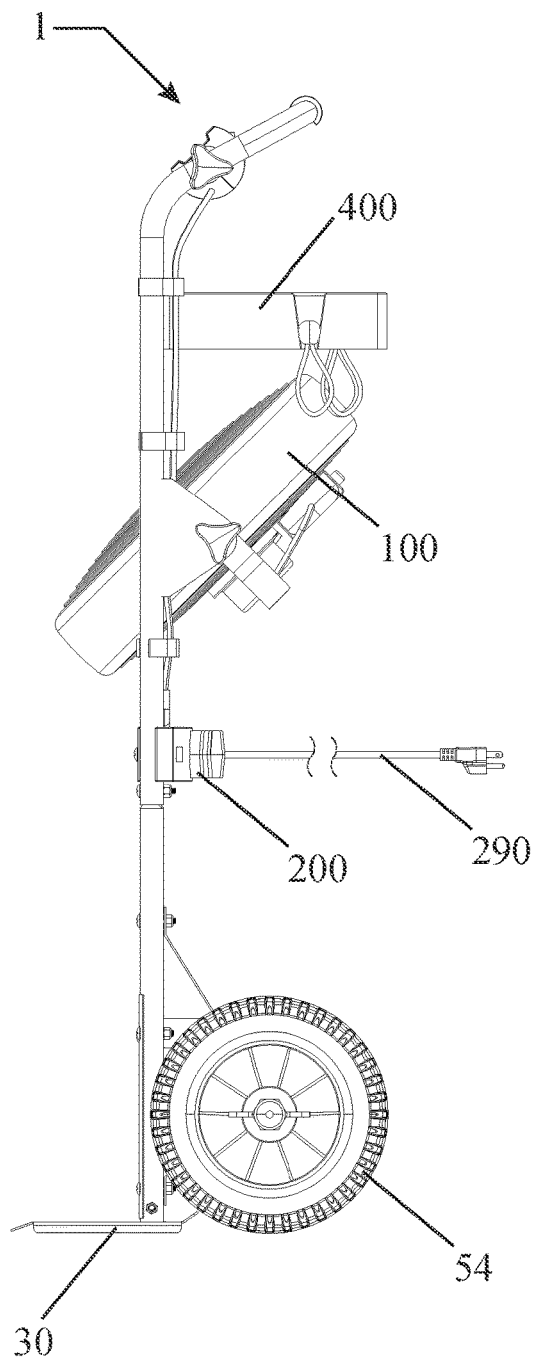
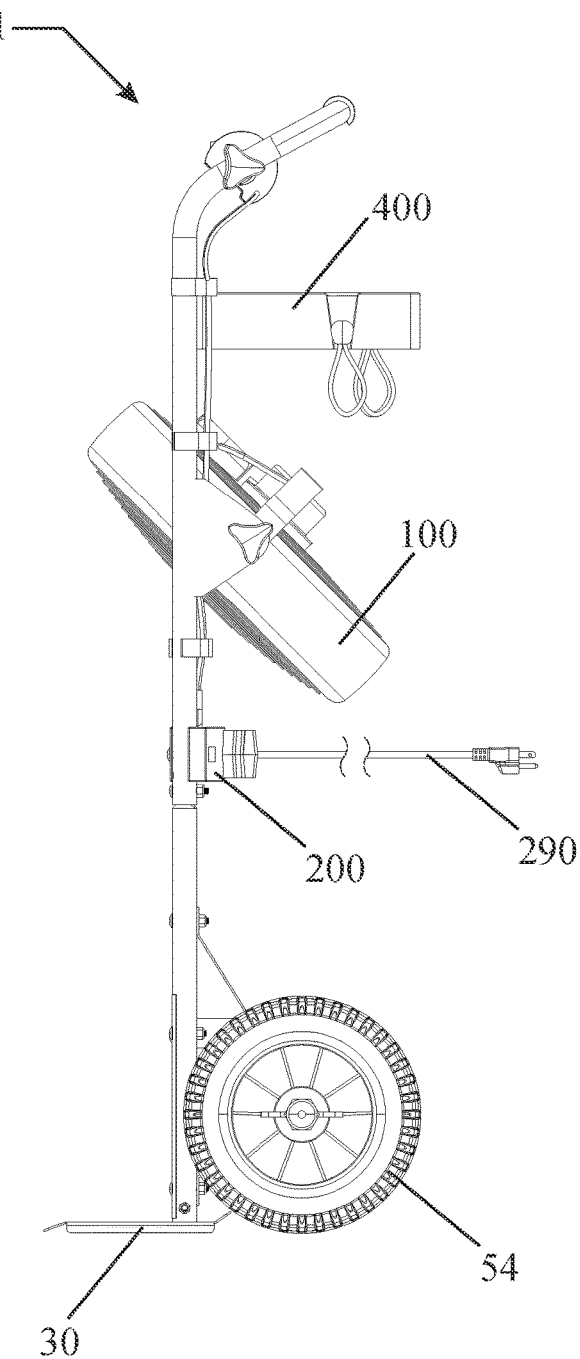

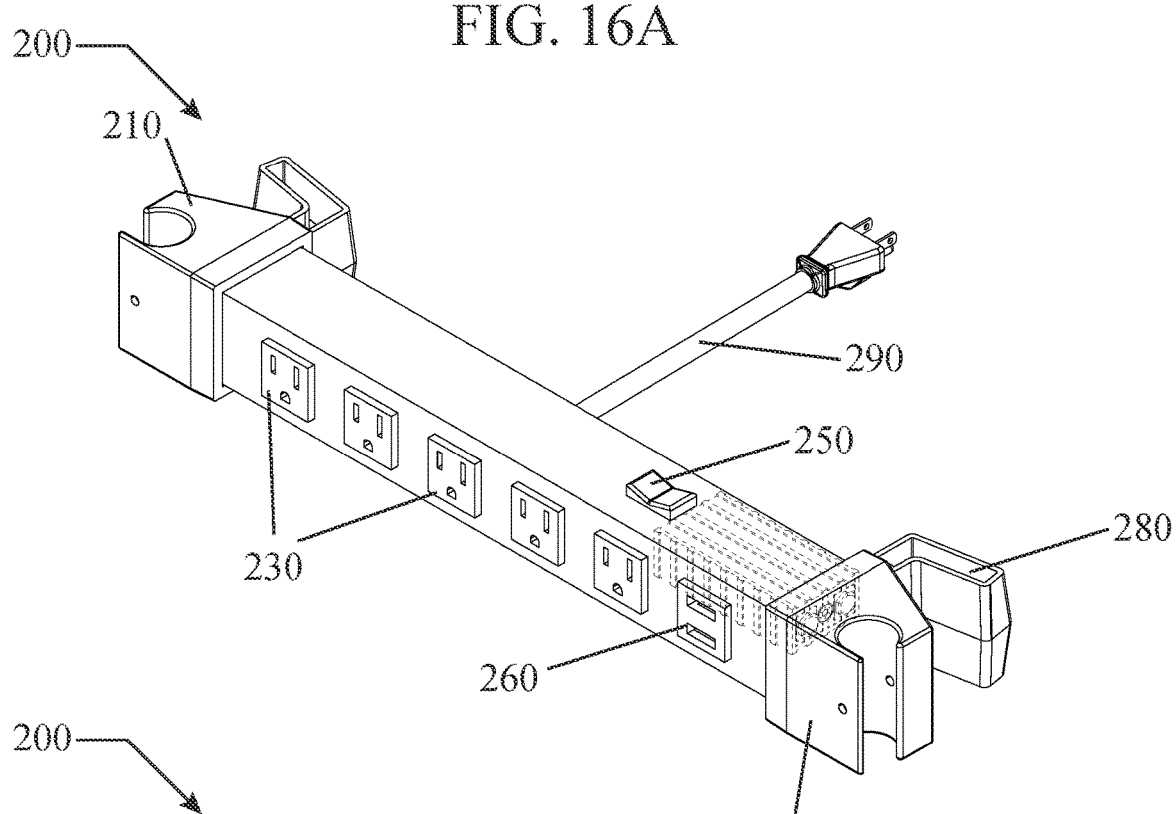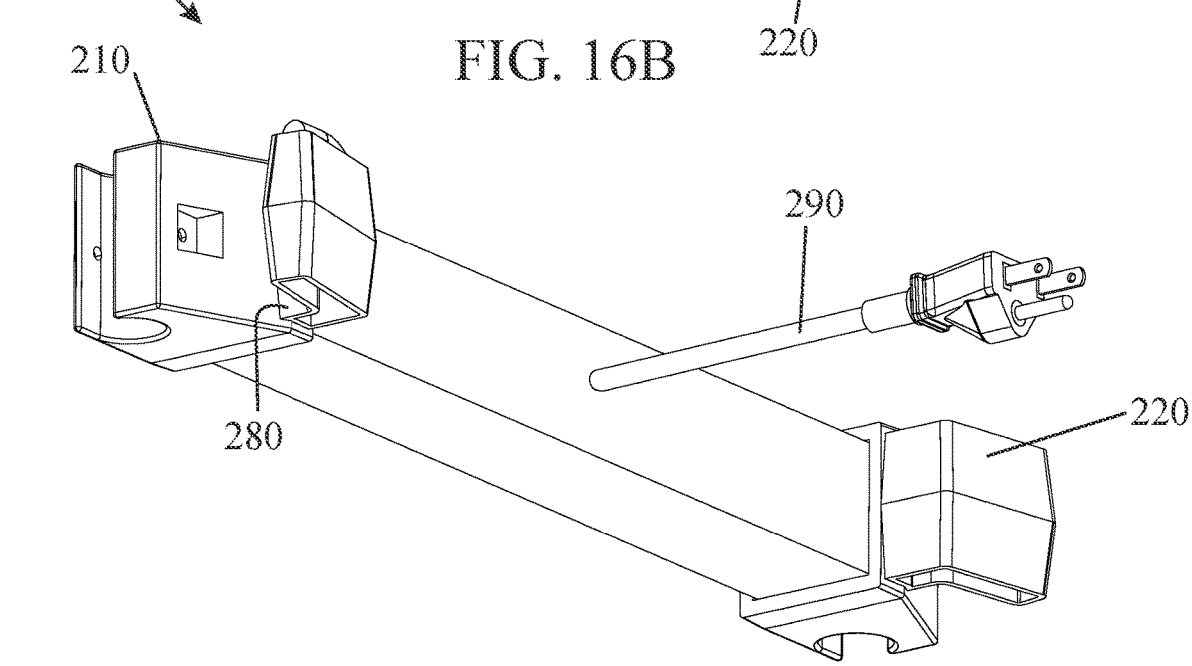

FIG. 33D
FIG. 33E
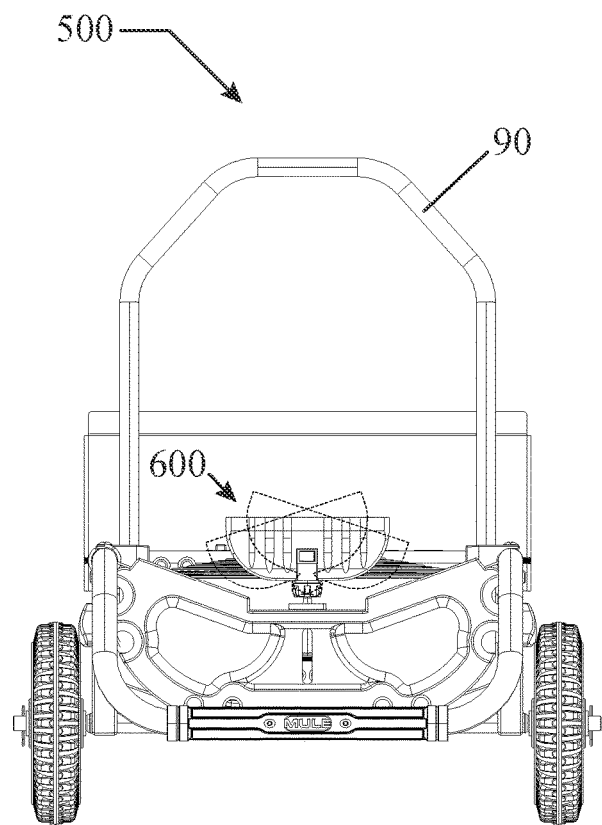
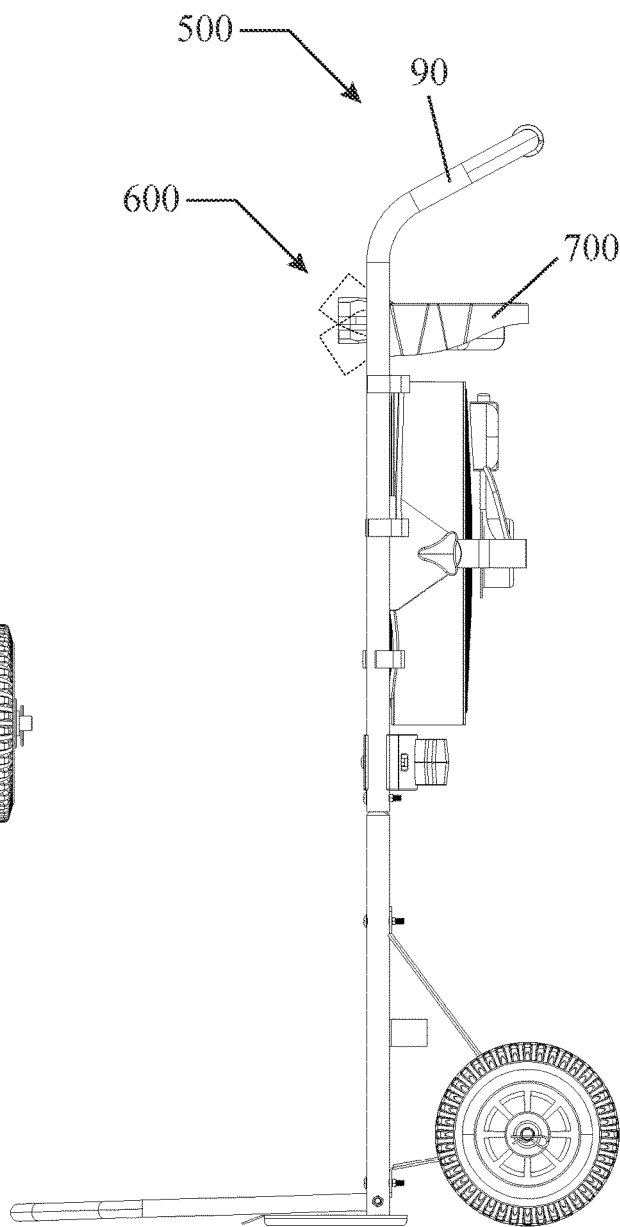

FAN CART

CROSS REFERENCE TO RELATED APPLICATIONS

This application claims the benefit of priority to U.S. Provisional Application Ser. No. 63/241,340 filed Sep. 7, 2021, the entire disclosure which is incorporated herein by specific reference thereto.

FIELD OF INVENTION

This invention relates to hand carts, and in particular to devices, apparatus, systems and methods for providing a usable hand truck with tiltable electrical fan, power strip for powering electrical equipment, a storage compartment/tray for supplies and a moveable electrical LED (light emitting diodes) light source.

BACKGROUND AND PRIOR ART

Hand trucks with wheels have been popular over the years to allow users to be able to move loads, such as boxes. The traditional hand truck includes a set of two wheels on both sides of a support ledge and a longitudinal handle assembly extending upward therefrom. See for example, U.S. Patents: DES.340,335 to Kean et al. and U.S. Pat. No. 7,530,579 to Butler.

Wheeled fan stands have been proposed over the years. See for example, U.S. Pat. Nos.: 2,521,920 to Koch; 2,830,779 to Wentling; 2,868,558 to Kraus; and 5,265,895 to Barrett. These devices merely make the fan to be portable by having wheels on a stand.

However, none of these devices allow for the user to sill be able to use a fan with a workable hand truck.

Thus, the need exists for solutions to the above problems with the prior art.

SUMMARY OF THE INVENTION

A primary objective of the present invention is to provide devices, apparatus, systems and methods of a usable hand truck with an electrical fan, power strip for powering electrical equipment, a storage compartment/tray for supplies and moveable/adjustable electrical LED (light emitting diodes) light source.

An embodiment of the hand truck can include a frame of parallel bar members having an upper end and a lower end, and a mid-portion between the upper and the lower end, a handrail extending rearwardly from the upper end of the frame, a pair of wheels attached to the lower end of the frame, a lift plate attached to the lower end of the frame for supporting loads thereon, and an upright fan attached to the frame between the mid-portion of the front frame for directing air forward of the hand truck.

The hand truck can further include a moveable light attached to the upper end of the frame, the moveable light projecting light in a forward direction from the hand truck.

The moveable light a rotate mechanism allowing the light to rotate upward to direct the light upward, and for allowing the light to rotate downward to direct the light downward.

The moveable light can include a pivot mechanism allowing the light to pivot to a left side direction and to the right side direction, and to pivot up and down.

The hand truck can further include a power strip having a plurality of plug-in outlets, attached to the frame beneath the fan, the power strip having a cord that allows the power strip to be plugged into an electrical outlet, the power strip for providing power to the fan.

The power strip can further include at least one USB port. The power supply can include a rechargeable battery power supply.

The hand truck can include a tray with storage compartments attached adjacent to the upper end of the frame.

The upright fan can include pivot members on each side of the fan allowing the fan to be tilt upward and tilt downward.

The hand truck can include a left guard member on a left side of the lift plate; and a right guard member on a right side of the lift plate.

The hand truck can include a pivotal guard rail attached to the lower end of the frame having a raised vertical position, and a lowered position over the lift plate.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIRST EMBODIMENT

Figure 1:
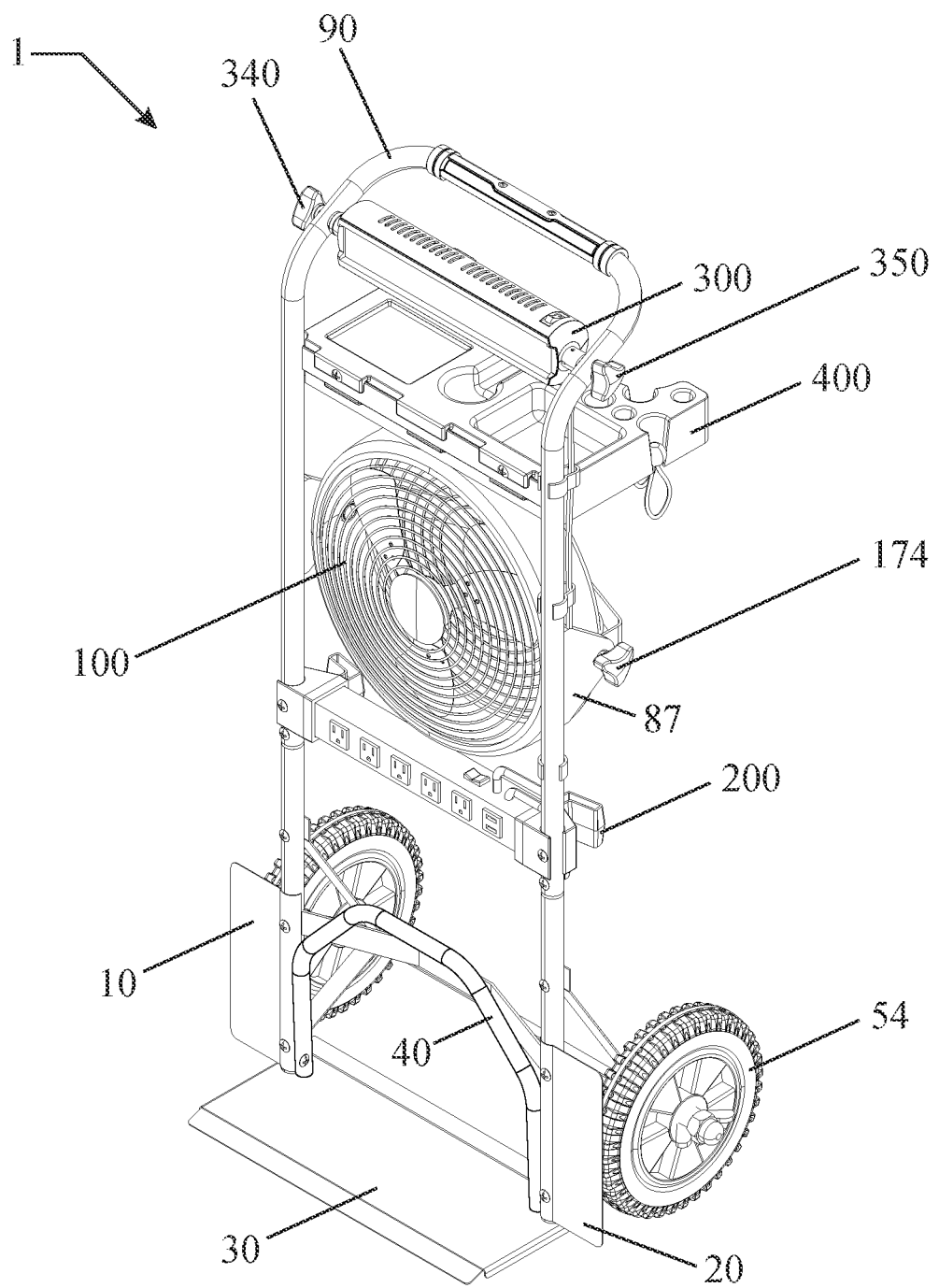

FIG. 1 is an upper front right perspective assembled view of a first embodiment hand truck with an electrical fan, power strip, a storage tray, rotatable electrical LED (light emitting diodes) light with pivotal front guard rail in upright position.

Figure 2:
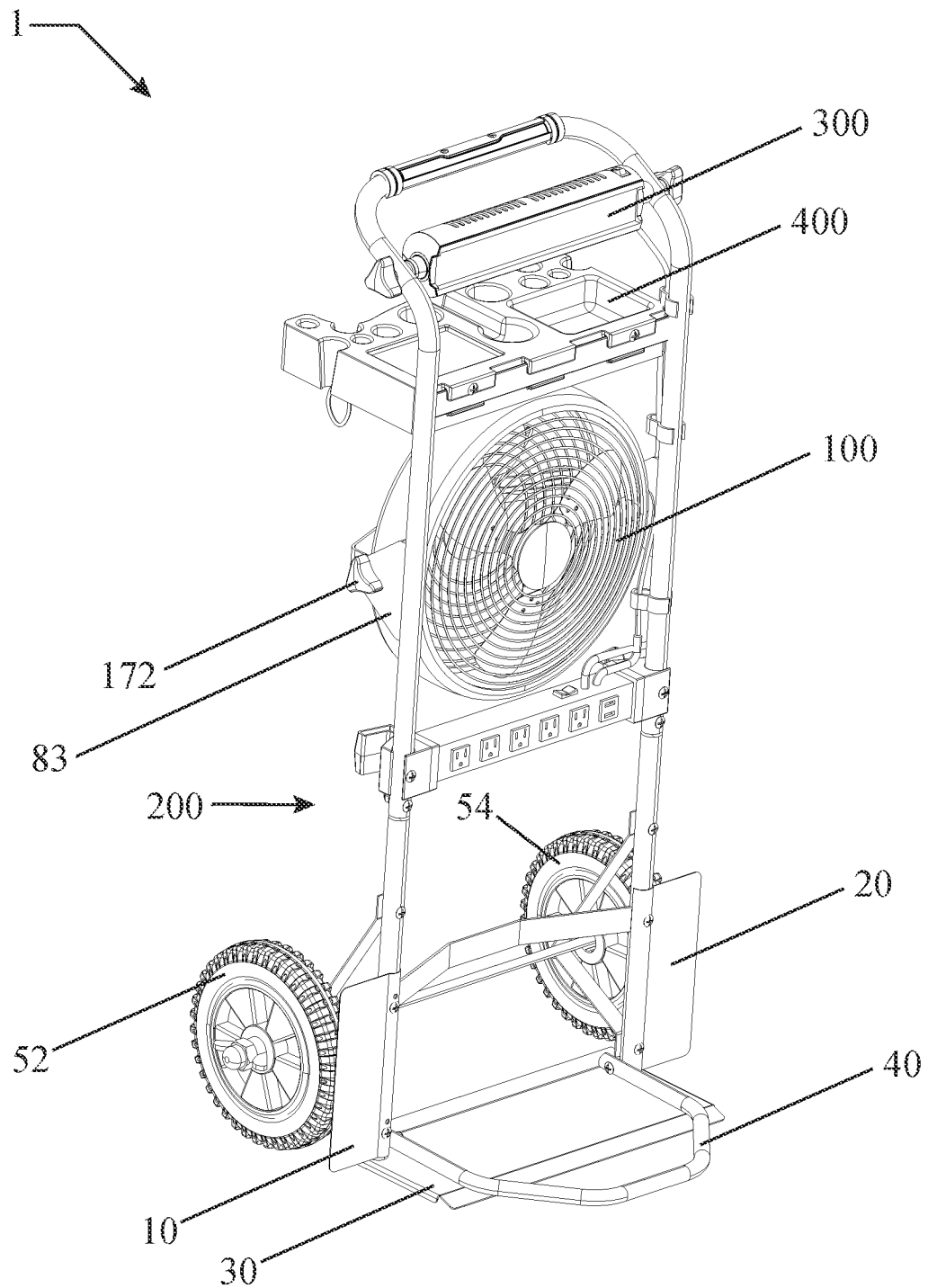

FIG. 2 is an upper front left perspective view of the hand truck of FIG. 1 with pivotal front guard rail in a down position.

Figure 3:
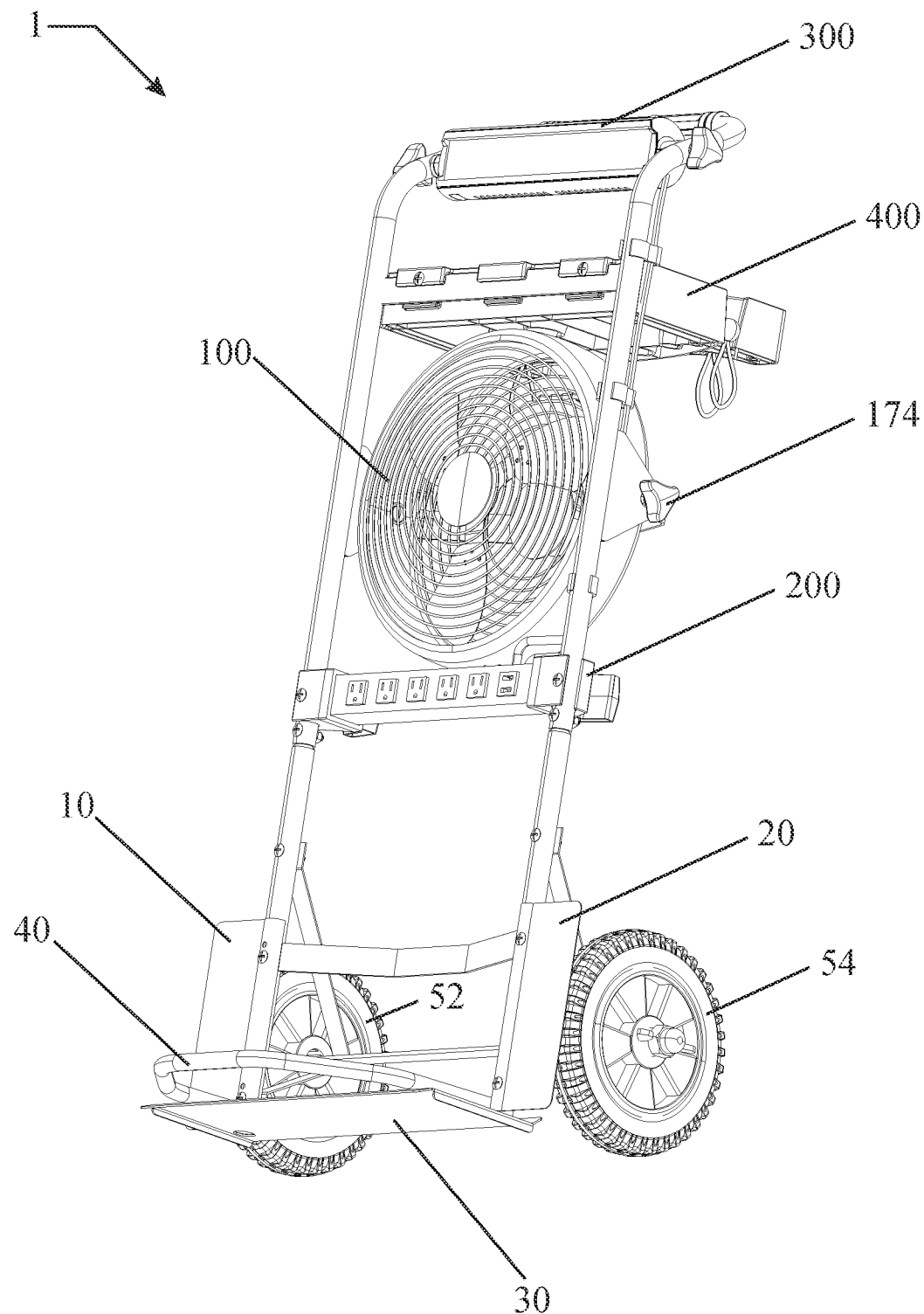

FIG. 3 is a lower front right perspective view of the hand truck of FIG. 2.

Figure 4:
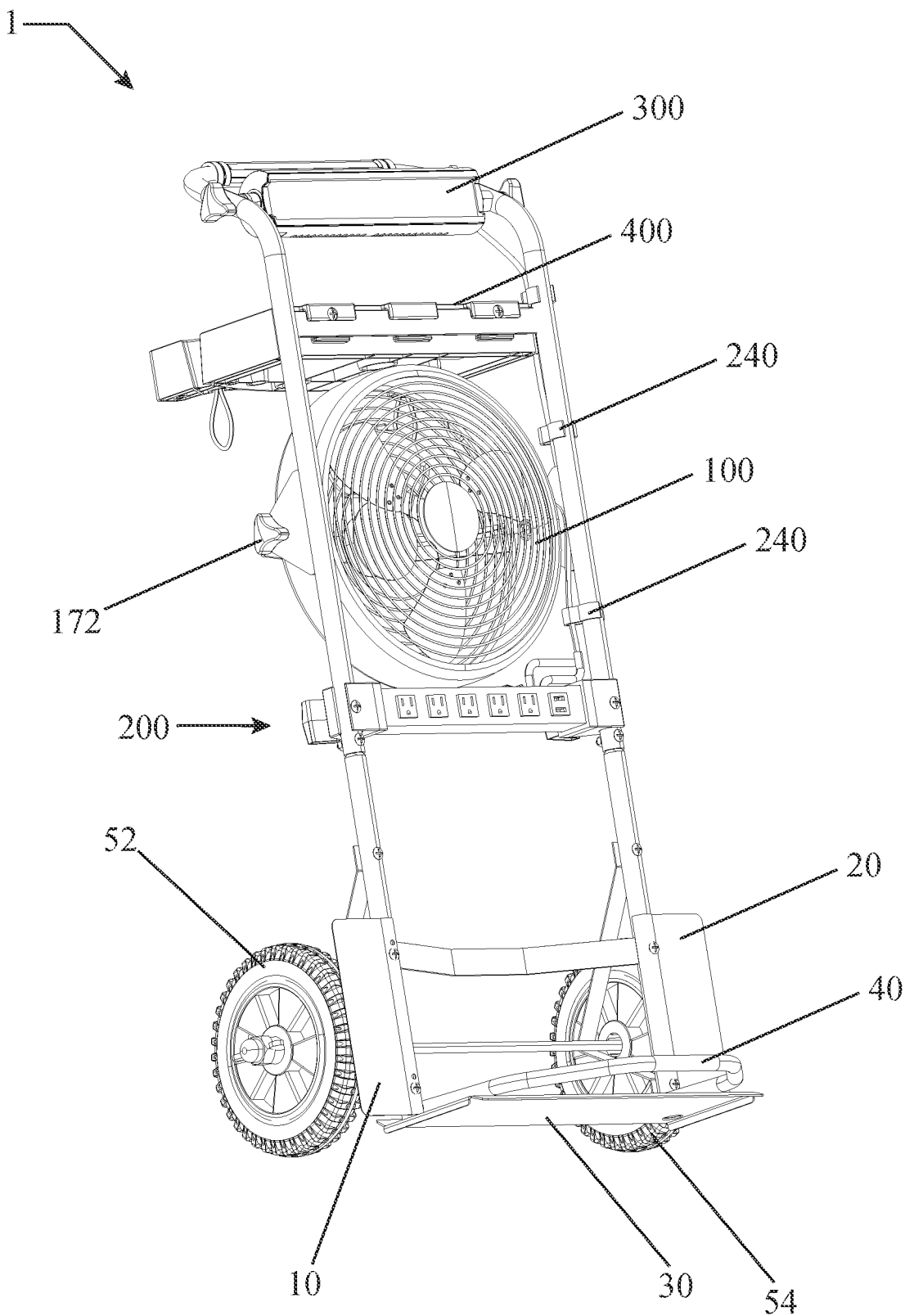

FIG. 4 is a lower front left perspective view of the hand truck of FIG. 2.

Figure 5:
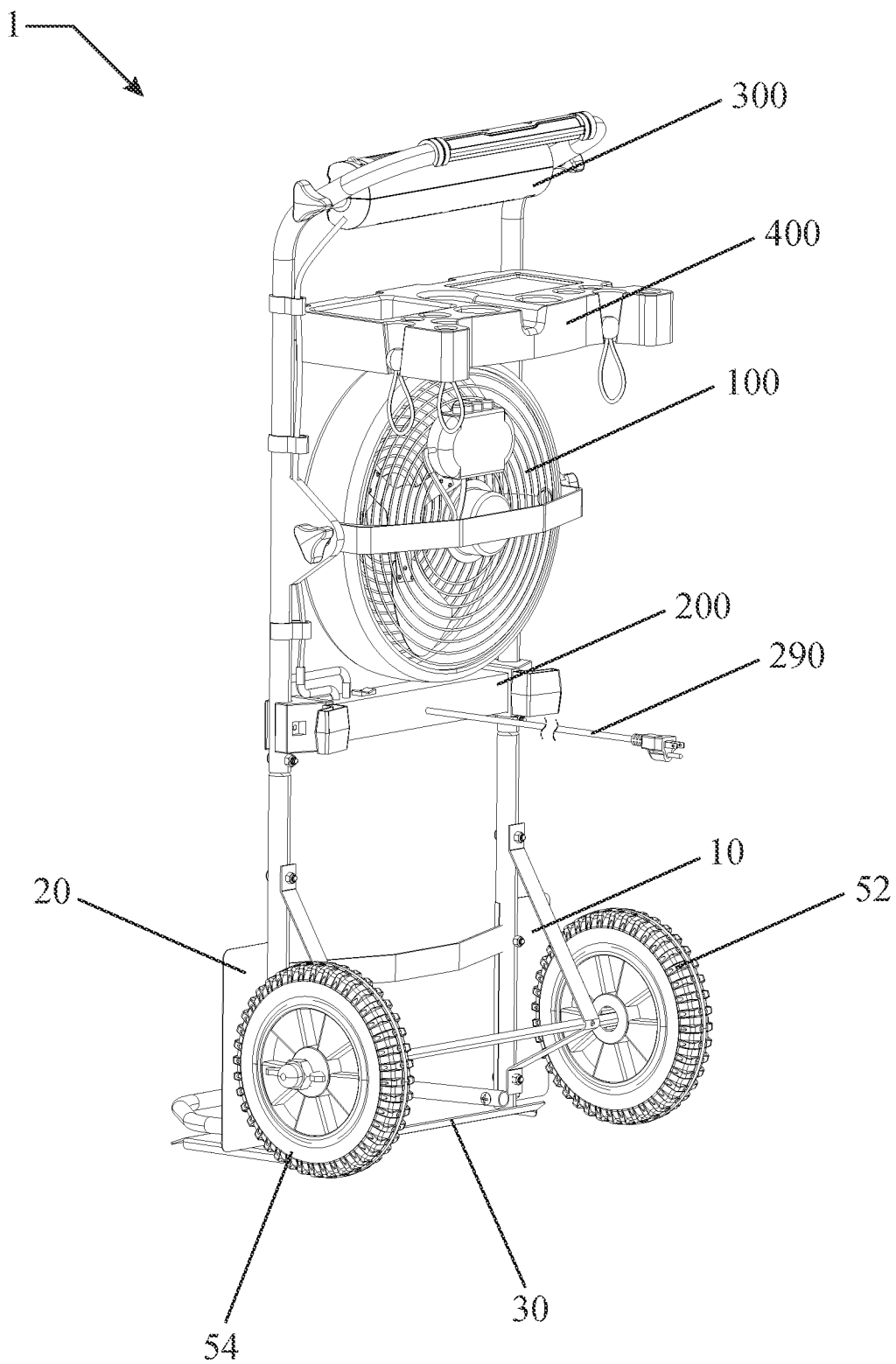

FIG. 5 is an upper rear left perspective view of the hand truck of FIG. 2.

Figure 6:
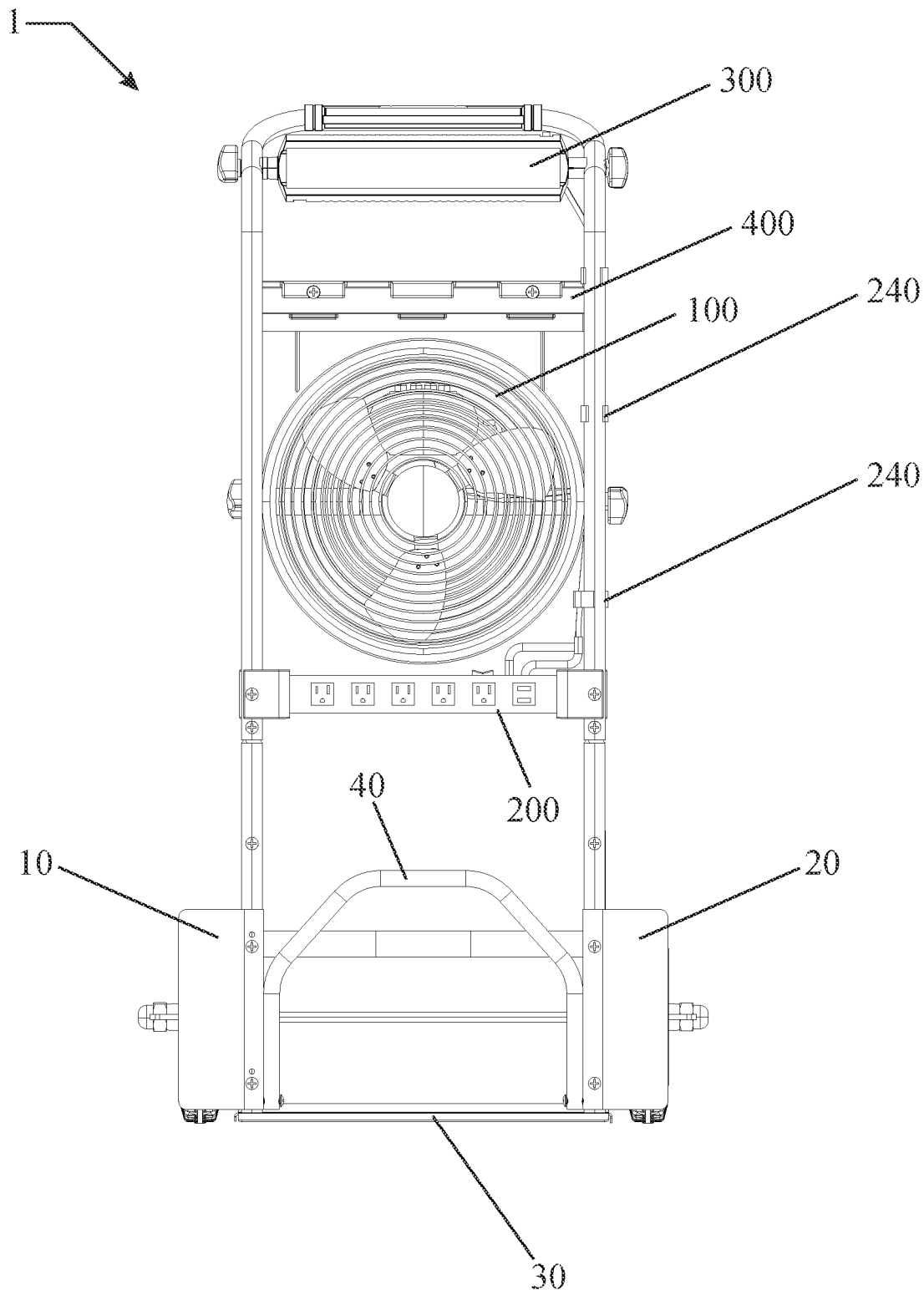

FIG. 6 is a front view of the useable hand truck of FIG. 1.

Figure 7:
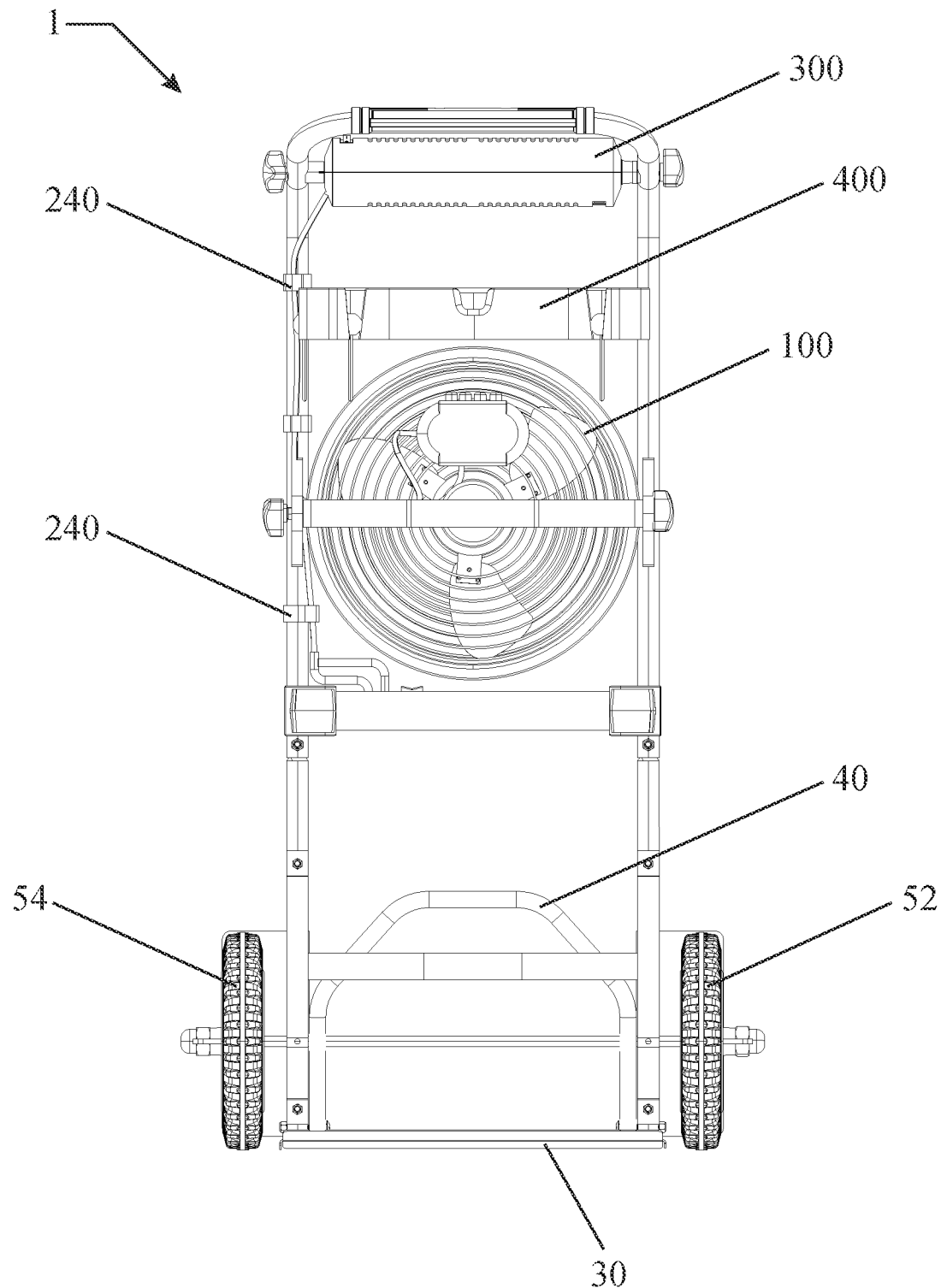

FIG. 7 is a rear view of the useable hand truck of FIG. 1.

Figure 8:
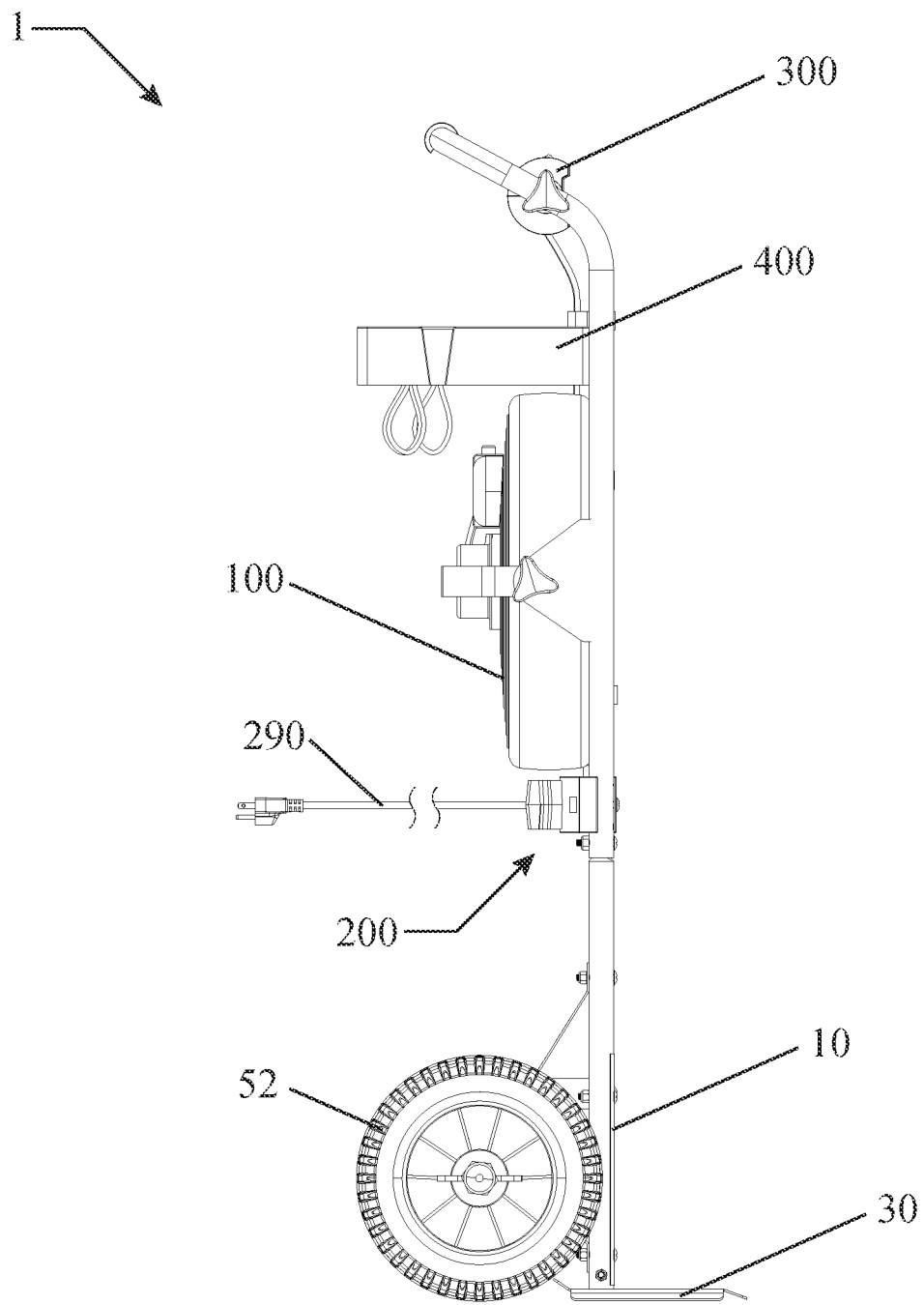

FIG. 8 is a right side view of the hand truck of FIG. 1.

Figure 9:
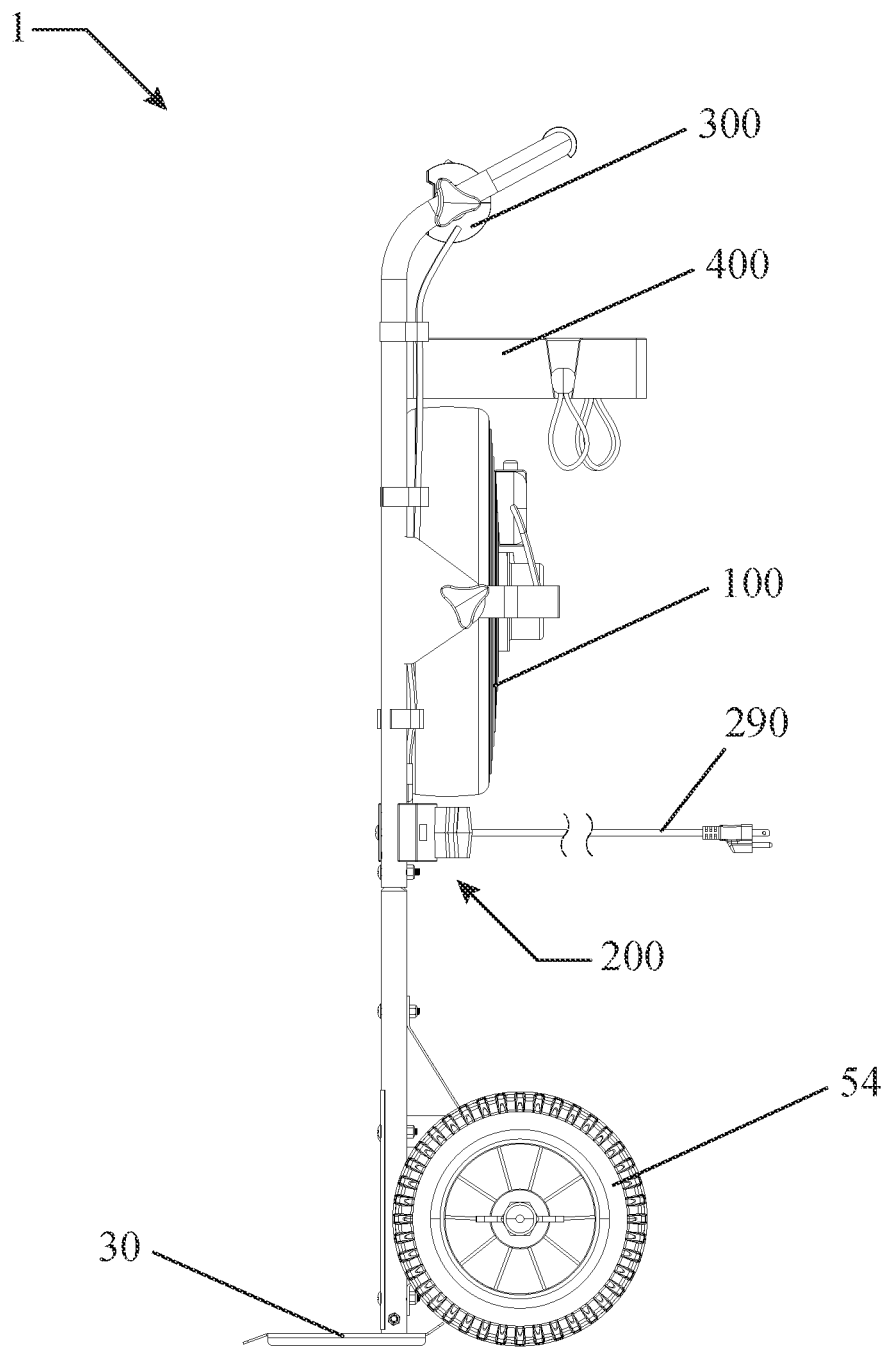

FIG. 9 is a left side view of the hand truck of FIG. 1.

Figure 10:
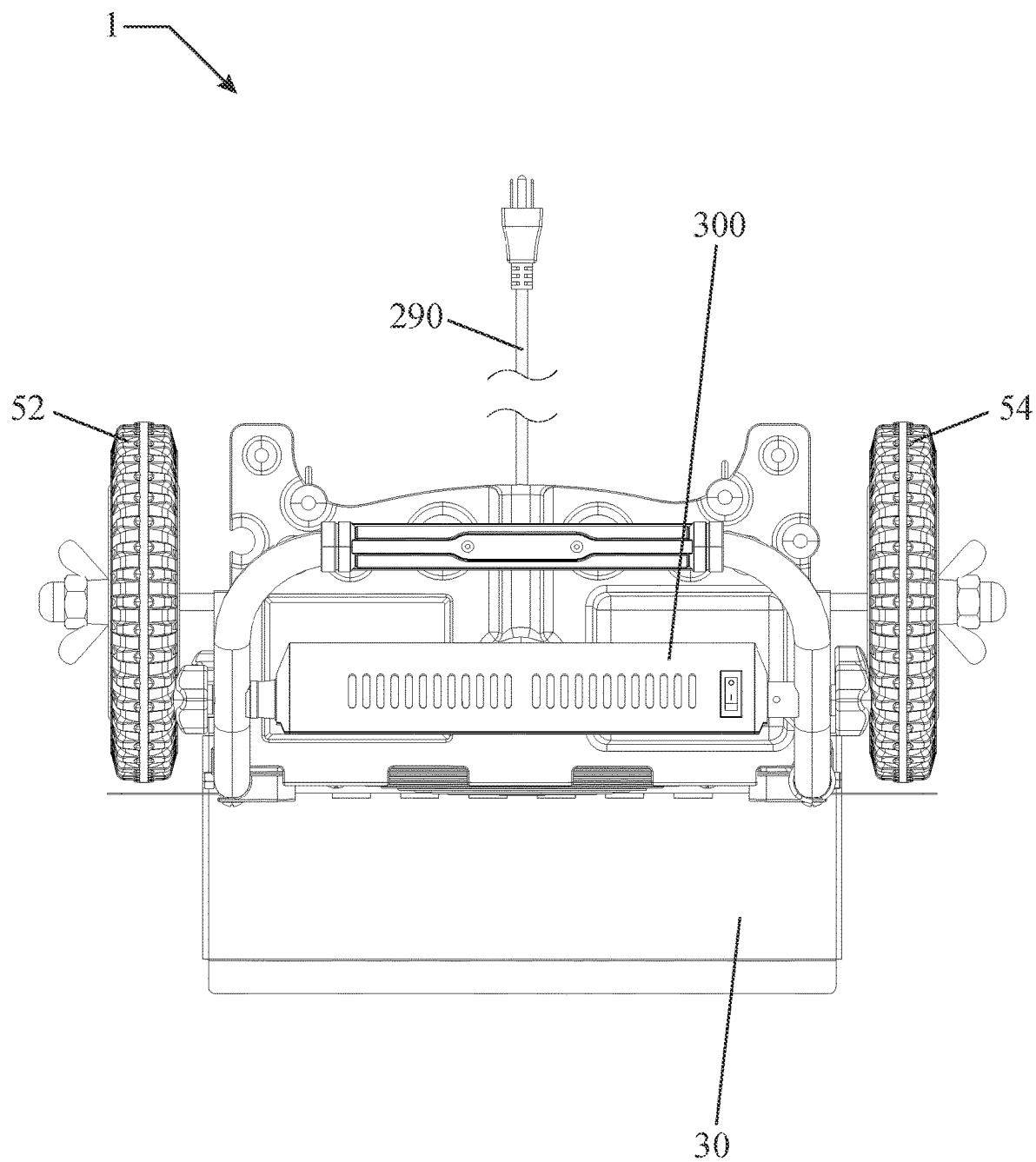

FIG. 10 is a top view of the hand truck of FIG. 1.

Figure 11:
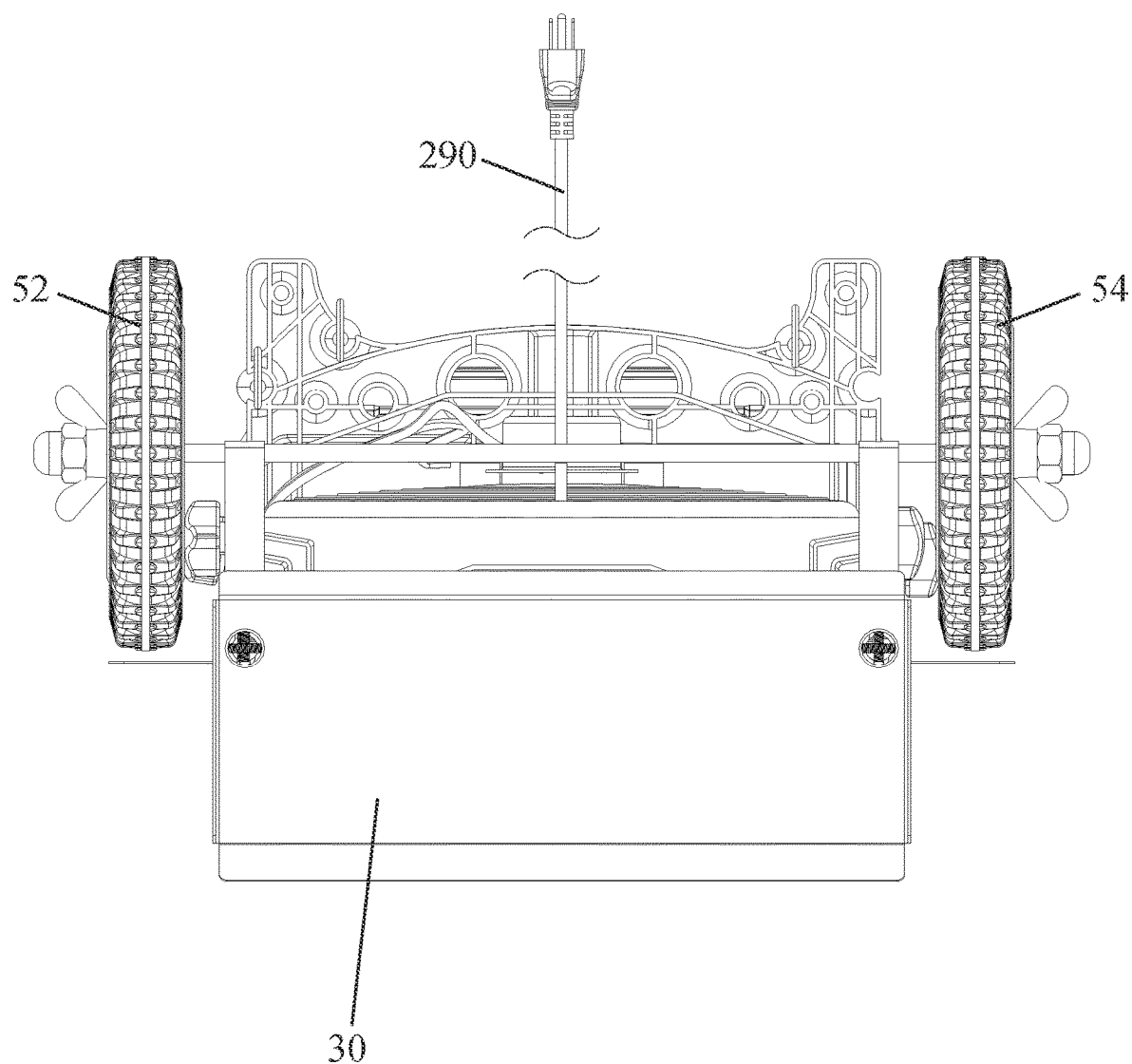

FIG. 11 is a bottom view of the hand truck of FIG. 1.

Figure 12A:
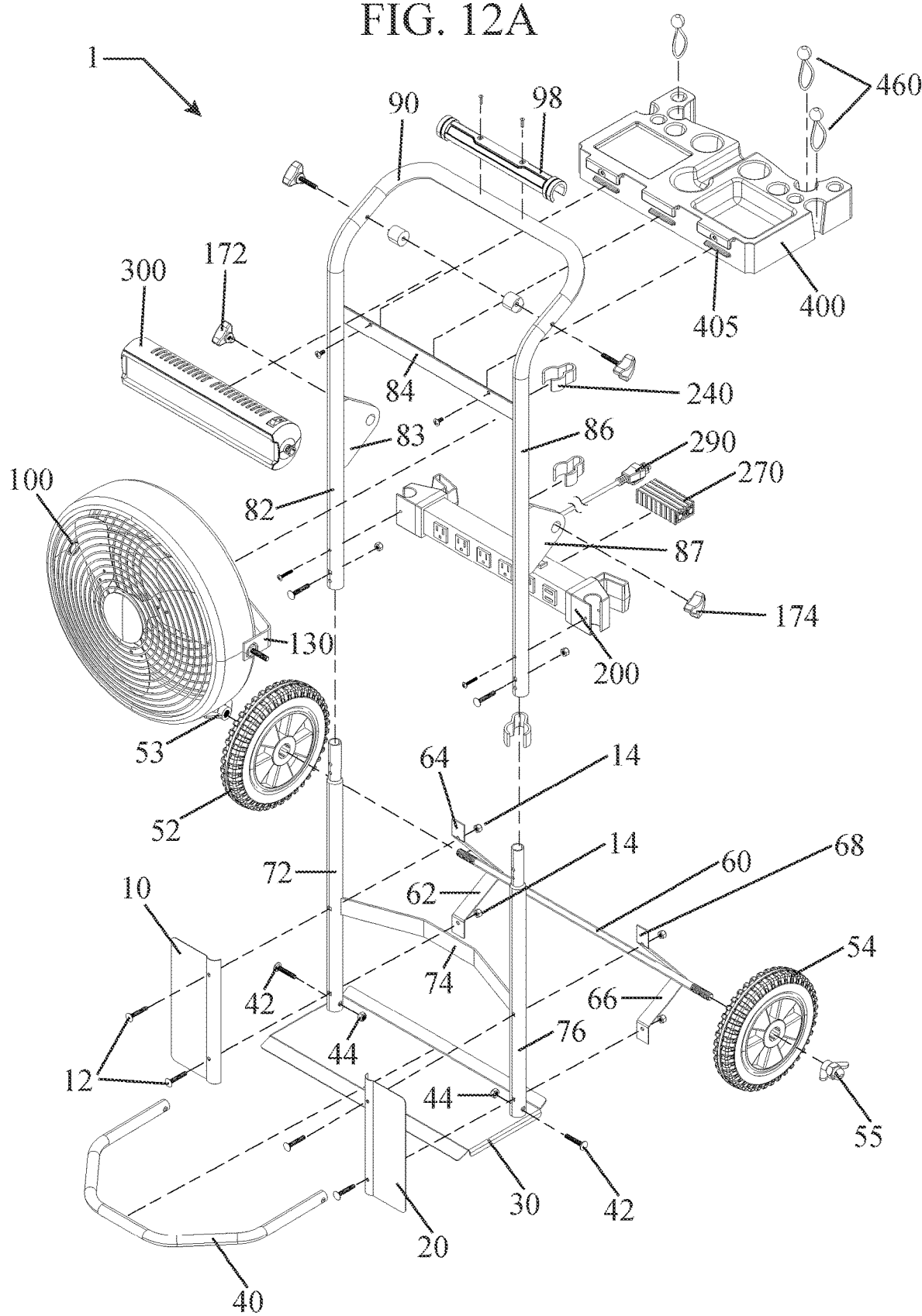

FIG. 12A is an exploded view of the hand truck of FIG. 1.

Figure 12B:
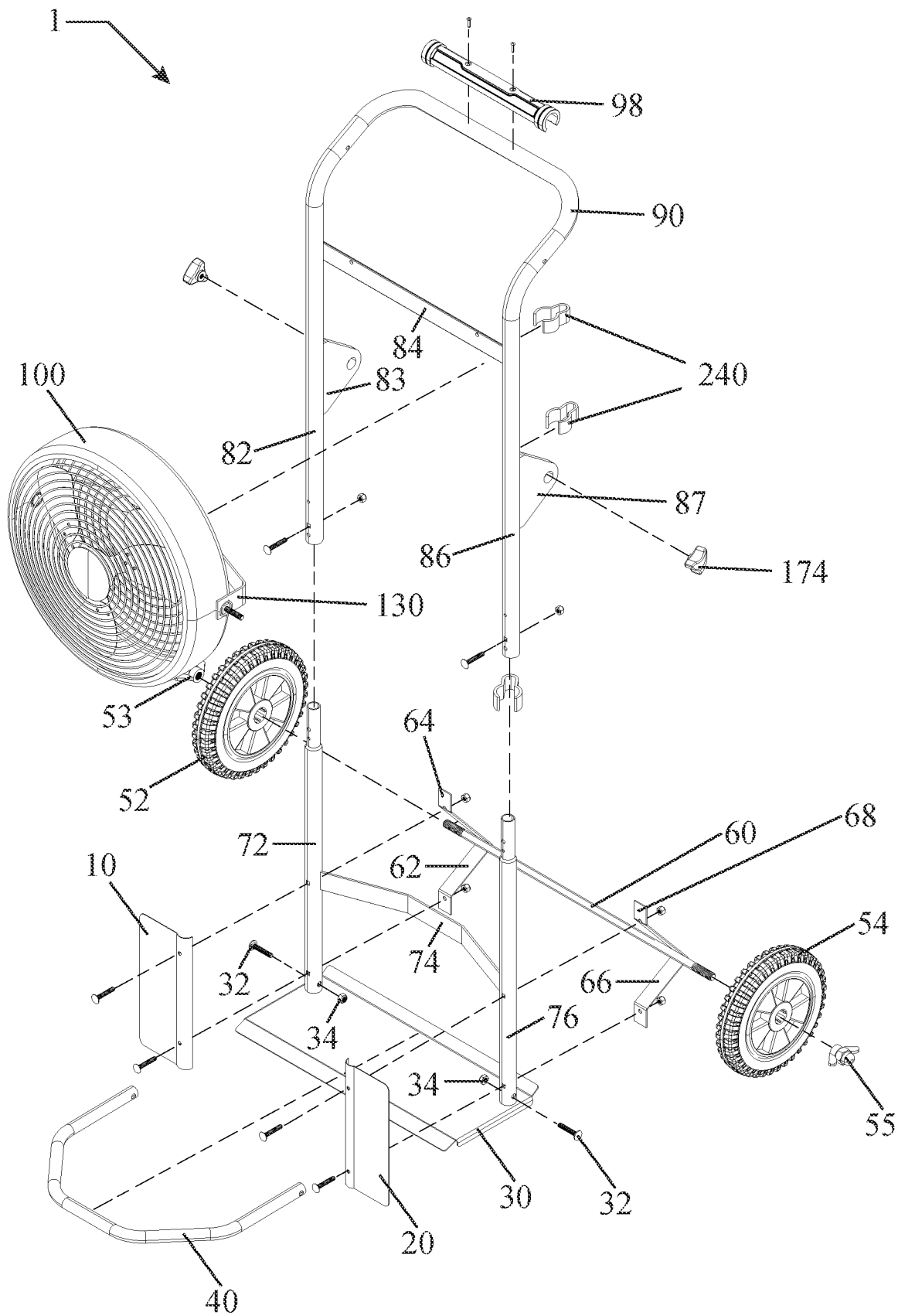

FIG. 12B is an exploded view of the hand truck of FIG. 12A without the tray, light and power strip.

Figure 12C:
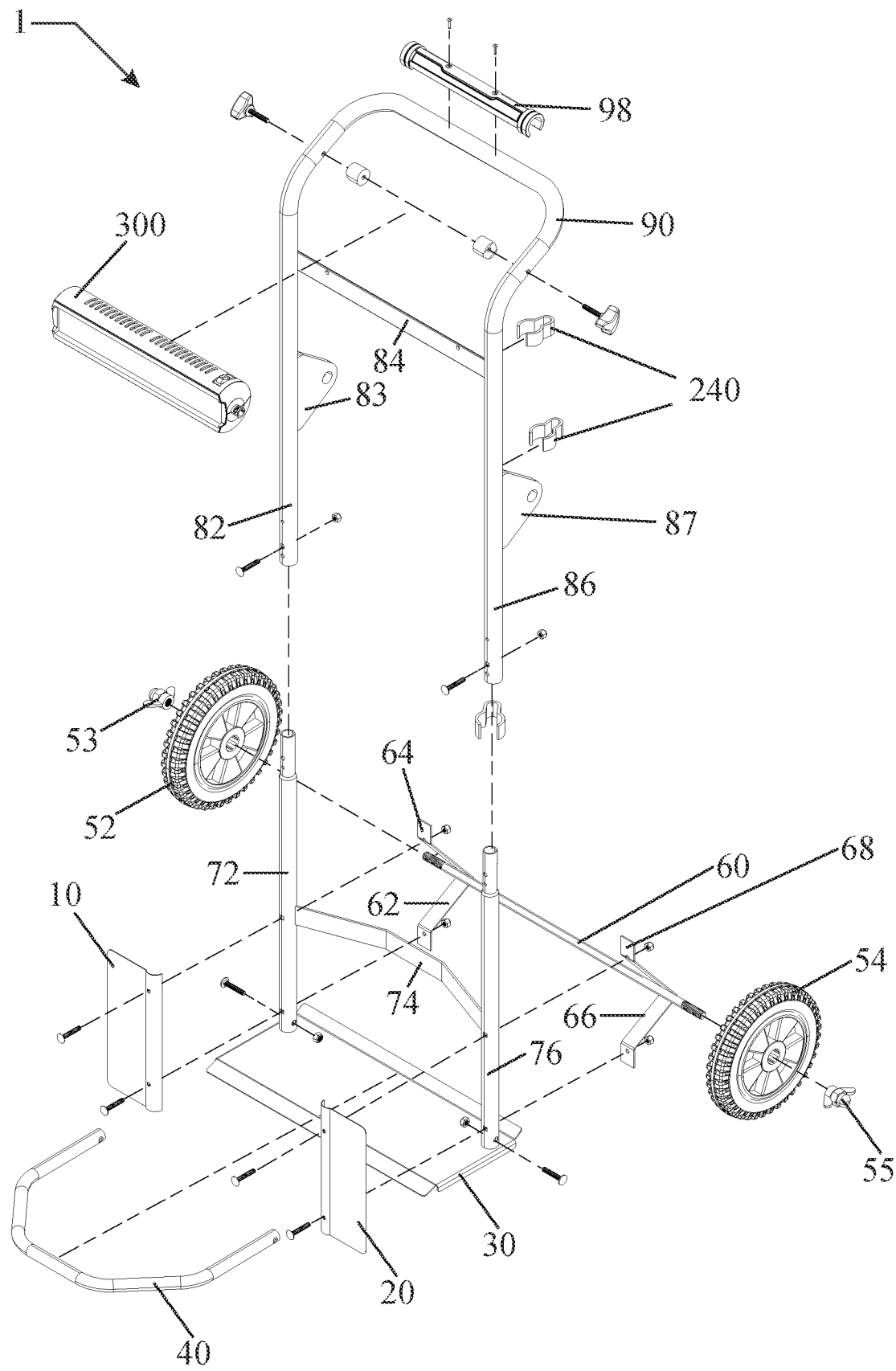

FIG. 12C is an exploded view of the hand truck of FIG. 12A without the tray, fan and power strip.

Figure 12D:
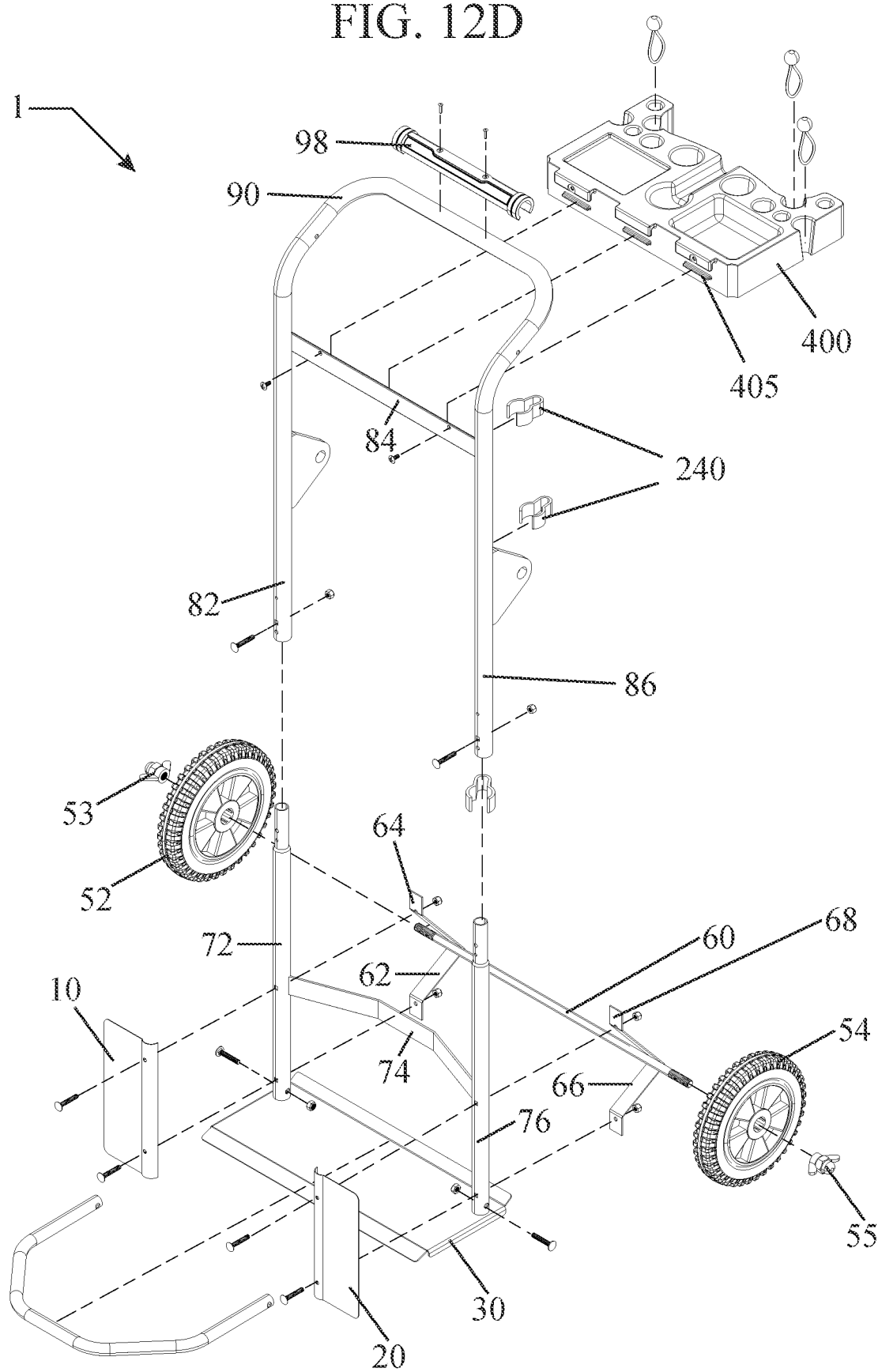

FIG. 12D is an exploded view of the hand truck of FIG. 12A without the fan, light and power strip.

Figure 12E:
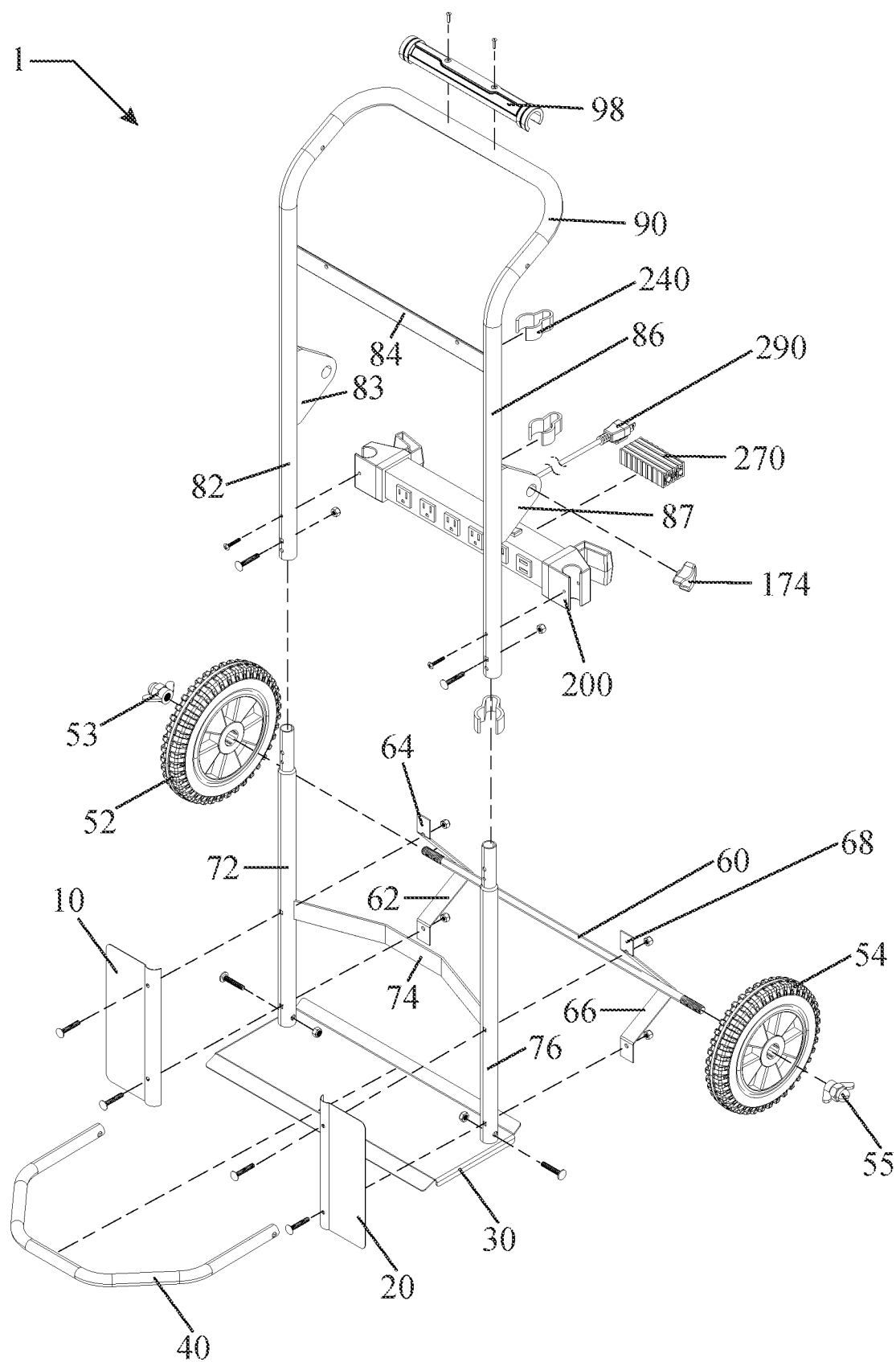

FIG. 12E is an exploded view of the hand truck of FIG. 12A without the fan, light and tray.

FIG. 13A is another left side view of the hand truck of FIG. 9 with the top of the fan tilted backward.

FIG. 13B is another left side view of the hand truck of FIG. 9 with the top of the fan tilted forward.

Figure 14A:
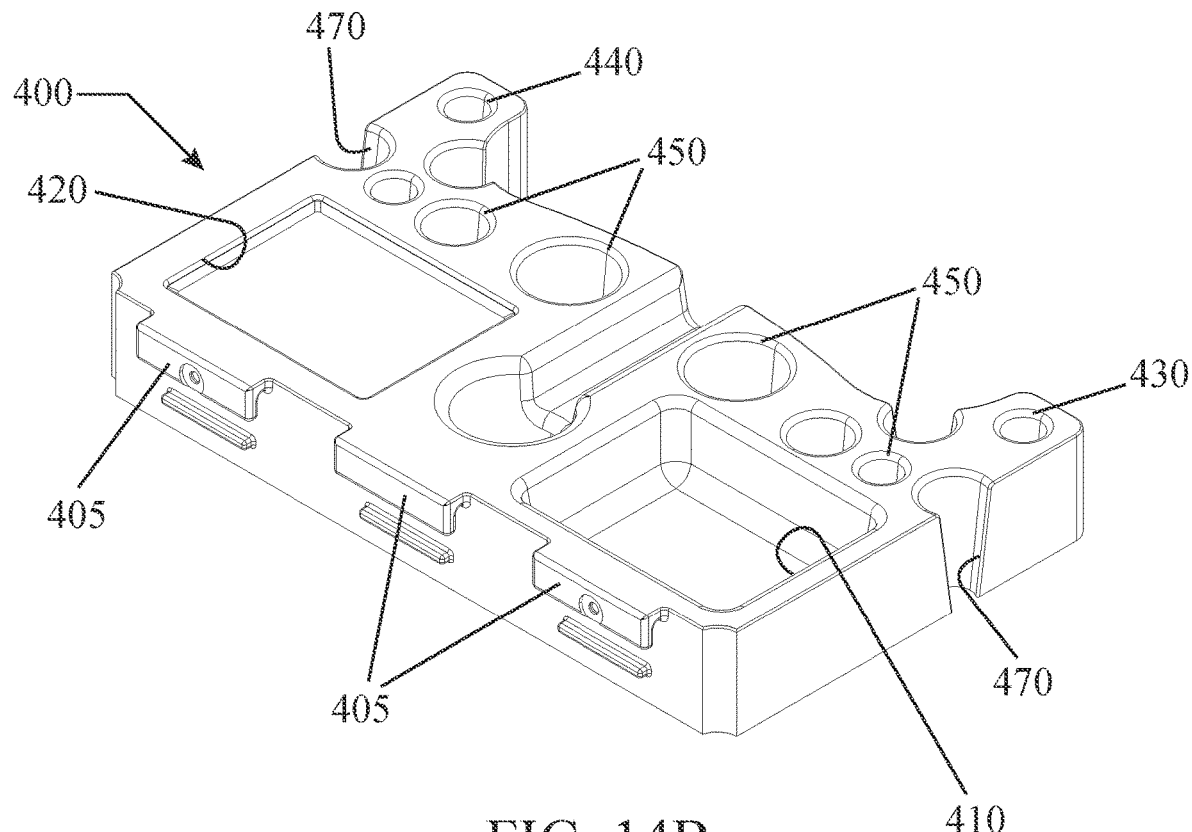

FIG. 14A is an upper perspective view of the tray for the hand truck of FIG. 1.

Figure 14B:
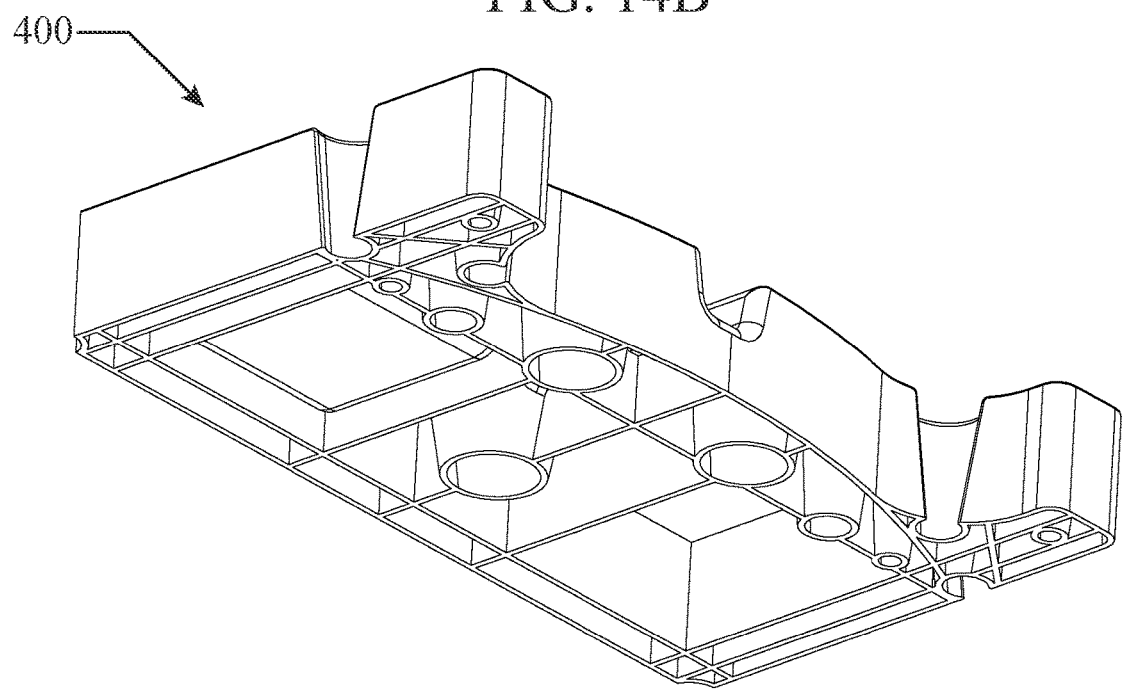

FIG. 14B is a lower perspective view of the tray of FIG. 14A.

Figure 15A:
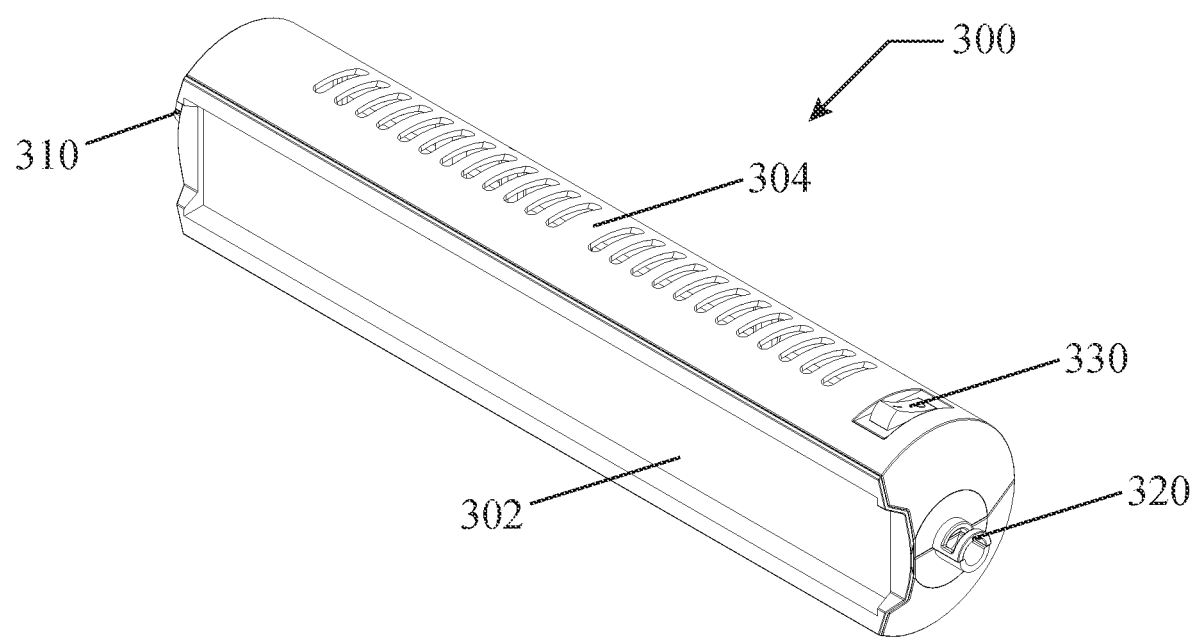

FIG. 15A is an upper front right perspective view of the hand truck light of FIG. 1.

Figure 15B:
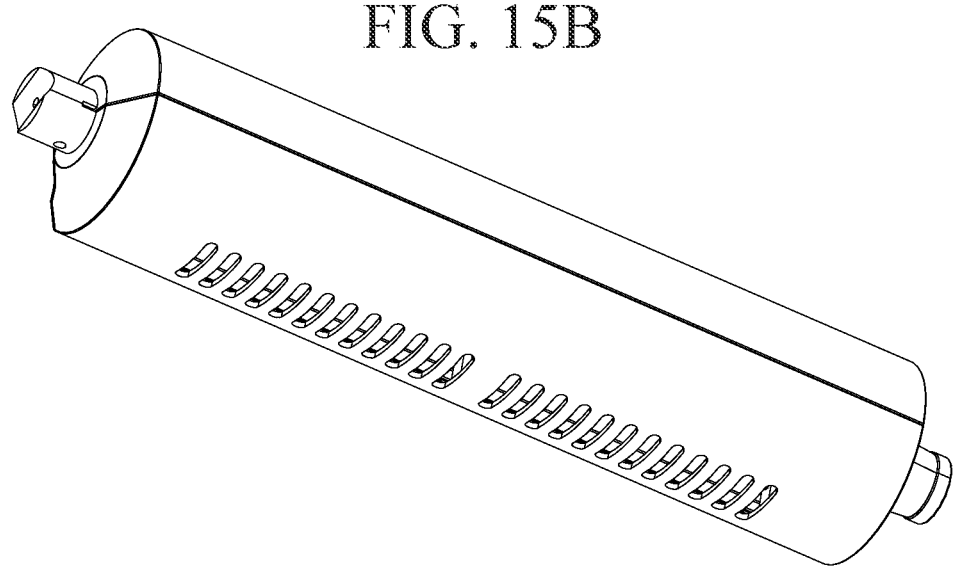

FIG. 15B is a lower rear left perspective view of the light of FIG. 15A.

FIG. 16A is an upper front right perspective view of the hand truck power strip of FIG. 1.

FIG. 16B is a lower front left perspective view of the power strip of FIG. 16A.

Figure 17A:
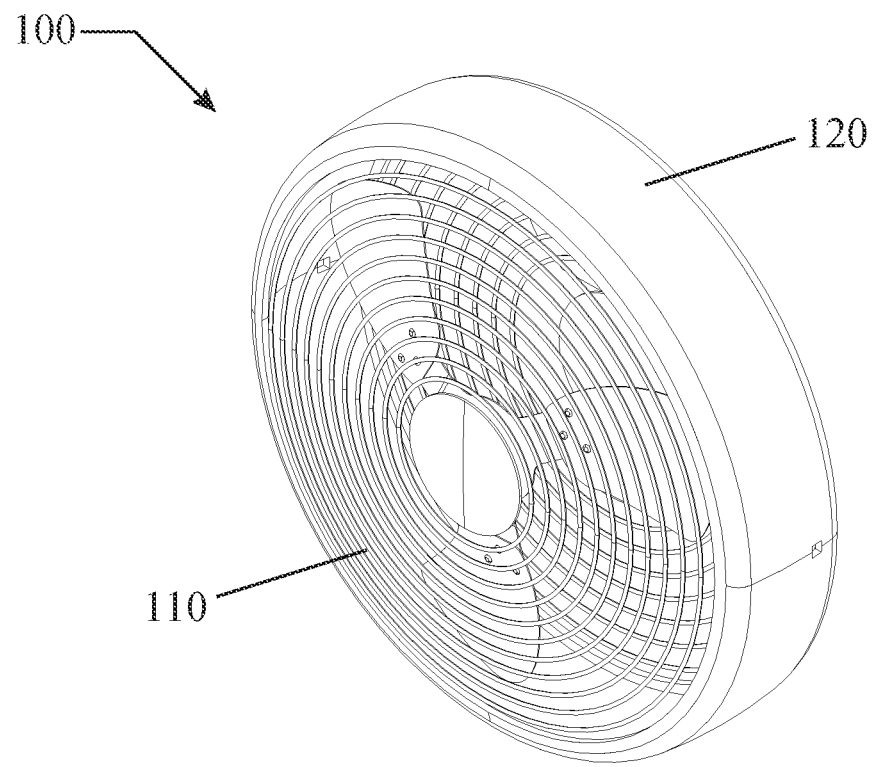

FIG. 17A is an upper front right perspective view of the hand truck fan of FIG. 1 without pivot bracket.

Figure 17B:
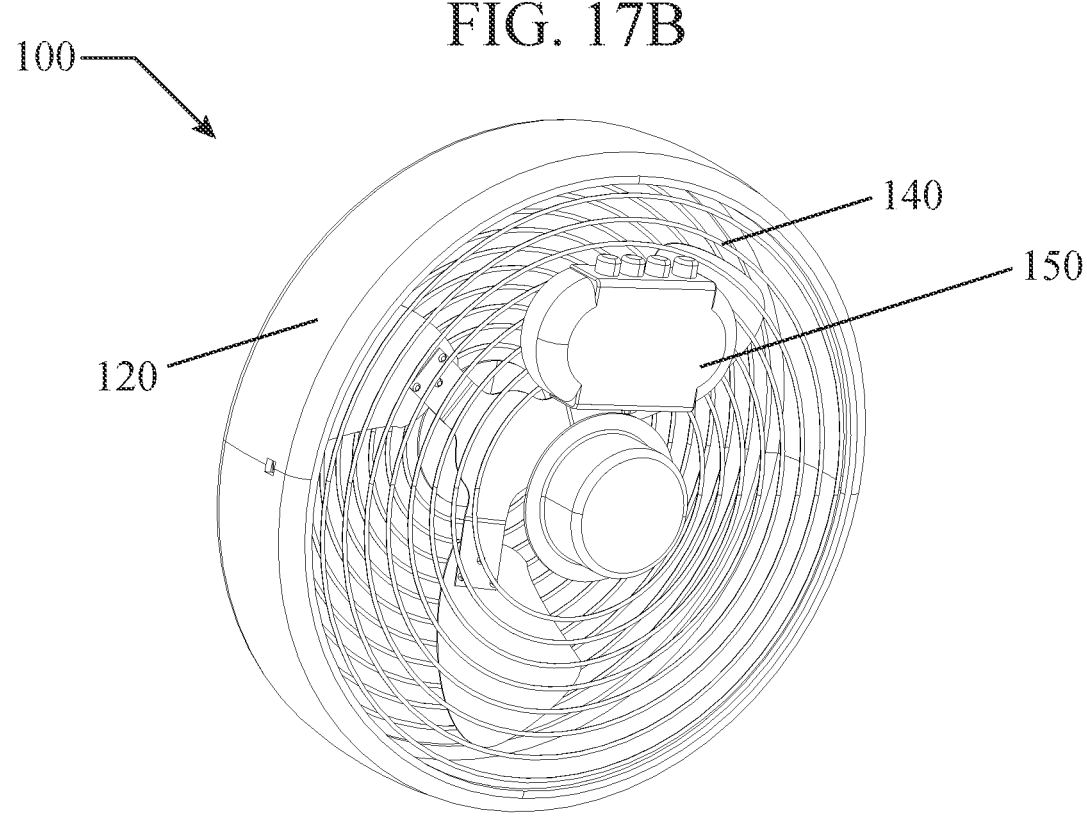

FIG. 17B is a lower rear left perspective view of the fan of FIG. 17A.

Figure 18A:
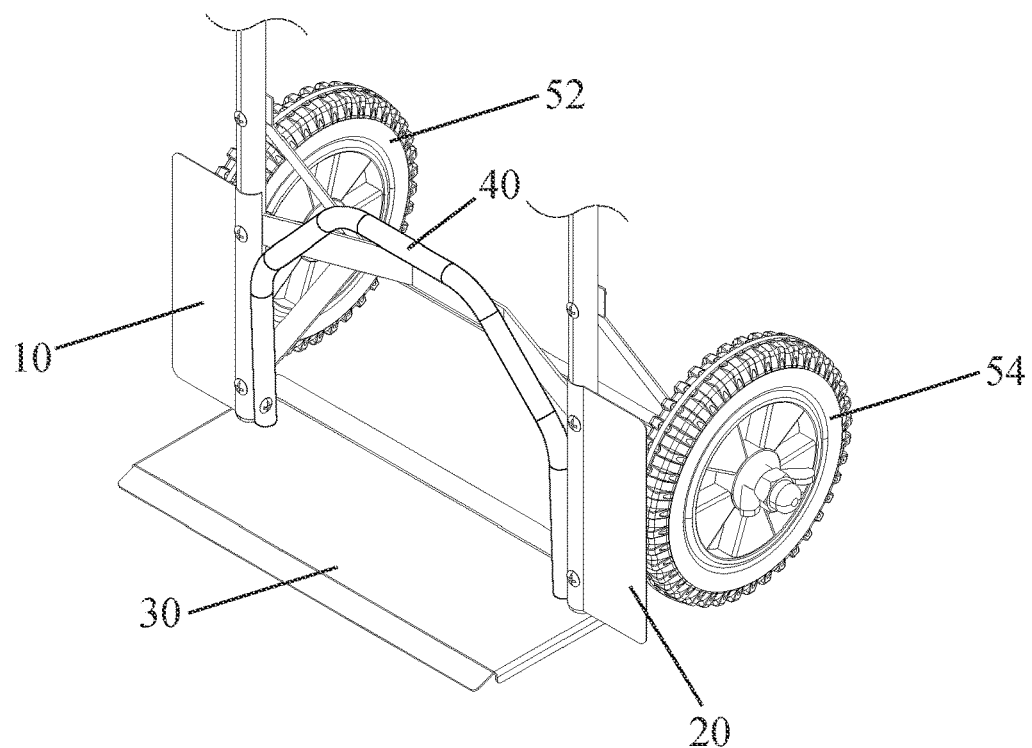

FIG. 18A is a partial lower front perspective view of the hand truck of FIG. 1 with guard rail raised over the lift plate.

Figure 18B:
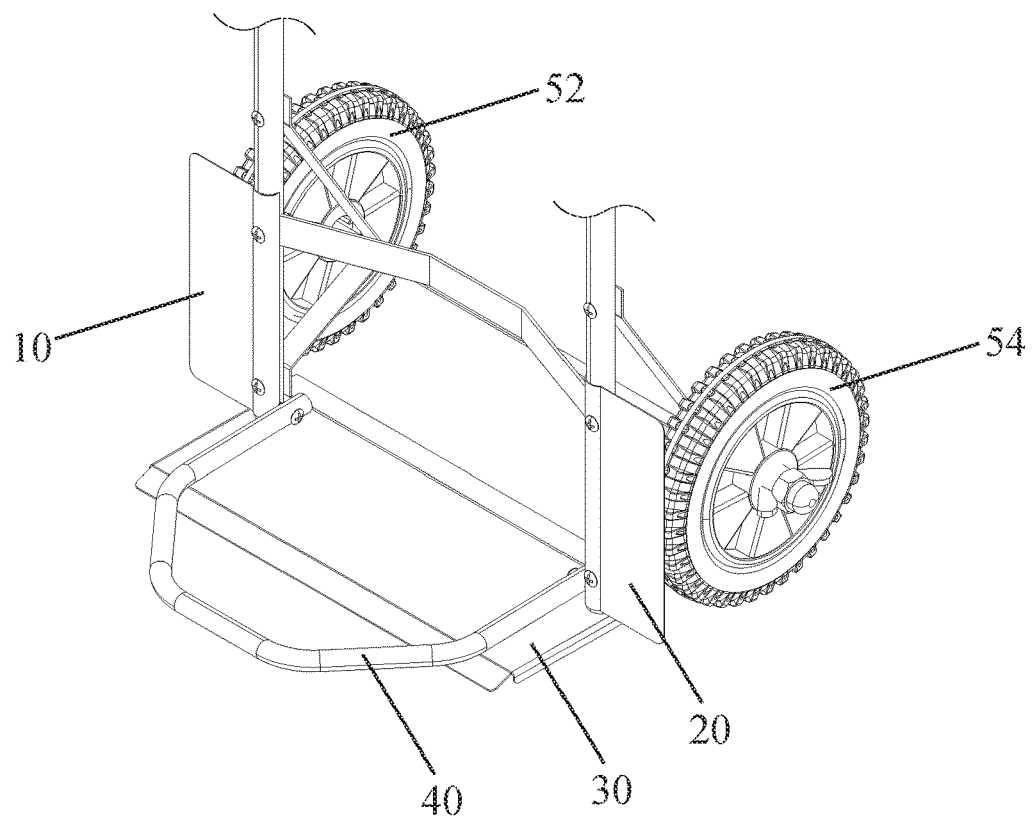

FIG. 18B is a partial lower front perspective view of the hand truck of FIG. 2 with guard rail in a down position on the lift plate.

Figure 19:
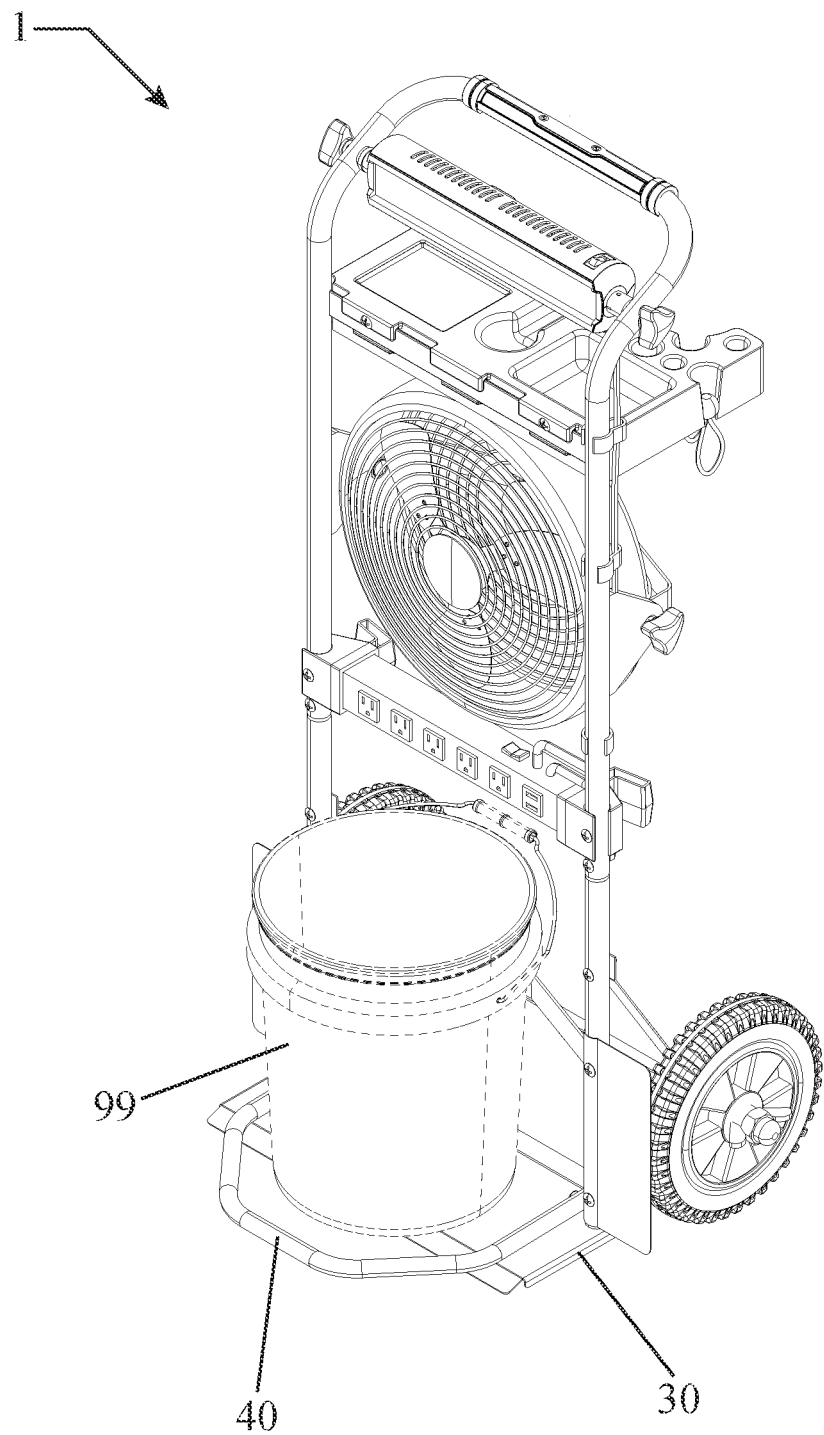

FIG. 19 is another upper front right perspective assembled view of a useable hand truck of FIG. 1 with a load in the hand truck.

SECOND EMBODIMENT

Figure 20:
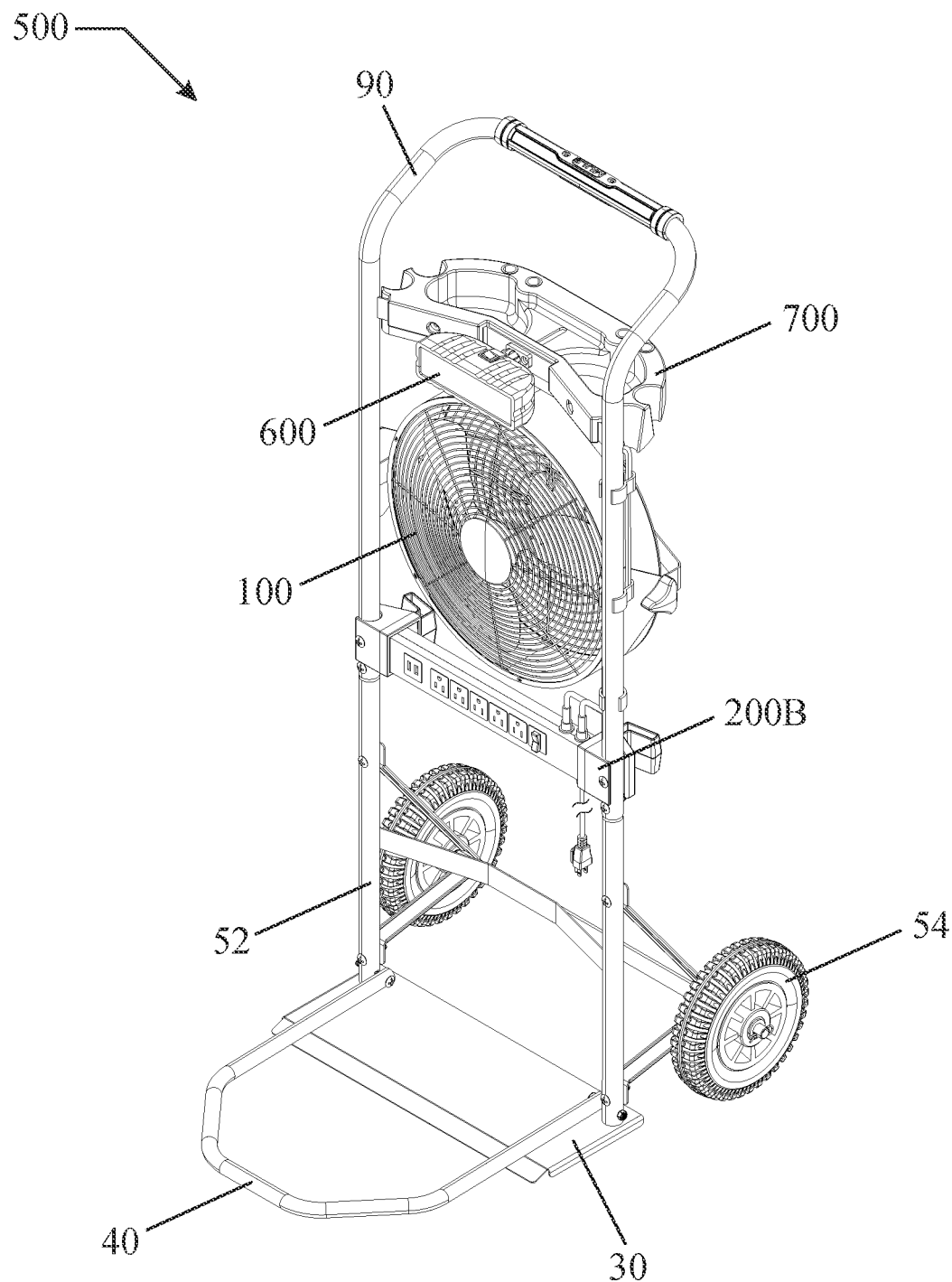

FIG. 20 is an upper front right perspective assembled view of a second embodiment hand truck with an electrical fan, power strip, a storage second embodiment tray, second embodiment light with pivotal front guard rail in a down position.

Figure 21:
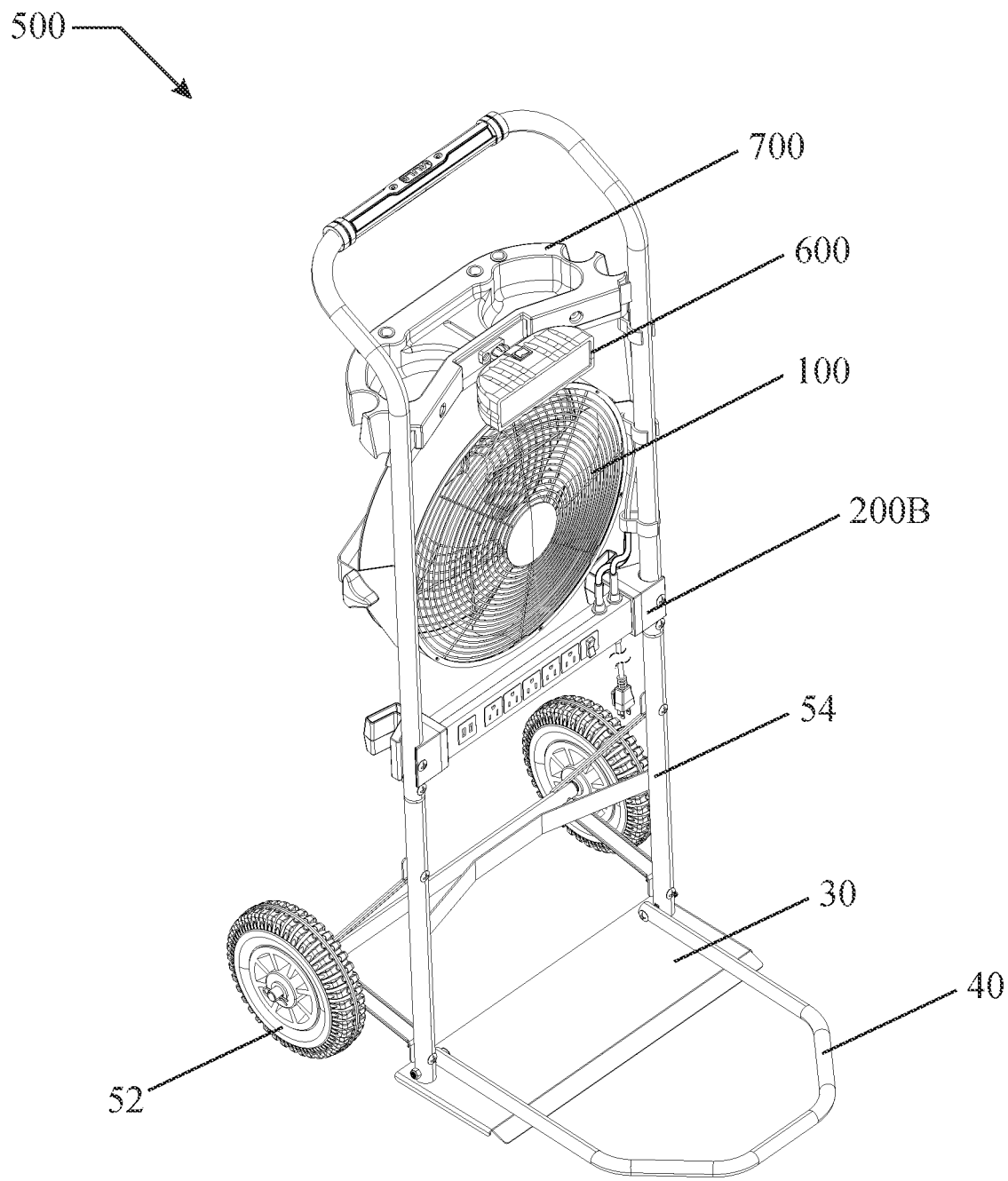

FIG. 21 is an upper front left perspective view of the hand truck of FIG. 20 with pivotal front guard rail in a down position.

Figure 22:
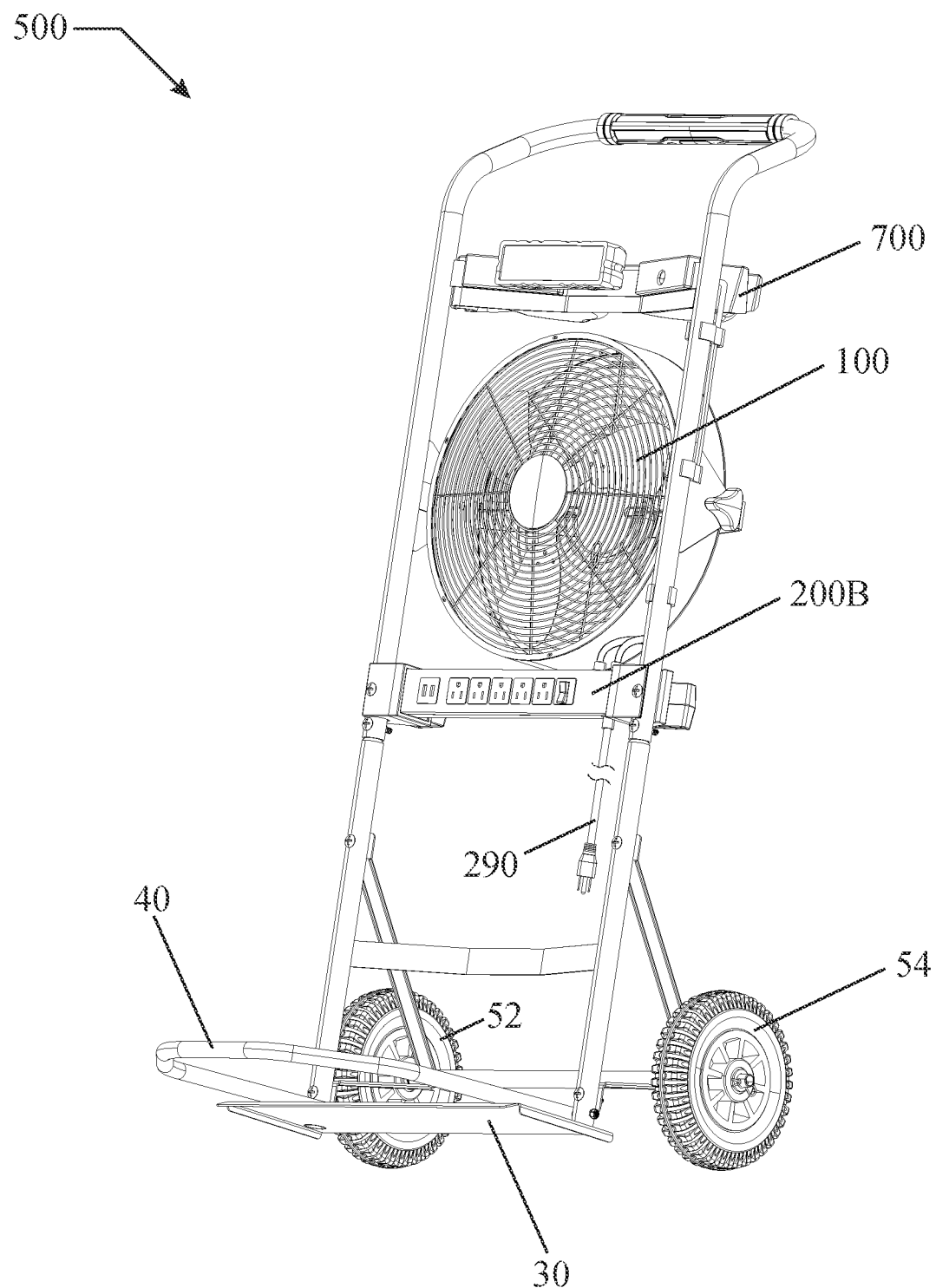

FIG. 22 is a lower front right perspective view of the hand truck of FIG. 20.

Figure 23:
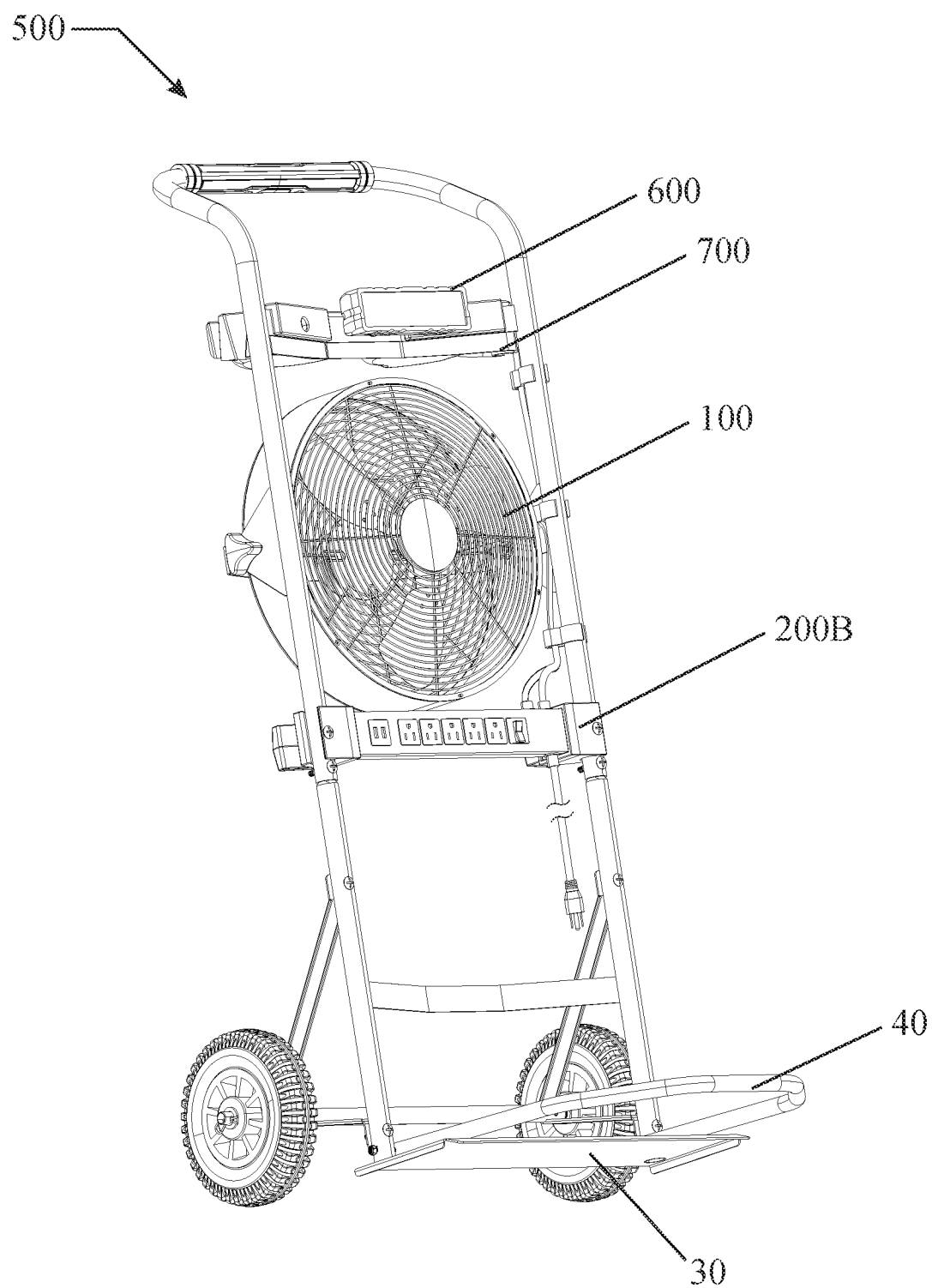

FIG. 23 is a lower front left perspective view of the hand truck of FIG. 20.

Figure 24:
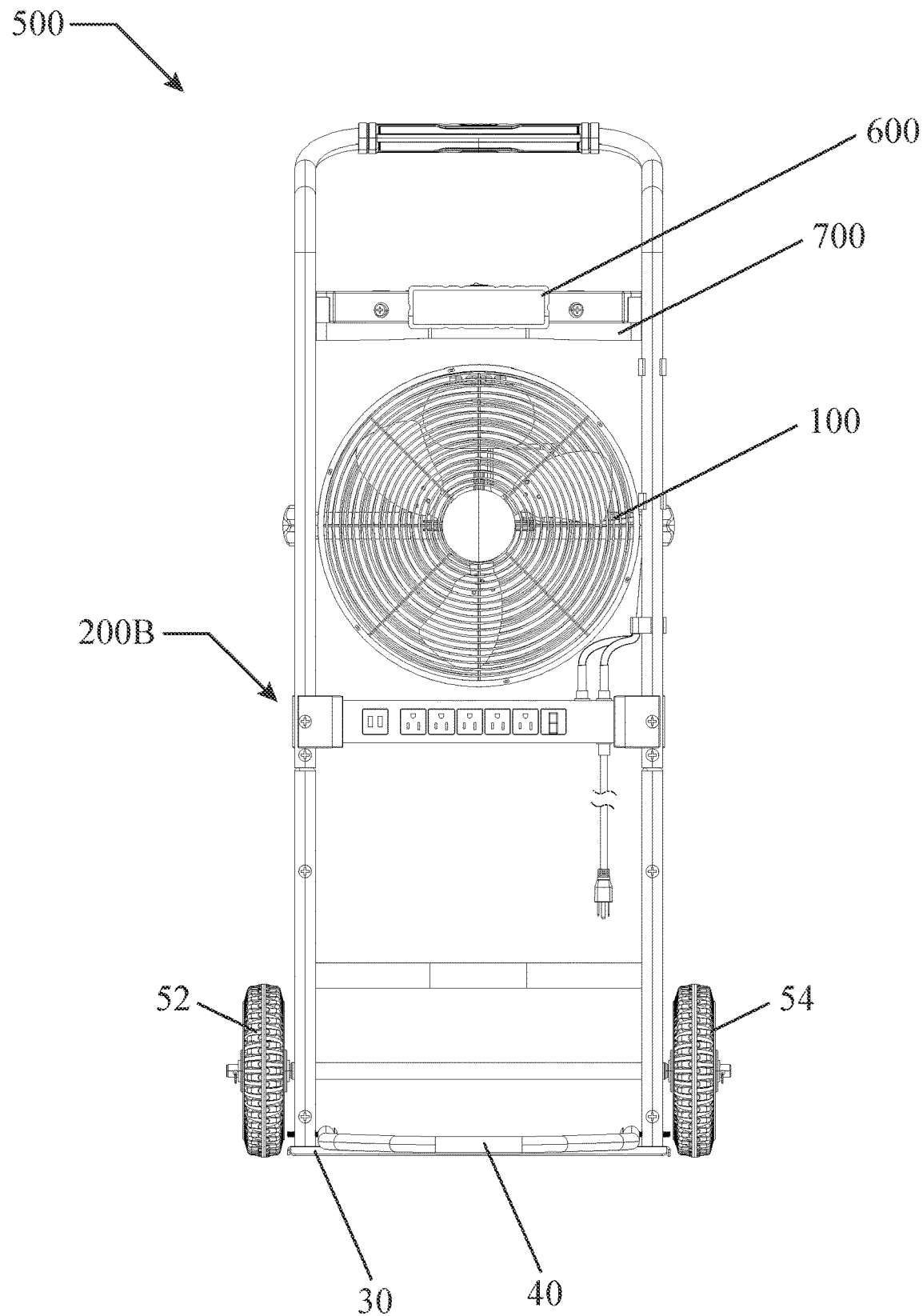

FIG. 24 is a front view of the hand truck of FIG. 20.

Figure 25:
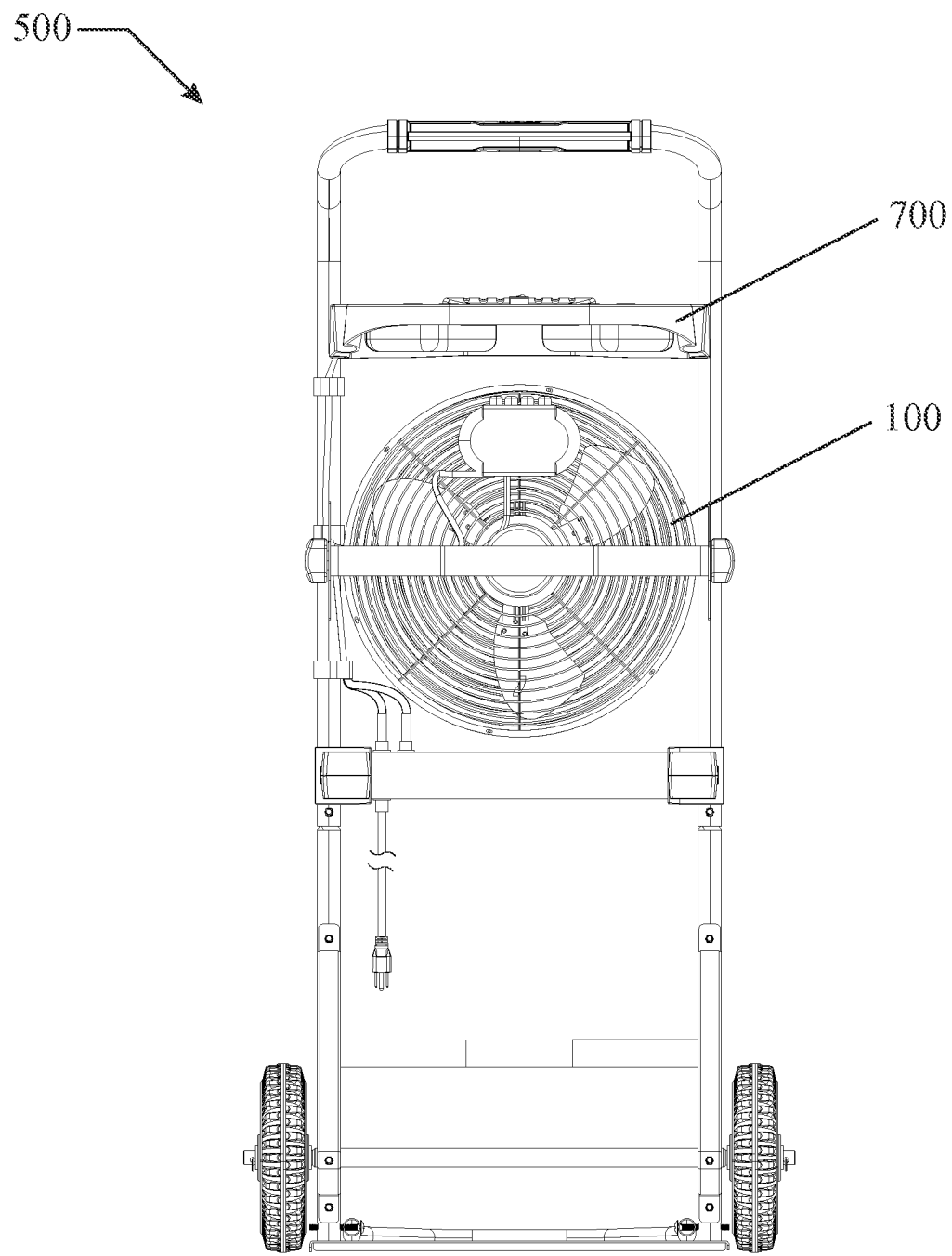

FIG. 25 is a rear view of the hand truck of FIG. 20 with guard rail in up position.

Figure 26:
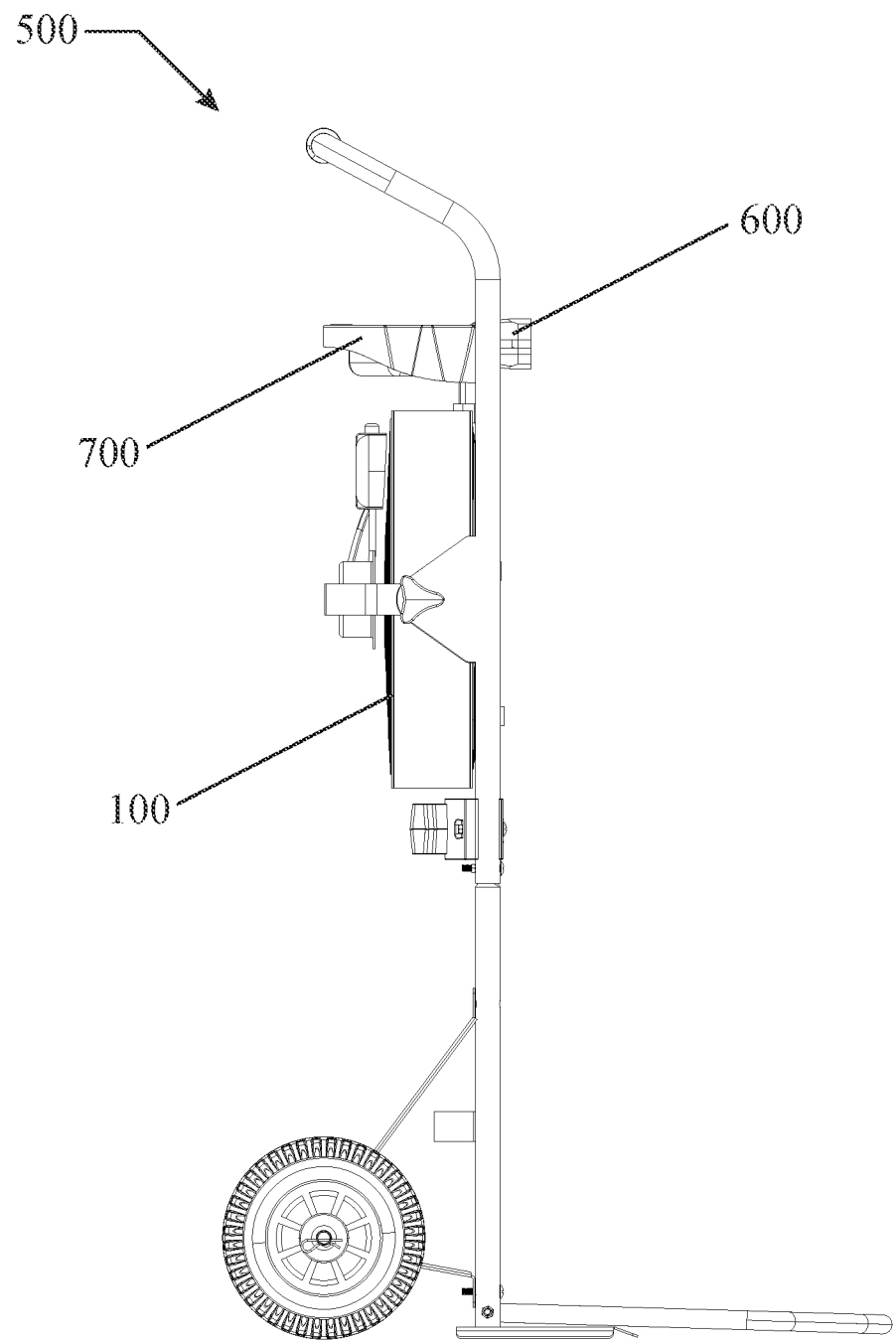

FIG. 26 is a right side view of the hand truck of FIG. 20 with guard rail in down position.

Figure 27:
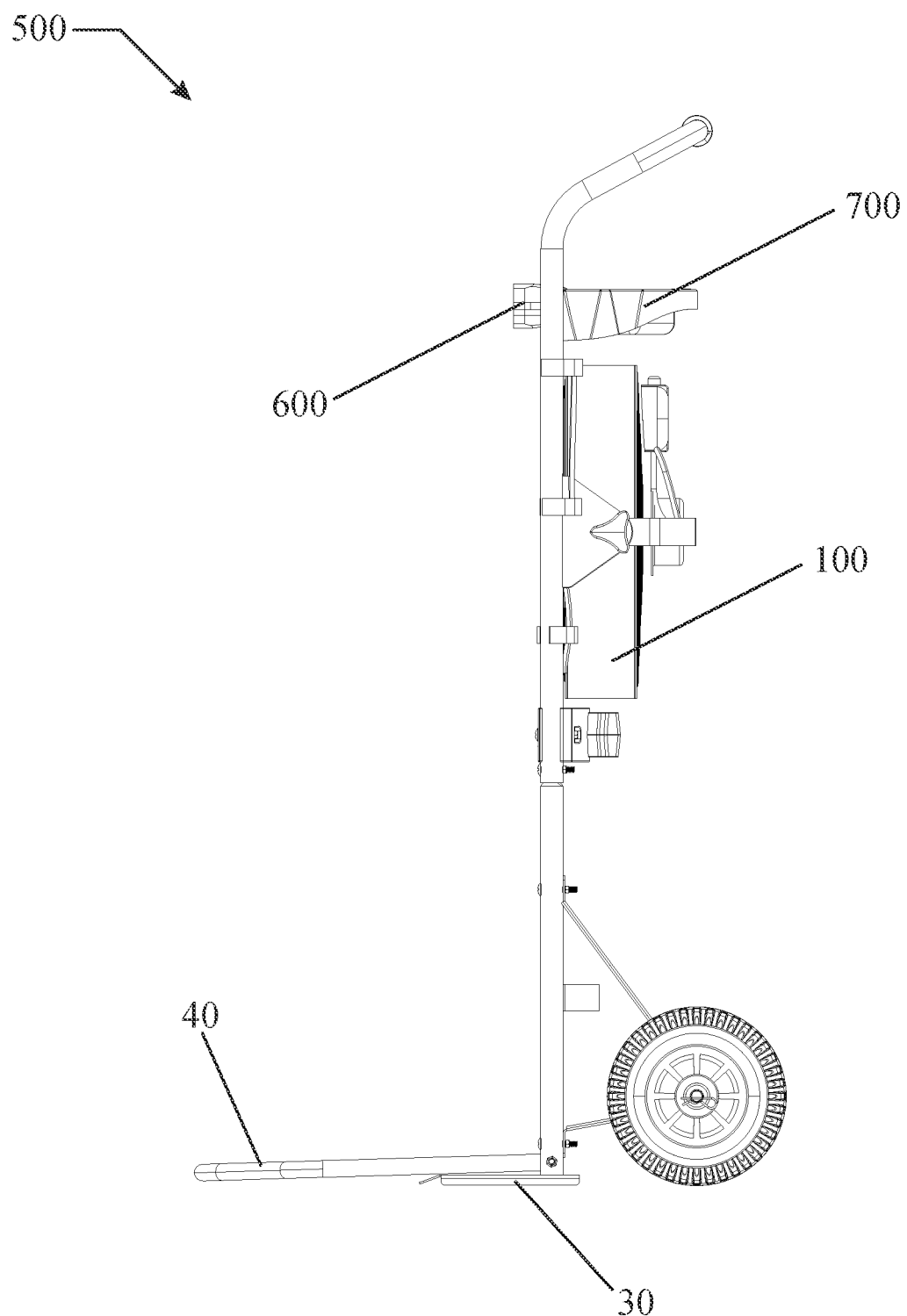

FIG. 27 is a left side view of the hand truck of FIG. 20 with guard rail in down position.

Figure 28:
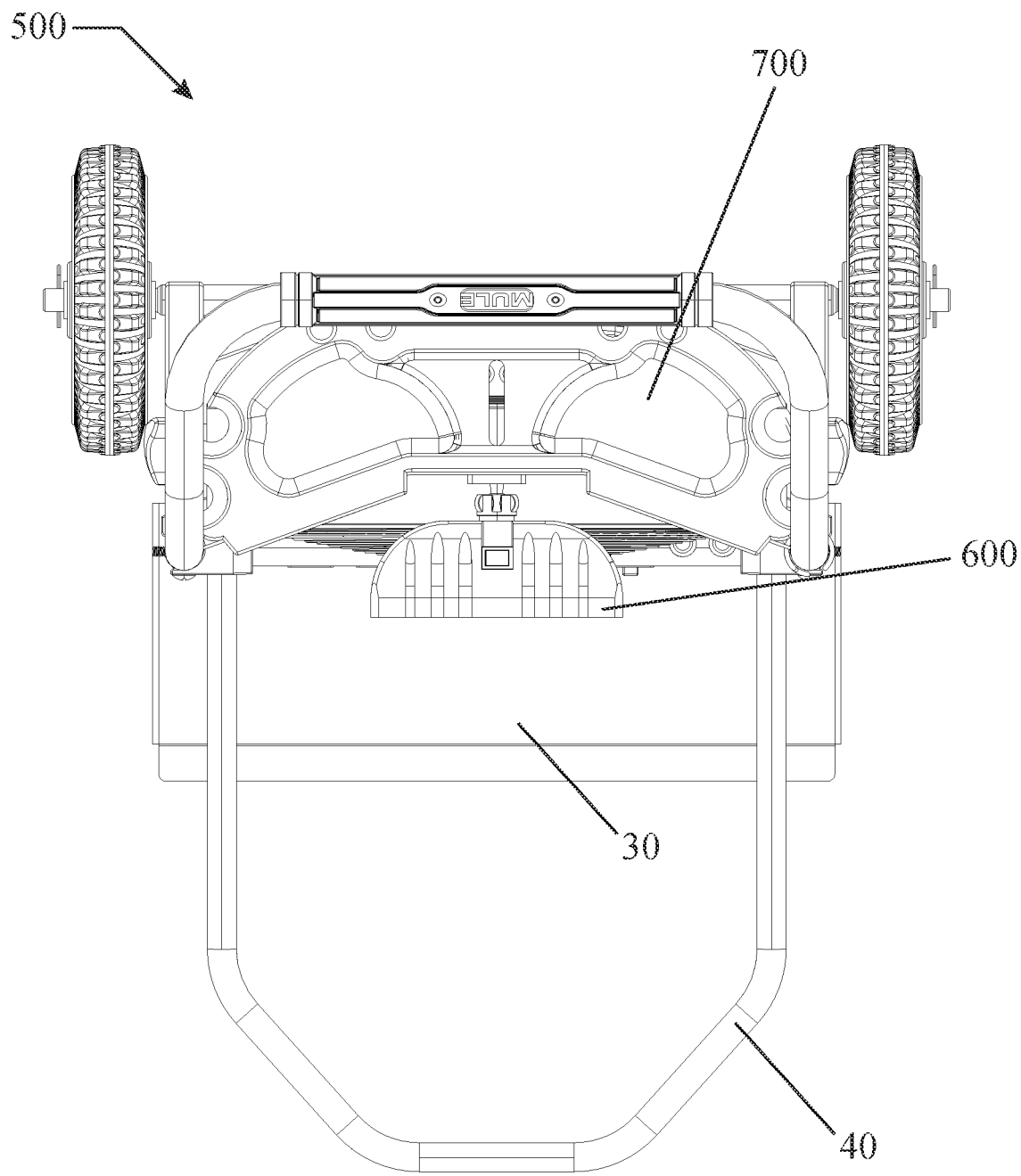

FIG. 28 is a top view of the hand truck of FIG. 20 with guard rail in down position.

Figure 29:
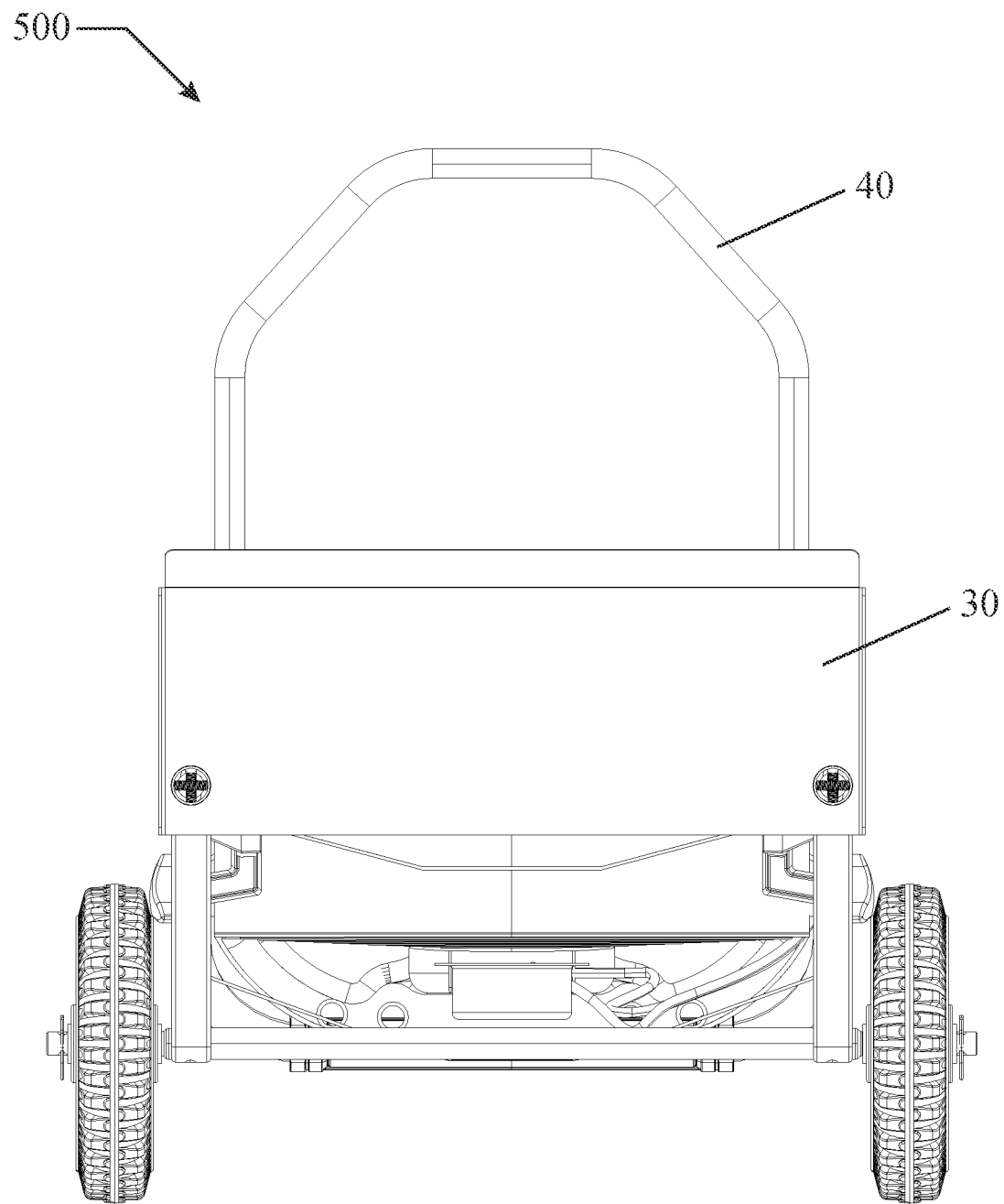

FIG. 29 is a bottom view of the hand truck of FIG. 20 with guard rail in down position.

Figure 30A:
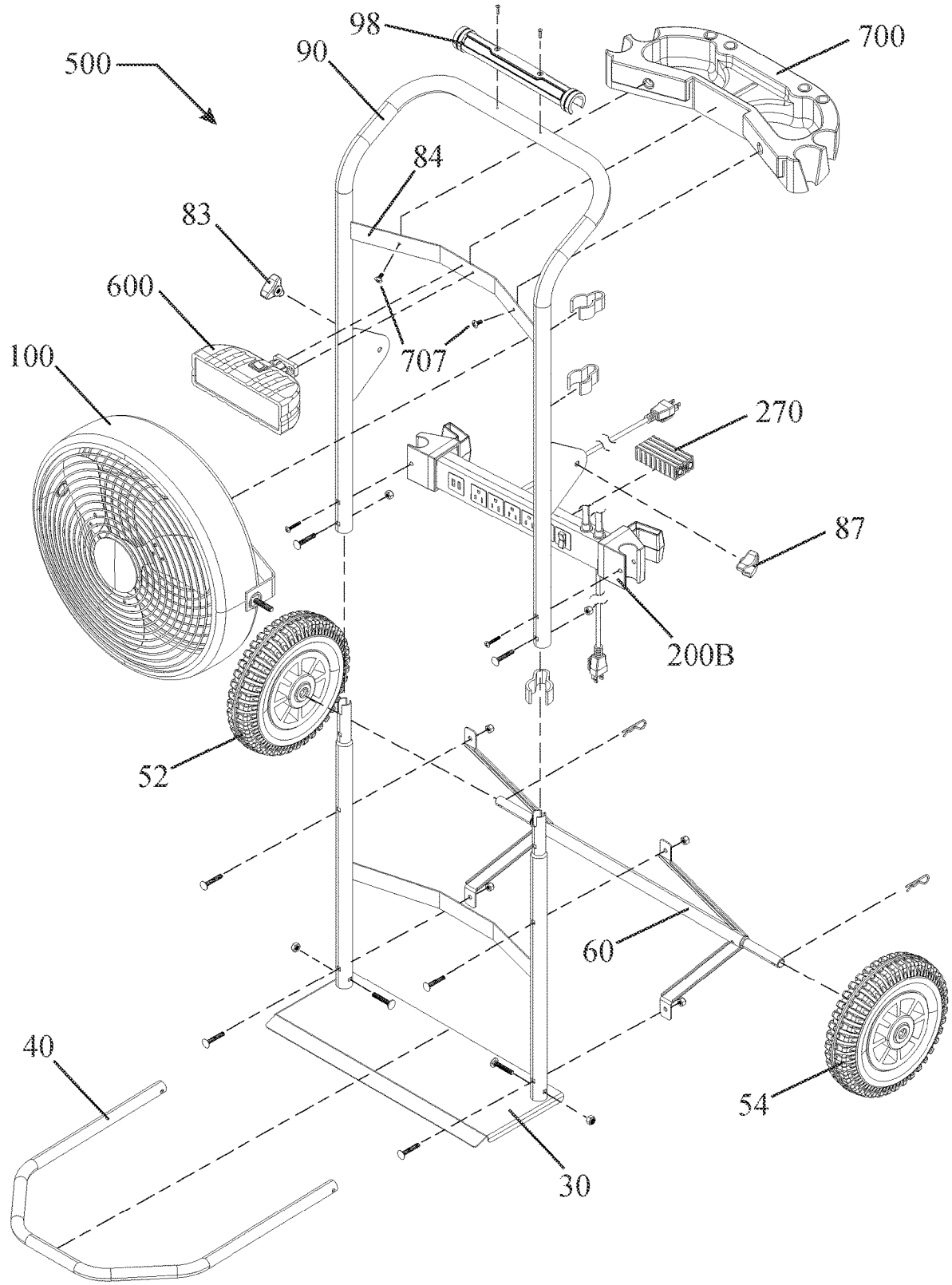

FIG. 30A is an exploded view the hand truck of FIG. 20.

Figure 30B:
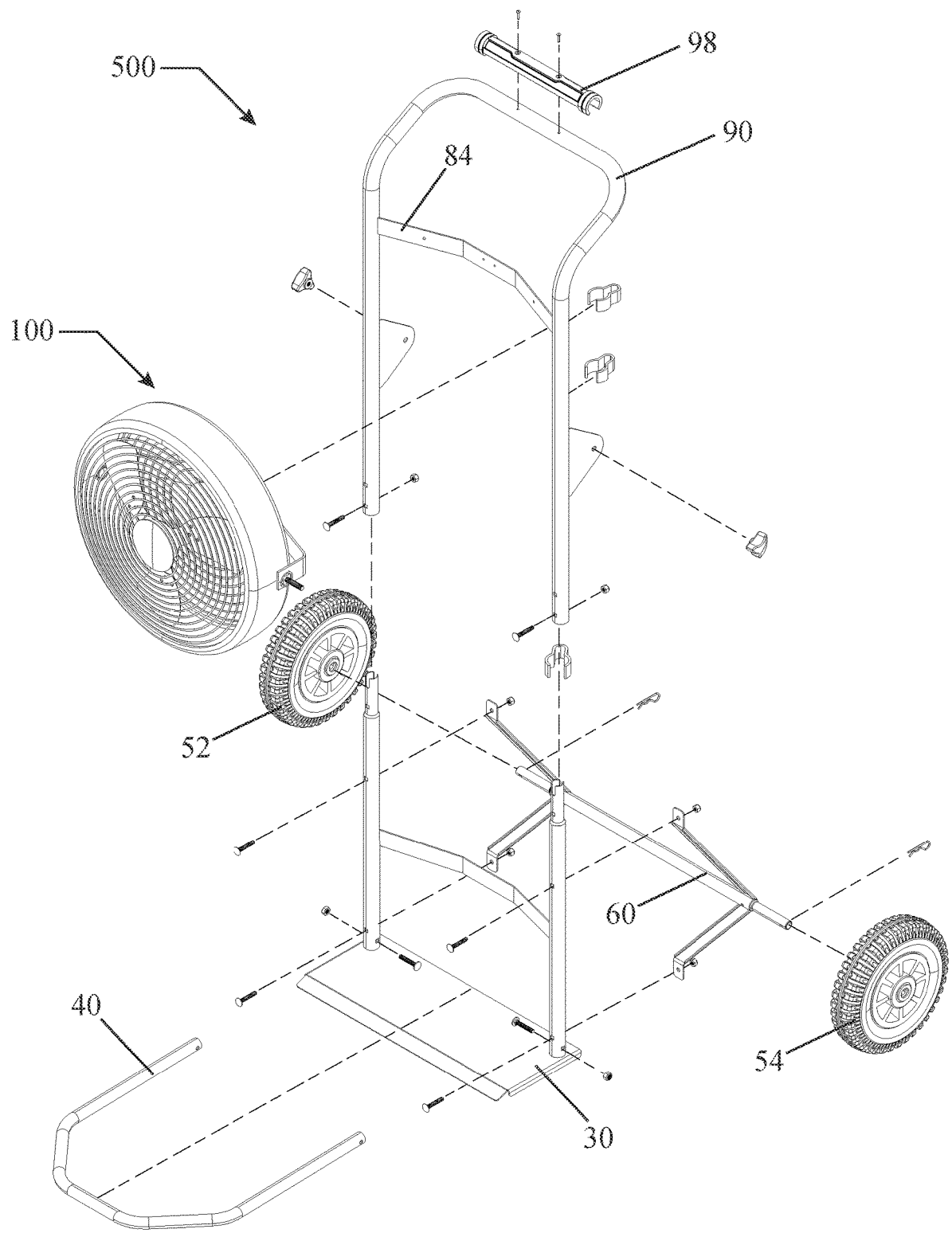

FIG. 30B is an exploded view of the hand truck of FIG. 30A without the tray, light and power strip.

Figure 30C:
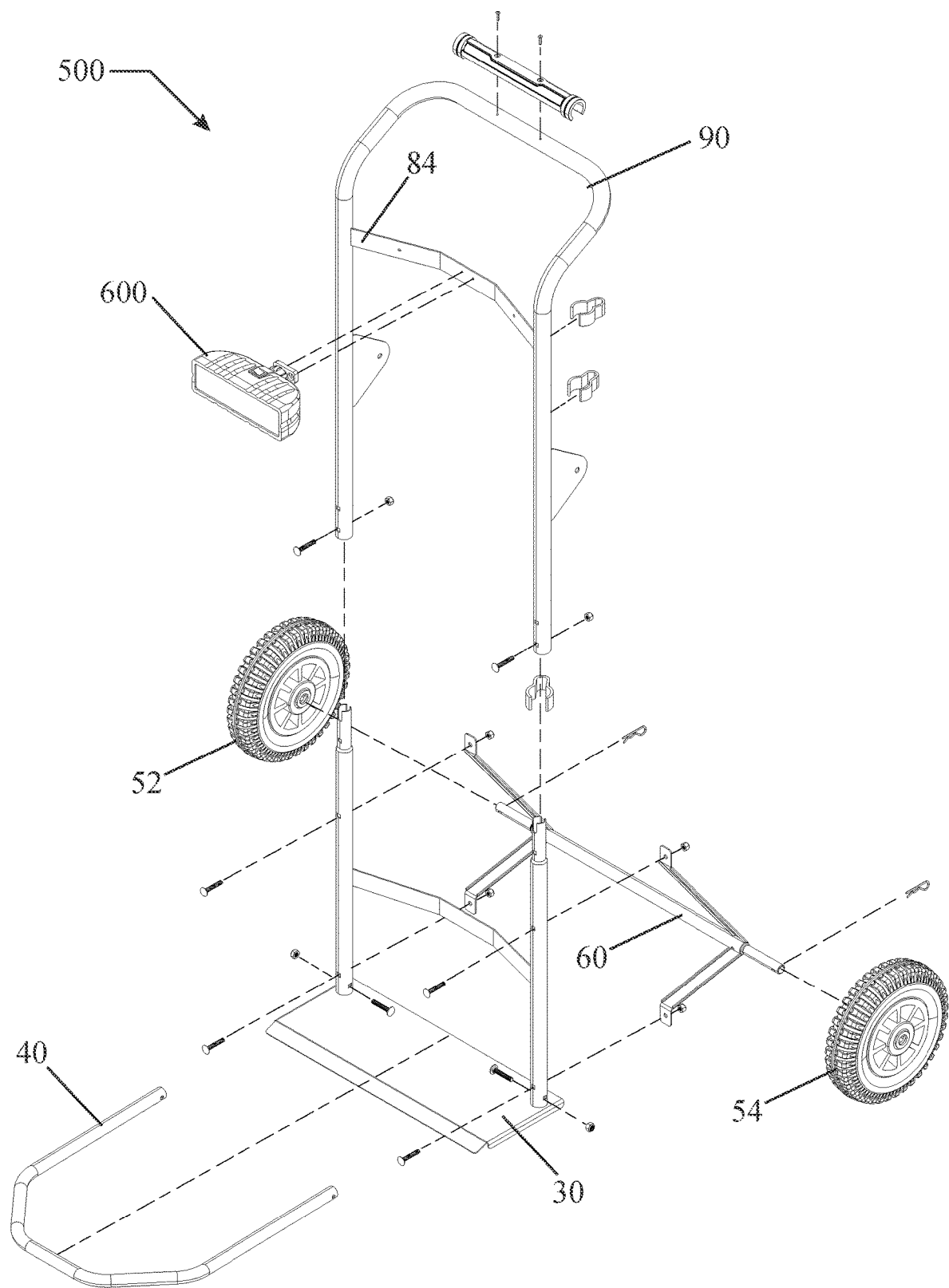

FIG. 30C is an exploded view of the hand truck of FIG. 30A without the tray, fan and power strip.

Figure 30D:
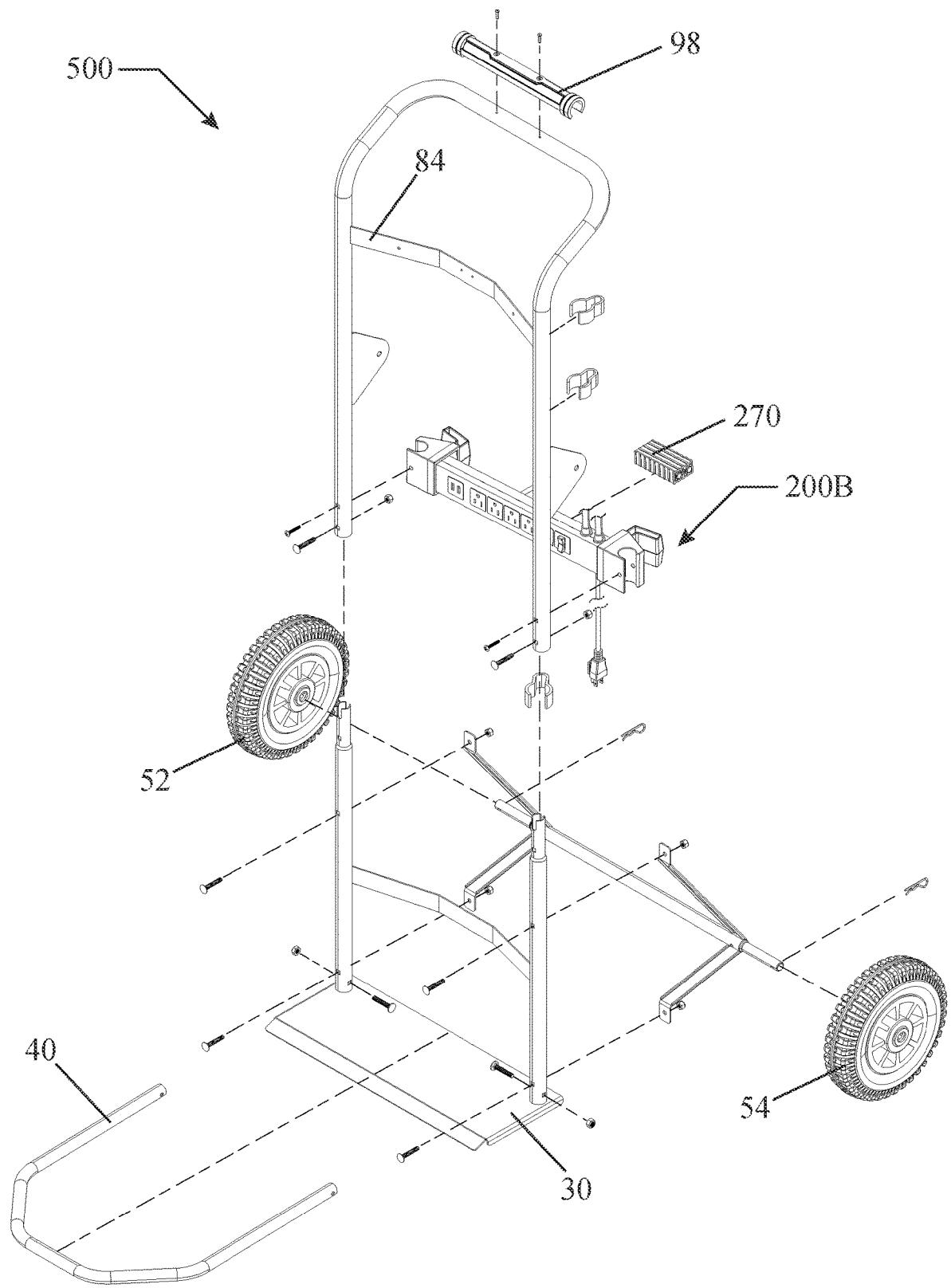

FIG. 30D is an exploded view of the hand truck of FIG. 12A without the tray, light and fan.

Figure 31A:
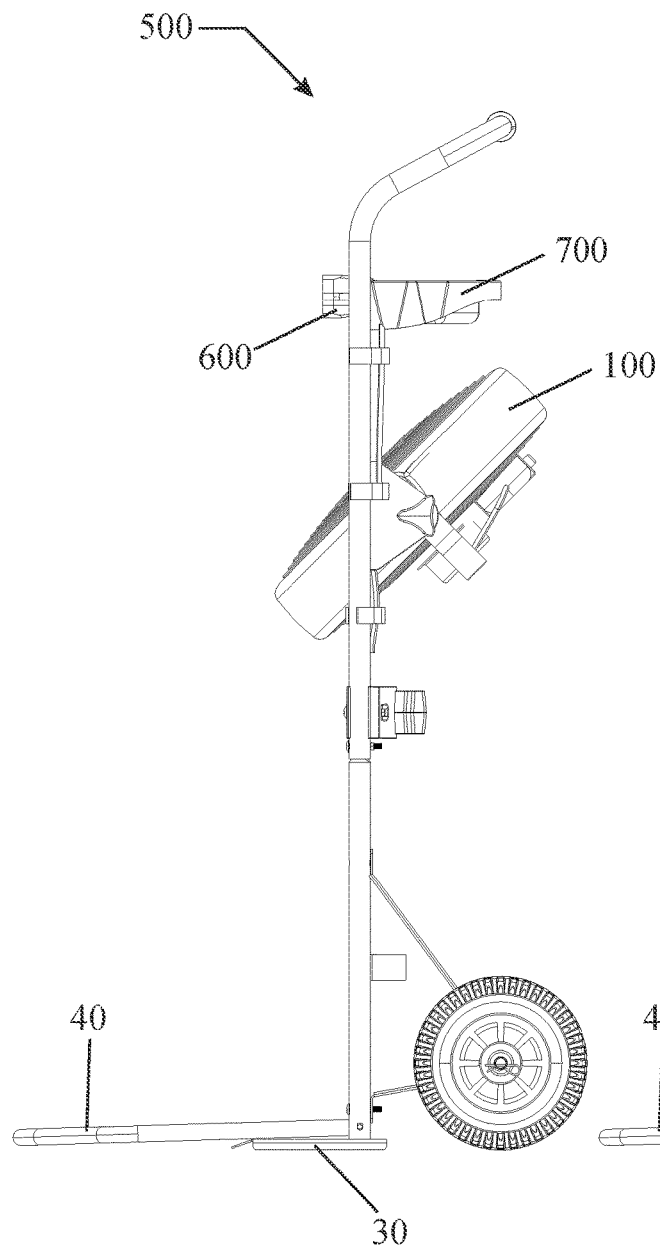

FIG. 31A is another left side view of the useable hand truck of FIG. 27 with the top of the fan tilted backward.

Figure 31B:
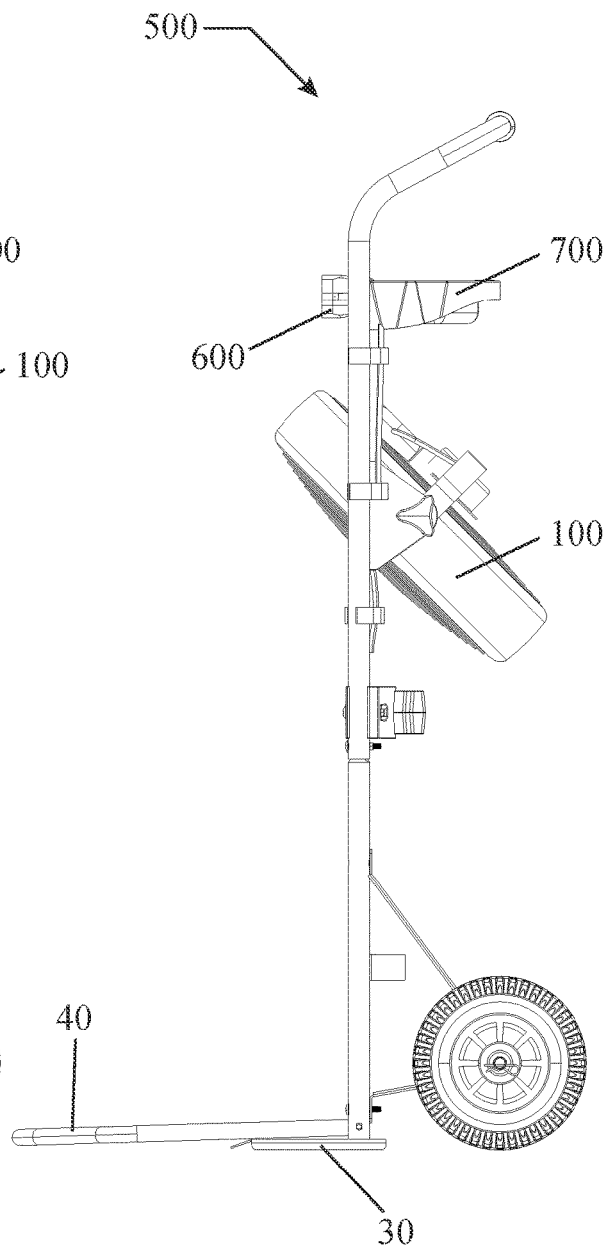

FIG. 31B is another left side view of the useable hand truck of FIG. 27 with the top of the fan tilted forward.

Figure 32A:
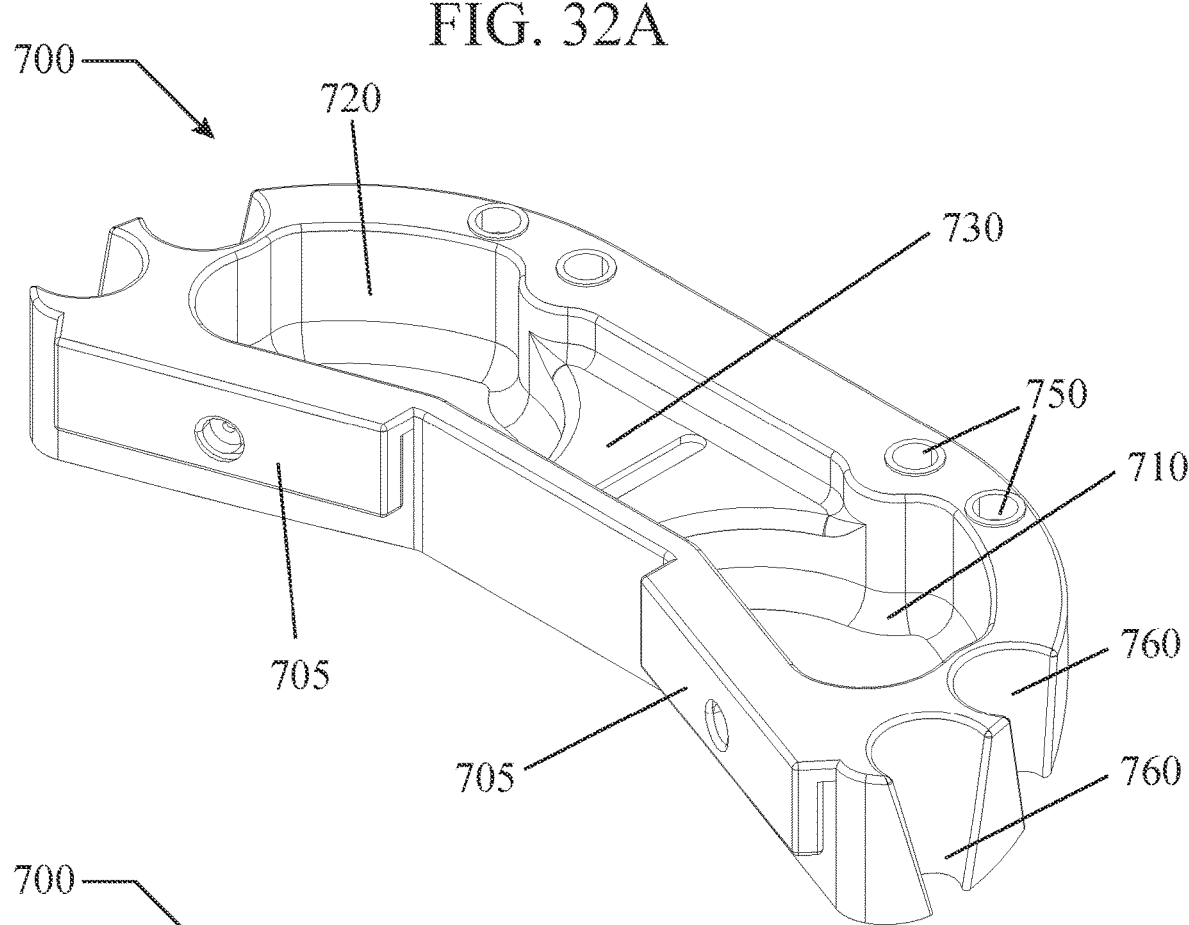

FIG. 32A is an upper perspective view of the tray for the hand truck of FIG. 20.

Figure 32B:
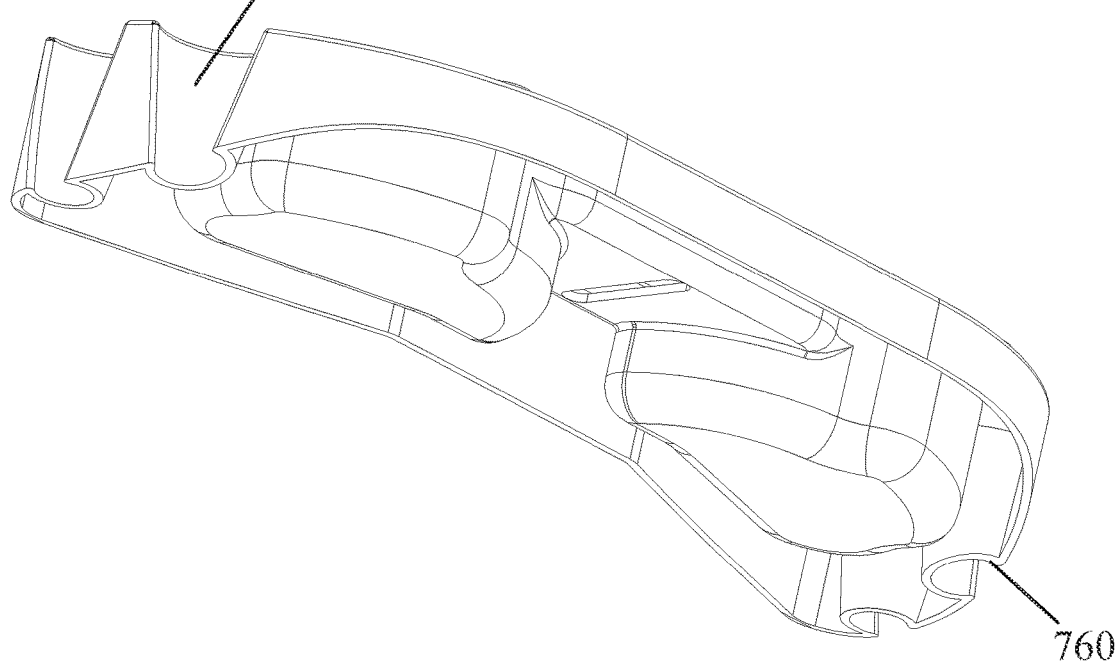

FIG. 32B is a lower perspective view of the tray of FIG. 20A.

Figure 33A:
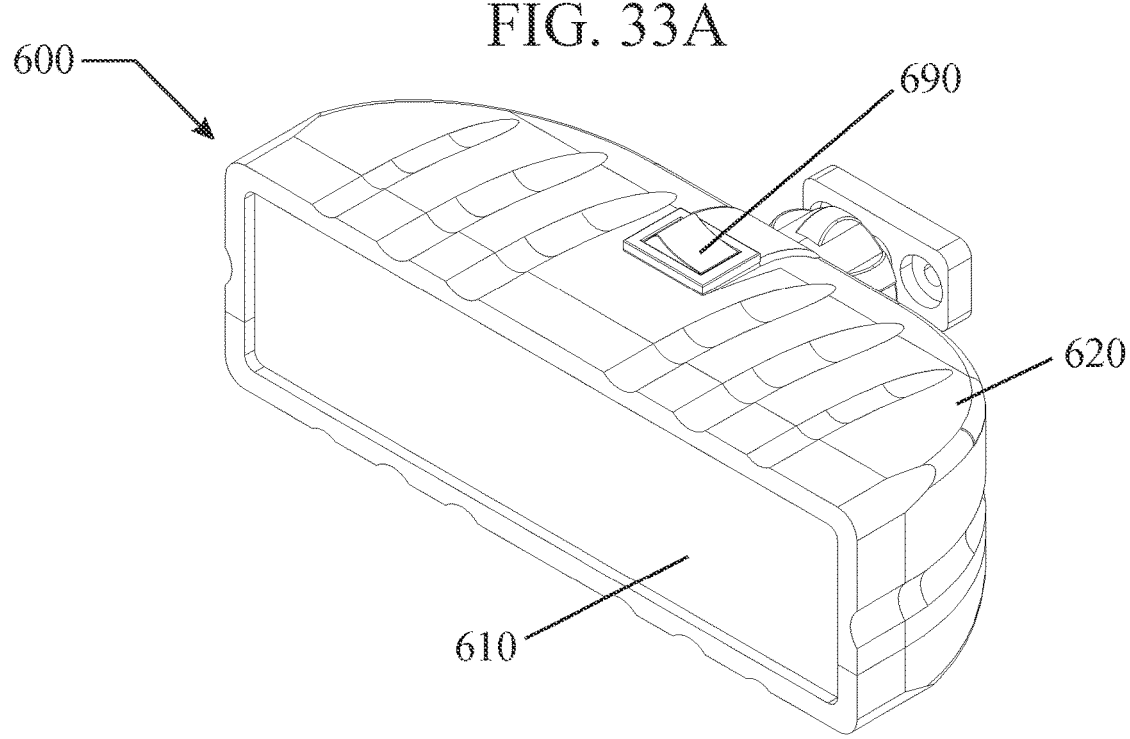

FIG. 33A is an upper front right perspective view of the hand truck light of FIG. 20.

Figure 33B:
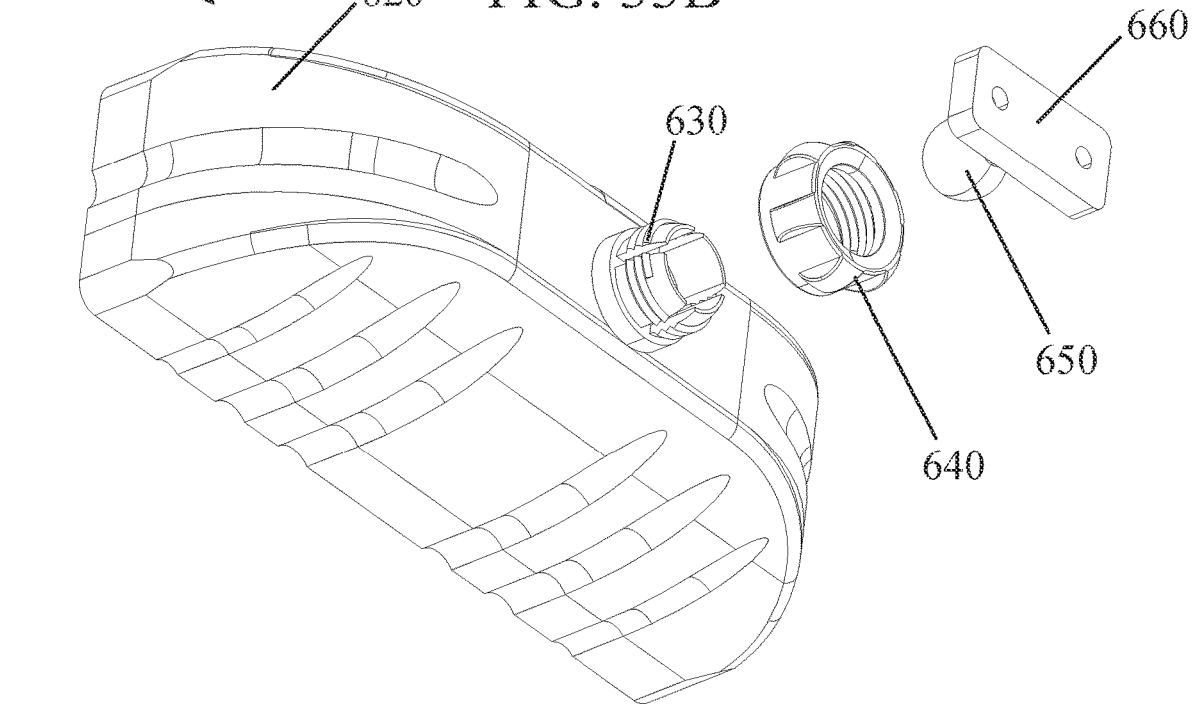

FIG. 33B is a lower rear left exploded perspective view of the light of FIG. 33A.

Figure 33C:
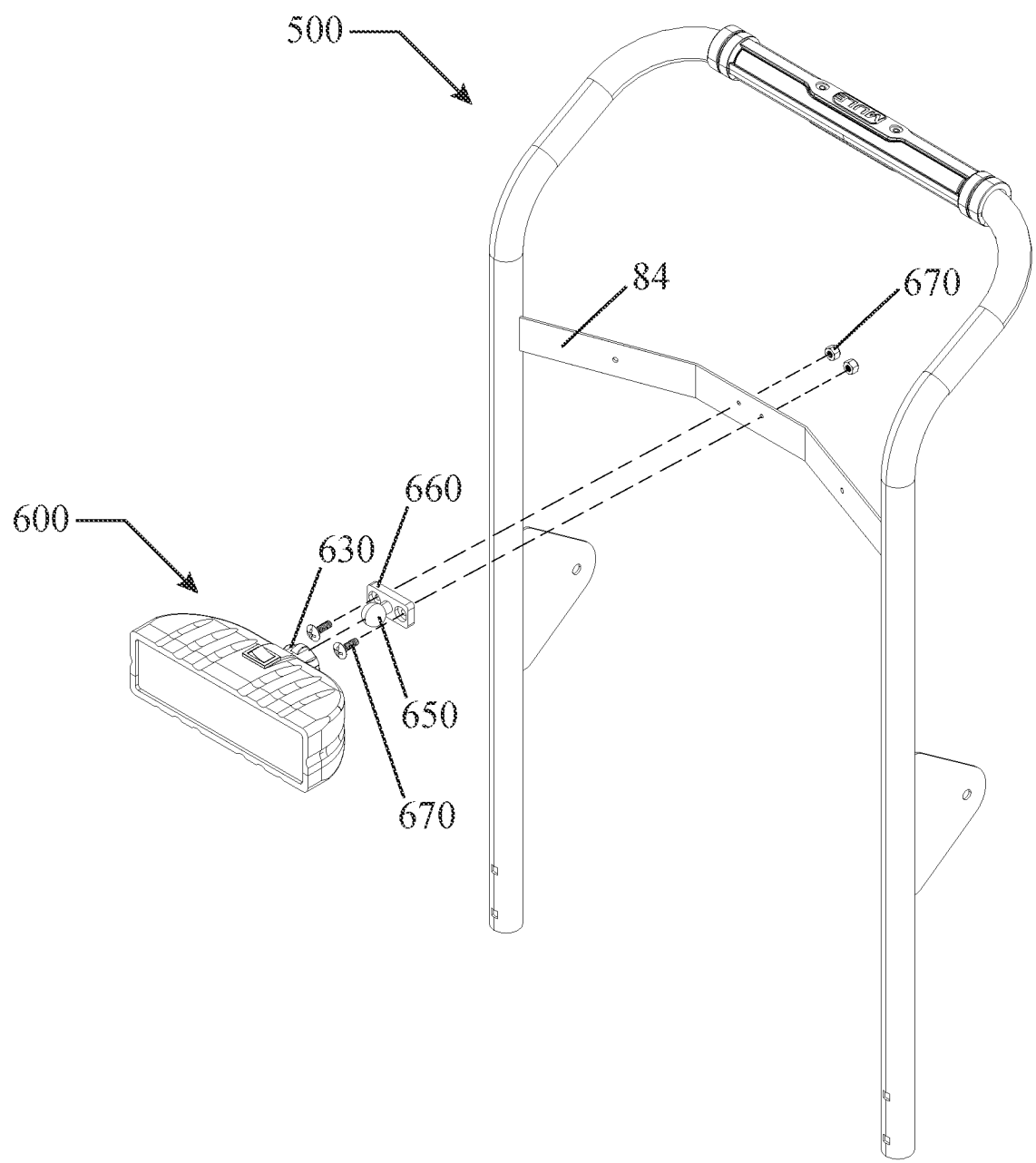

FIG. 33C is a partial exploded view of the light of FIGS. 33A-33B to be attached to the hand truck of the preceding figures.

FIG. 33D is a top view of the hand truck with mounted light of FIGS. 33A-33C showing deflection of the mounted light side to side.

FIG. 33E is a side view of the hand truck with mounted light of FIGS. 33A-33C showing the mounted light pivoting up and down.

Figure 34A:
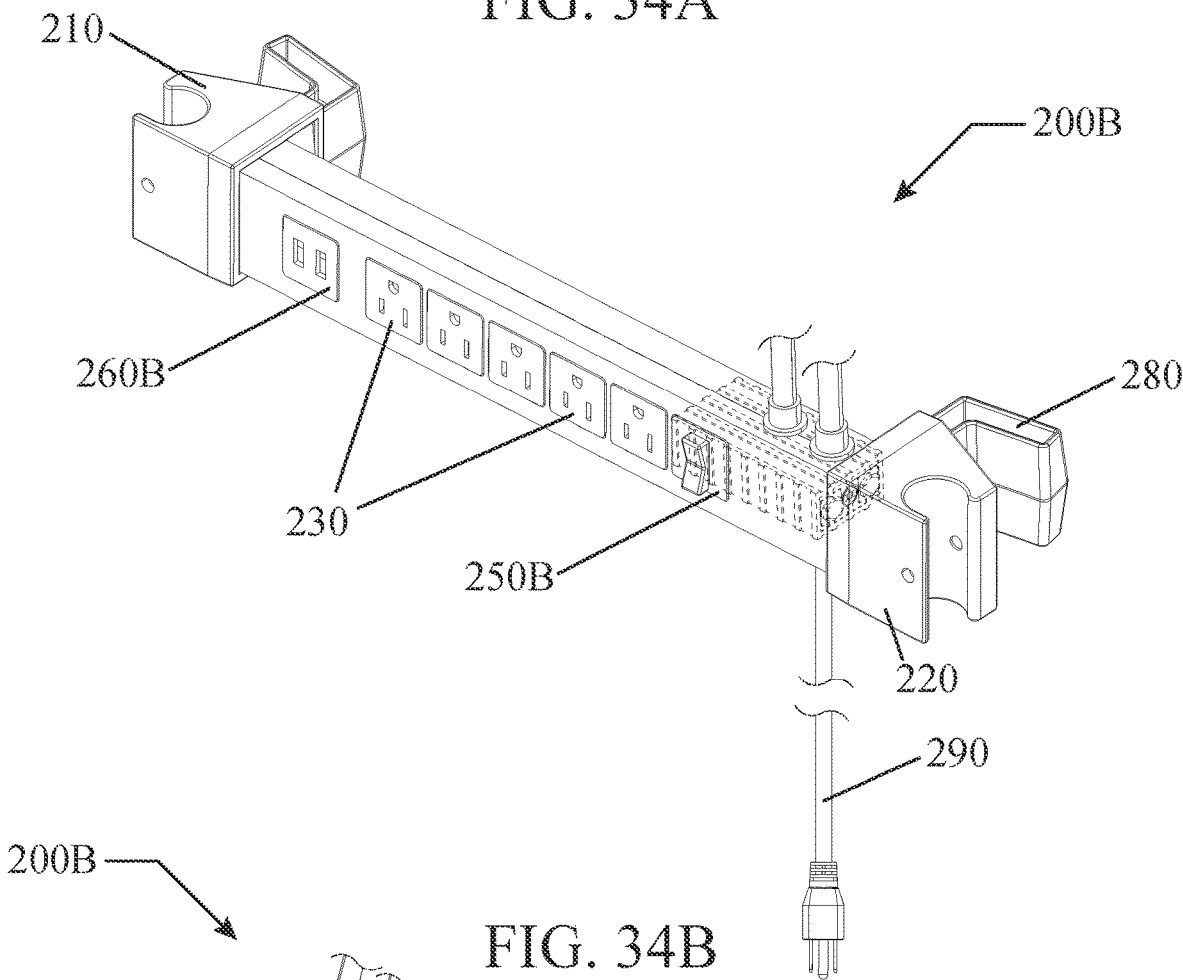

FIG. 34A is an upper front right perspective view of the hand truck power strip of FIG. 20.

Figure 34B:
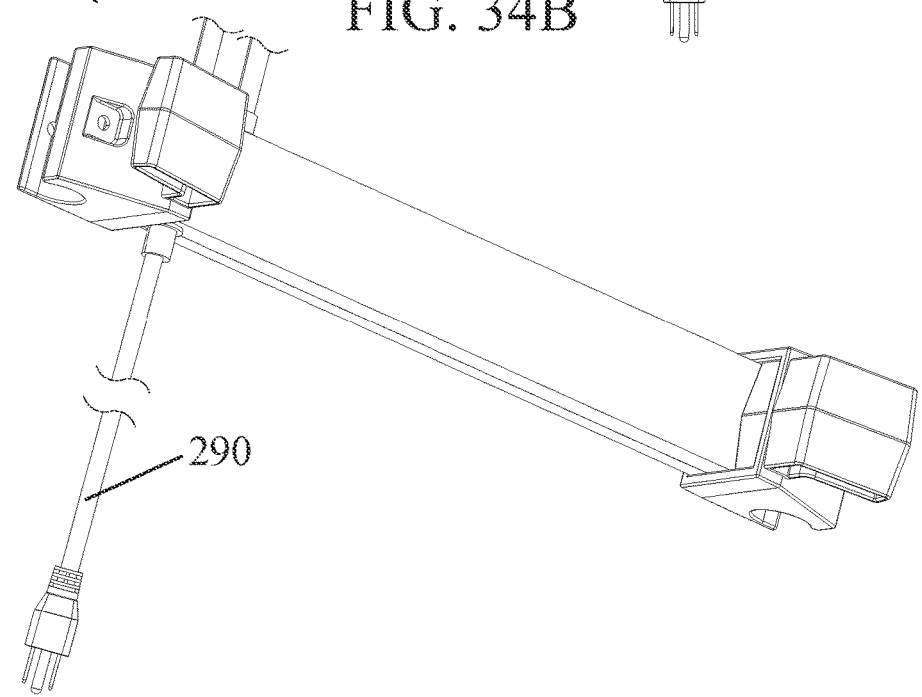

FIG. 34B is a lower front left perspective view of the power strip of FIG. 34A.

Figure 35A:
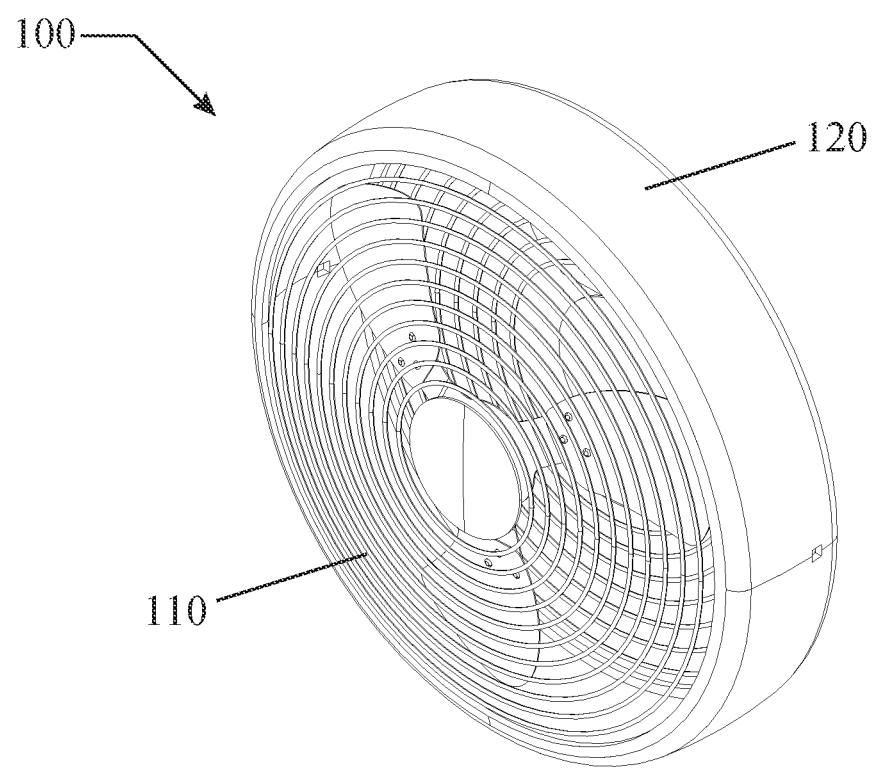

FIG. 35A is an upper front right perspective view of the hand truck fan of FIG. 20 without pivot bracket.

Figure 35B:
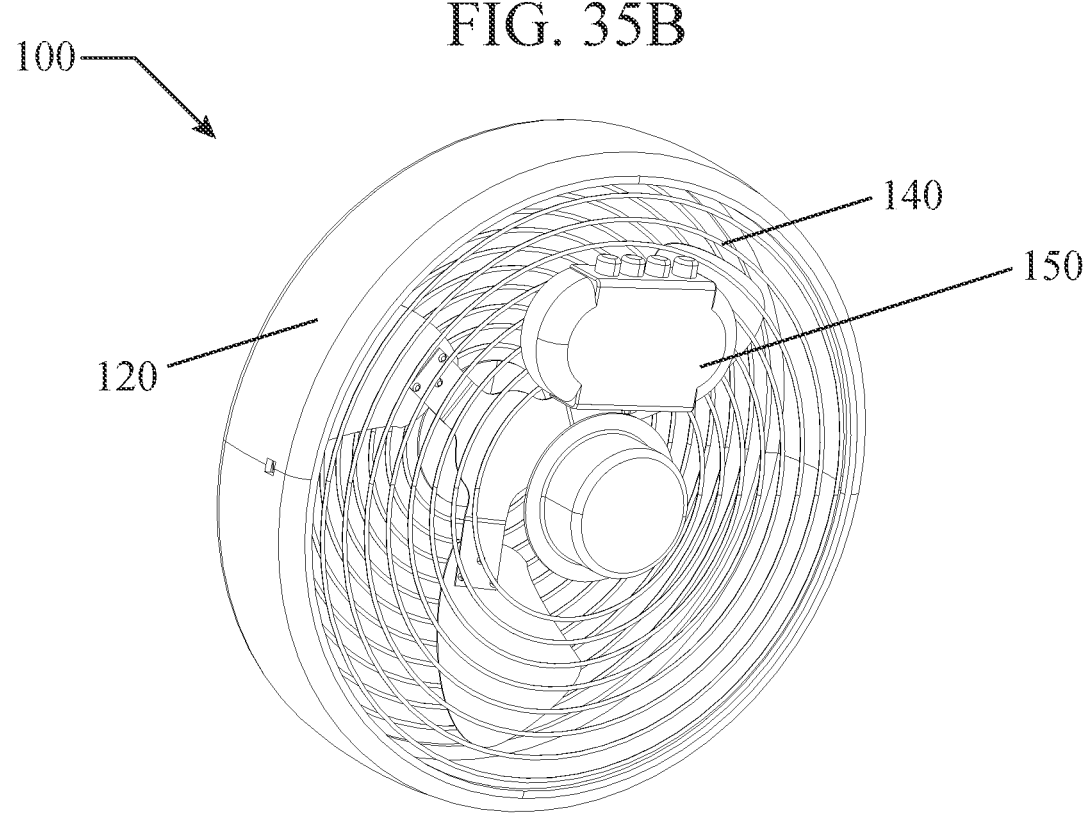

FIG. 35B is a lower rear left perspective view of the fan of FIG. 35A.

Figure 36A:
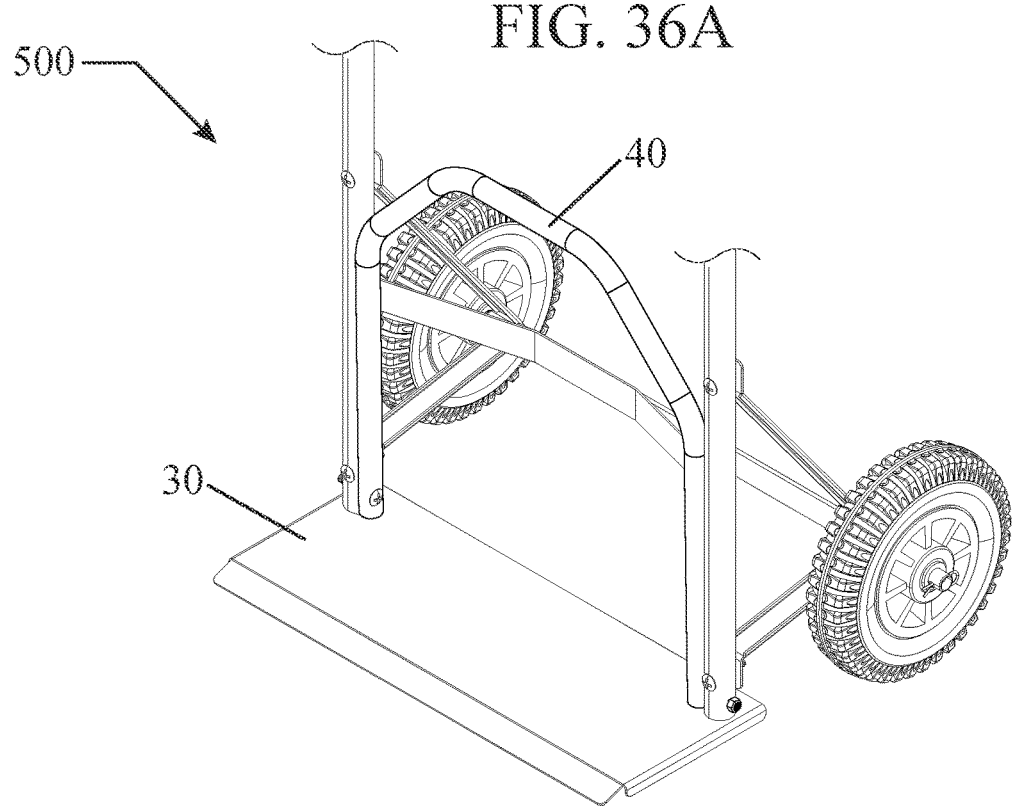

FIG. 36A is a partial lower front perspective view of the hand truck of FIG. 20 with guard rail raised over the lift plate.

Figure 36B:
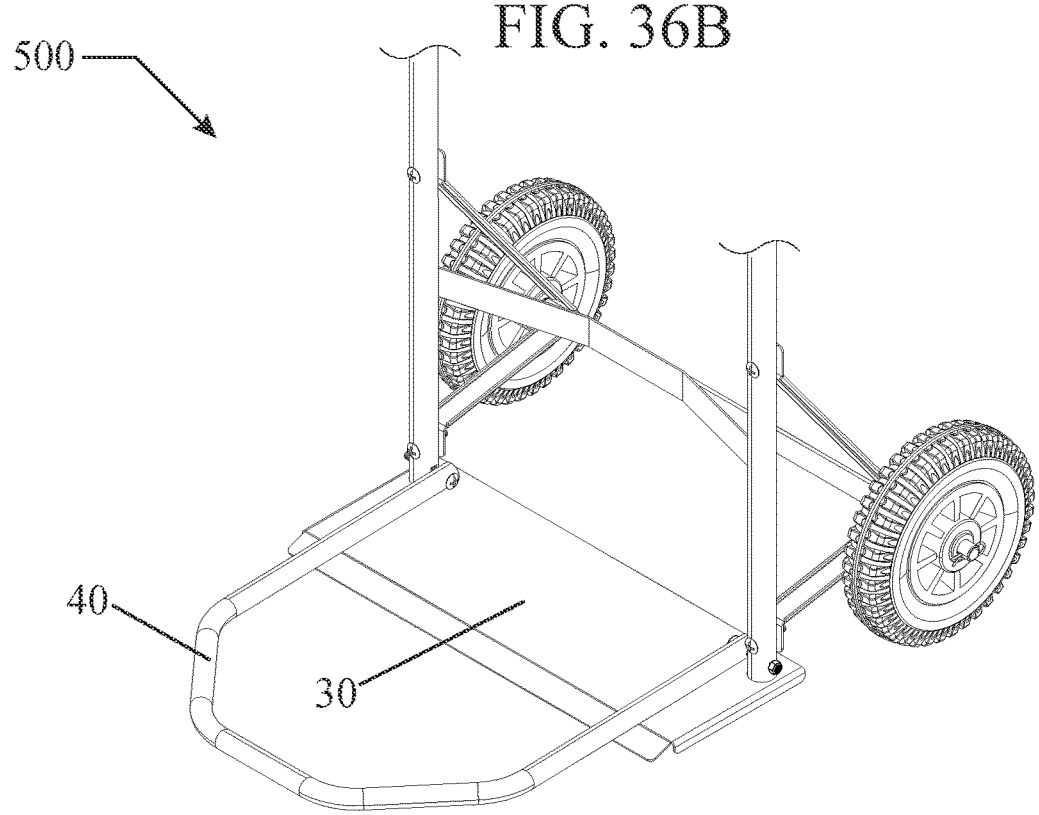

FIG. 36B is a partial lower front perspective view of the hand truck of FIG. 20 with guard rail in a down position on the lift plate.

Figure 37:
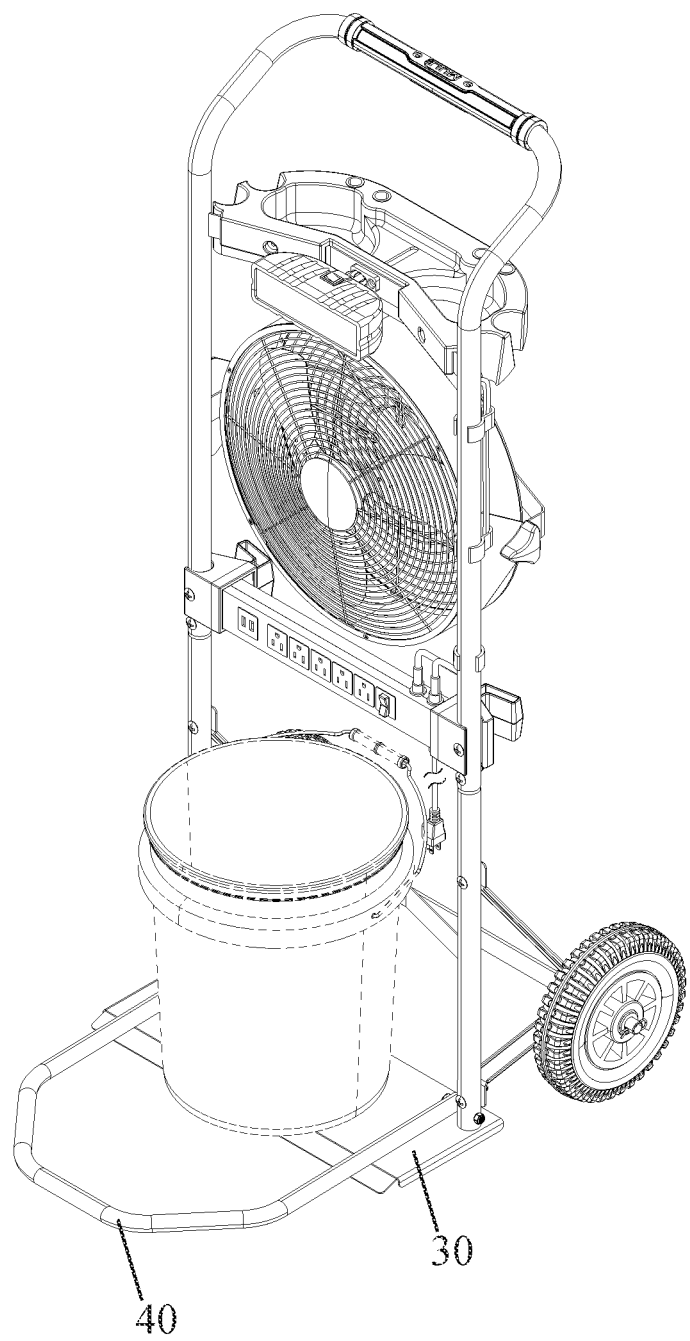

FIG. 37 is another upper front right perspective assembled view of the hand truck of FIG. 20 with a load in the hand truck.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A listing of components will now be described.
1 Assembled Fan Cart First Embodiment
10 left guard plate
12 left guard plate fasteners
14 left guard plate nuts
20 right guard plate
22 right guard plate fasteners
24 right guard plate nuts
30 lift plate
32 lift plate fasteners
34 lift plate nuts
40 pivotal front U-shape guard rail
42 fasteners
44 nuts
52 left wheel
53 cap for left wheel
54 right wheel
55 cap for right wheel
60 axle with threaded ends
62 left lower axle support strut
64 left upper axle support strut
66 right lower axle support strut
68 right upper axle support strut
72 lower left support post
74 lower rear support bracket
76 lower right support post
82 upper left support post
83 left fan bracket
84 upper rear support bracket
86 upper right support post
87 right fan bracket
90 handle with bent left end and bent right end
98 grip sleeve
100 electric fan with rotatable blades
110 front cage
120 shell
130 shell mount bracket with pivot ends
140 rear cage
150 motor
160 fan power cord
172 left side fan rotate knob
174 right side fan rotate knob
200 power strip
200B power strip (second embodiment)
210 left mount bracket/clamp
220 right mount bracket/clamp
230 3 prong plug receptacles
240 clips for power cords
250 power switch
250B power switch for second embodiment power strip 200B
260 USB ports (first embodiment)
260B USB ports (second embodiment)
270 rechargeable battery
290 main power cord to power strip
380 side cord slot(s)
300 longitudinal light with LEDs
302 lens cover
304 rounded back with vents
310 left pivot
320 right pivot
330 on/off switch
340 left knob with inwardly facing screw/bolt
345 nut
350 right knob with inwardly facing screw/bolt
355 nut
400 storage tray
405 tray clips
410 front right tray compartment
420 front left tray compartment
430 rear right tray compartment
440 rear left tray compartment
450 tool slots
460 bungee cord(s)
470 inverted cone slot
500 assembled fan cart second embodiment
600 second embodiment light
610 front lens covering LEDS
620 curved light housing
630 rear mount thread connector
640 rear mount ball socket nut
650 ball
660 mount bracket
670 fasteners (bolts/screws and nuts)
690 on/off switch
700 second embodiment tray
705 tray mount clips
707 fasteners
710 front right tray compartment
720 front left tray compartment
730 central tray compartment
750 tool slots
760 inverted cone slots

FIRST EMBODIMENT

FIG. 1 is an upper front right perspective assembled view of a first embodiment hand truck 1 with an electrical fan 100, power strip 200, a storage tray 400, rotatable electrical LED (light emitting diodes) light 300 with pivotal front guard rail 40 in upright position.

FIG. 2 is an upper front left perspective view of the hand truck 1 of FIG. 1 with pivotal front guard rail 40 in a down position. FIG. 3 is a lower front right perspective view of the hand truck 1 of FIG. 2. FIG. 4 is a lower front left perspective view of the hand truck 1 of FIG. 2.

FIG. 5 is an upper rear left perspective view of the hand truck 1 of FIG. 2.

FIG. 6 is a front view of the useable hand truck 1 of FIG. 1. FIG. 7 is a rear view of the useable hand truck 1 of FIG. 1.

FIG. 8 is a right side view of the hand truck 1 of FIG. 1. FIG. 9 is a left side view of the hand truck of FIG. 1.

FIG. 10 is a top view of the hand truck 1 of FIG. 1. FIG. 11 is a bottom view of the hand truck 1 of FIG. 1.

FIG. 12A is an exploded view of the hand truck 1 of FIG. 1.

FIG. 12B is an exploded view of the hand truck 1 of FIG. 12A without the tray 400, light 300 and power strip 200.

FIG. 12C is an exploded view of the hand truck 1 of FIG. 12A without the tray 400, fan 100 and power strip 200.

FIG. 12D is an exploded view of the hand truck 1 of FIG. 12A without the fan 100, light 300 and power strip 200.

FIG. 12E is an exploded view of the hand truck 1 of FIG. 12A without the fan 100, light 300 and tray 400.

FIG. 13A is another left side view of the useable hand truck 1 of FIG. 9 with the top of the fan 100 tilted backward. FIG. 13B is another left side view of the useable hand truck 1 of FIG. 9 with the top of the fan 100 tilted forward.

Referring to FIGS. 1-13B, the hand truck 1 can include a left guard plate 10 attached to a lower left support post 72 by fasteners 12 and nuts, a right guard plate 20 attached is a lower right support post 76 by fasteners 22 and nuts 24. A horizontal lift plate 30 can be attached to the bottom of the support posts 72 and 76.

A pivotal front U-shape guard rail can have ends pivotally attached to the lower support posts 72 and 76 by fasteners 42 and nuts 44.

An axle 60 with threaded ends can support a left wheel 52 and right wheel 54 thereon. Caps 53 and 55 can lock the left wheel 52 and right wheel 54 to the threaded ends of the axle 60. The axle 60 can be attached to the lower left support post 72 by a left lower axle support strut 62 and left upper axle support strut 64 with respective fasteners and nuts. The axle 60 can be attached to the lower right support post 76 by a right lower axle support strut 66 and a right upper axle support post 68.

A frame for the hand truck 1 can be formed from a lower left support post 72 having an upper end telescoping into a lower end of an upper left support post 82, and a lower right support post 76 having an upper end telescoping into a lower end of an upper right support post 86. A lower rear support bracket 74 can attach the lower left support post 72 to the lower right support post 76. An upper rear support bracket 84 can attach the upper left support post 82 to the upper right support post 86.

A handle 90 with bent left end bent right end can be attached to the top of upper left support post 82 and upper right support post 86. A grip sleeve 98 can be attached to the horizontal portion of the handle 90 with respective fasteners.

STORAGE TRAY 400

FIG. 14A is an upper perspective view of the tray 400 for the hand truck 1 of FIG. 1. FIG. 14B is a lower perspective view of the tray 400 of FIG. 14A.

Referring to FIGS. 1-9, 12A, 12D, and 14A-14B, the storage tray 400 can include three front end clips 405 that can attach the tray to the top edge of upper rear support bracket 84, so that tray 400 hangs rearwardly from the rear support bracket 84

Tray 400 can include a front right tray compartment 410, front left tray compartment 420, rear right tray compartment 430, rear left tray compartment 440, and generally circular tool slots 450 for holding tools, such as but not limited to screw drivers, hammers, pliers, and the like, therein. Bungee types cords 460 and other tools can be held within inverted cone slots 470.

LIGHT 300

FIG. 15A is an upper front right perspective view of the hand truck light 300 of FIG. 1. FIG. 15B is a lower rear left perspective view of the light 300 of FIG. 15A.

Referring to FIGS. 1-9, 12A, 12C, 15A, 15B, longitudinal light 300 can include a front lens cover 302 that covers a plurality of LEDs (light emitting diodes), and a rounded back cover 304 with vents. A left pivot socket 310 can be on a left side, and a right pivot socket 320 can be on a right side of the light 300. A left light turn knob 340 with inwardly facing screw/bolt can pass through a through-hole on the left bent end of the handle 90 with a nut 345 to hold the left side in place. A right light turn knob 350 with inwardly facing screw/bolt can pass through a through-hole in the right bent end of handle 90 with a nut 355 to hold the right side in place.

Turning the knobs 340, 350 allows the light to rotate and direct light forward, above and rearward from the hand truck 1. An on/off switch 330 can be used to turn the light 300 on and off. The light 300 can be battery powered. Alternatively, the light 300 can be connected to the power strip 200 by a plug and the like, to supply power to the light 300.

POWER STRIP 200

FIG. 16A is an upper front right perspective view of the hand truck power strip 200 of FIG. 1. FIG. 16B is a lower front left perspective view of the power strip 200 of FIG. 16A.

Referring to FIGS. 1-9, 12A, 12E, 16A and 116B, the power strip 200 can include a left mount bracket/clamp 210 to attach to the upper left support post 82, and a right mount bracket/clamp 220 to attach to the upper right support post 86.

Power strip 200 can include 3 prong plug receptacles 230, USB port(s) 260 with a power switch 250 to turn power on and off to the power strip 200. The power strip 200 can be supplied with power from a rechargeable battery 270 and/or a main power cord 290 for allowing it to be plugged into an external outlet for power. Side cord slots 280 can be used to hold cords, thereon. Clips 240 can be used to hold power cords to the frame of the fan cart.

FAN

FIG. 17A is an upper front right perspective view of the hand truck fan 100 of FIG. 1 without pivot bracket. FIG. 17B is a lower rear left perspective view of the fan 100 of FIG. 17A.

Referring to FIGS. 1-9, 12A, 12B, 12C, 12E, 13A, 13B, 17A and 17B, the electric fan with rotatable blades 100 can include a front cage 110, rear cage 140 and shell 120 therebetween. A motor 150 can turn the internal rotatable blades and be powered by a power cord (160) not shown that can be plugged into the power strip 200. A U-shaped shell mount bracket 130 with outwardly extending screw(s)/bolt(s) (pivot ends) can be attached to a left fan bracket 83 and a right fan bracket 87 and held in place by a left side rotate knob 172 and a right side rotate knob 174. Knobs 172, 174 can be used to rotate the fan 100 to tilt the top of the fan 100 forward to the top of the fan 100 tilted backward.

FIG. 18A is a partial lower front perspective view of the hand truck 1 of FIG. 1 with guard rail 40 raised over the lift plate 30. FIG. 18B is a partial lower front perspective view of the hand truck 1 of FIG. 2 with guard rail 40 in a down position on the lift plate 30.

FIG. 19 is another upper front right perspective assembled view of a hand truck 1 of FIG. 1 with a load in the hand truck.

Referring to FIGS. 1-9, 12A-12E, 18A-19, a load 99 can be supported by the lift plate 30 and held on the hand truck 1 by a lowered guard rail 40.

SECOND EMBODIMENT

FIG. 20 is an upper front right perspective assembled view of a second embodiment hand truck 500 with an electrical fan 100, power strip 200, second embodiment tray 700, second embodiment light 600 with pivotal front guard rail 40 in a down position.

FIG. 21 is an upper front left perspective view of the hand truck 500 of FIG. 20 with pivotal front guard rail 40 in a down position.

FIG. 22 is a lower front right perspective view of the hand truck 500 of FIG. 20. FIG. 23 is a lower front left perspective view of the hand truck 500 of FIG. 20.

FIG. 24 is a front view of the hand truck 500 of FIG. 20. FIG. 25 is a rear view of the hand truck 500 of FIG. 20 with guard rail 40 in up position. FIG. 26 is a right side view of the hand truck 500 of FIG. 20 with guard rail 40 in down position. FIG. 27 is a left side view of the hand truck 500 of FIG. 20 with guard rail 40 in down position.

FIG. 28 is a top view of the hand truck 500 of FIG. 20 with guard rail in down position. FIG. 29 is a bottom view of the hand truck 500 of FIG. 20 with guard rail 40 in down position.

FIG. 30A is an exploded view the hand truck 500 of FIG. 20. FIG. 30B is an exploded view of the hand truck 500 of FIG. 30A without the tray 700, light 600 and power strip 200. FIG. 30C is an exploded view of the hand truck 500 of FIG. 30A without the tray 700, fan 100 and power strip 200. FIG. 30D is an exploded view of the hand truck 500 of FIG. 30A without the tray 700, fan 100 and the light 600.

FIG. 31A is another left side view of the useable hand truck 500 of FIG. 27 with the top of the fan 100 tilted backward. FIG. 31B is another left side view of the useable hand truck of FIG. 27 with the top of the fan tilted forward.

Referring to FIGS. 20-31B, the second embodiment of the hand truck 500 includes the same components as the first embodiment hand truck 1 referenced in the preceding figures, with a different light 600, and tray 700. In addition, the second embodiment hand truck 500 does not include the left guard plate and the right guard plate used in the first embodiment.

SECOND EMBODIMENT TRAY 700

FIG. 32A is an upper perspective view of the tray 700 for the hand truck 500 of FIG. 20. FIG. 32B is a lower perspective view of the tray 700 of FIG. 20A.

Referring to FIGS. 20-30A, the tray 700 can include
705 tray mount clips 705, fasteners 707 for attaching the front of the tray 700 to upper rear support bracket 84. Tray 700 can include a front right tray compartment 710, front left tray compartment 720,
730 central tray compartment 730, tool slots 750 and inverted cone slots 760 similar to those in the first embodiment tray 400

SECOND EMBODIMENT LIGHT 600

FIG. 33A is an upper front right perspective view of the hand truck light 600 of FIG. 20. FIG. 33B is a lower rear left exploded perspective view of the light 500 of FIG. 33A.

FIG. 33C is a partial exploded view of the light 600 of FIGS. 33A-33B to be attached to the hand truck 500 of the preceding figures.

FIG. 33D is a top view of the hand truck 500 with mounted light 600 of FIGS. 33A-33C showing deflection of the mounted light 600 side to side.

FIG. 33E is a side view of the hand truck 500 with mounted light 600 of FIGS. 33A-33C showing the mounted light 600 pivoting up and down.

Referring to FIGS. 20-30A, 30C, and 33A-33E, the light 600 can include a lens cover 610 over a plurality of LEDs (light emitting diodes), and a curved housing 620. Extending rearwardly from the curved housing 620 can be a rear mount thread connector 630. A mount ball socket nut 640 can hold a ball 650 that is mounted to a mount bracket 660. The mount bracket 660 can be attached to upper rear support bracket 84 on the hand truck 500 with fasteners 670, which can include bolts/screws and nuts. An on/off switch 690 allows for the light to be switched on and off. The ball 650 allows the mounted light 600 to pivot to a left side and to pivot to a right side, and to pivot up and to pivot down, all relative to the upper rear support bracket 84 on the hand truck 500.

The light 600 can be battery powered. Alternatively, the light 600 can be connected to the power strip 200B by a plug and the like, to supply power to the light 600.

FIG. 34A is an upper front right perspective view of the hand truck power strip 200B of FIG. 20 for the second embodiment. FIG. 34B is a lower front left perspective view of the power strip 200 of FIG. 34A. The power strip 200B is similar to the power strip 200 and mounts similarly to the power strip 200 in the first embodiment hand truck 1. The second embodiment power strip 200B locates the on/off switch 250B on the front of the power strip 200B, and locates USB ports 260B to the left face of the power strip 200B.

FIG. 35A is an upper front right perspective view of the hand truck fan 100 of FIG. 20 without pivot bracket. FIG. 35B is a lower rear left perspective view of the fan 100 of FIG. 35A. The fan 100 is similar to fan 100 and mounts similarly to the fan 100 in the first embodiment hand truck 1.

FIG. 36A is a partial lower front perspective view of the hand truck 500 of FIG. 20 with guard rail 40 raised over the lift plate 30. FIG. 36B is a partial lower front perspective view of the hand truck 500 of FIG. 20 with guard rail 40 in a down position on the lift plate 30. FIG. 37 is another upper front right perspective assembled view of the hand truck 500 of FIG. 20 with a load in the hand truck 500 and guard rail 40 down.

The hand truck allows the user to be able to use the lift plate 30 while the hand truck is being used, and the fan and the power strip and storage compartment/tray are attached thereto.

The electrically powered fan can be rotatably supported in the frame of the hand truck and can be vertically oriented and moveable to blow air either forward or rearward from the hand truck.

A power strip having a plurality of electrical outlets can be plugged into an outlet.

The power strip can provide power to both the rotatable light source and the fan. The power strip can also be used as a power source for electrical tools, such as but not limited to drills, saws, and the like.

The storage compartments/trays can be used to store tools and parts, such as but not limited to screws, nails, and the like and tool slots can be used for power tools, hammers, screw drivers, and the like.

The power strip and/or the storage compartment can be removed when not being used or needed.

The USB ports in the storage compartment/trays can be used for providing power to smart phones, and the like. The storage compartment can further store smart phones.

The hand truck can include an additional embodiment with a second set of wheels so that the hand truck can be oriented in a horizontal position.

In the horizontal position, the upper handles can be removed and re-attached in a vertical upright position so that the fan can be used while the hand truck in oriented in a horizontal orientation.

Additional improvements can include a removable and rechargeable storage battery in the storage compartment, that can be recharged by the power cords. The storage battery can be used to further provide power to small devices, such as smart phones, and the like.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A hand truck comprising:
a frame with vertical members consisting of two parallel vertical support posts, the frame having an upper end and a lower end, and a mid-portion between the upper end and the lower end;
a handrail extending rearwardly from the upper end of the frame;
a light attached to the upper end of the frame between the two parallel support posts, the light having forward facing LEDs (light emitting diodes);
a moveable mechanism for solely allowing the forward facing LEDs (light emitting diodes) to rotate upward and downward;
wheels consisting of a pair of wheels solely attached to the lower end of the support posts of the frame;
a lift plate attached to the lower end of the frame for supporting loads thereon;
an upright fan attached to the frame adjacent to the mid-portion of the frame for directing air forward of the hand truck;
pivot members on each side of the fan attached to the two parallel vertical support posts, for allowing the fan to tilt upward and tilt downward;
an open top tray with storage compartments attached to the two parallel vertical support posts above the upright fan; and
an elongated power strip having ends attached to the two parallel vertical support posts adjacent to and below the upright fan, the power strip having a plurality of plug-in outlets, and having a cord that allows the power strip to be plugged into an electrical outlet, the power strip for providing power to the fan.

2. The hand truck of claim 1, wherein the power strip includes:
at least one USB port.

3. The hand truck of claim 1, wherein the power strip further includes:
a battery power supply.

4. The hand truck of claim 1, further comprising:
a left guard member on a left side of the lift plate; and
a right guard member on a right side of the lift plate.

5. The hand truck of claim 1, further comprising:
a pivotal guard rail attached to the lower end of the frame having a raised vertical position, and a lowered position over the lift plate.

6. A hand truck comprising:
a frame of parallel bar members, consisting of two parallel vertical support posts, the frame having an upper end and a lower end, and a mid-portion between the upper end and the lower end;
a handrail extending rearwardly from the upper end of the frame;
wheels consisting of a pair of wheels attached to the lower end of the two parallel vertical support posts of the frame;
a lift plate attached to the lower end of the frame for supporting loads thereon;
an upright fan attached to the frame adjacent to the mid-portion of the frame, for directing air forward to the hand truck;
pivot members on each side of the fan attached to the two parallel vertical support posts, for allowing the fan to be tilted upward and tilted downward;
a light attached to the upper end of the frame between the two parallel support posts, the light having forward facing LEDs (light emitting diodes) for projecting in a forward direction from the hand truck; and
a rotate light mechanism for solely allowing the light to rotate upward to direct the light upward, and for allowing the light to rotate downward to direct the light downward;
an open tray with storage compartments attached to the two parallel vertical support posts above the upright fan; and
an elongated power strip having ends attached to the two parallel vertical support posts adjacent to and below the upright fan, the power strip having a plurality of plug-in outlets, and having a cord that allows the power strip to be plugged into an electrical outlet, the power strip for providing power to the fan.

7. The hand truck of claim 6, further comprising:
a battery power supply.

8. The hand truck of claim 6, further comprising:
a left guard member on a left side of the lift plate; and
a right guard member on a right side of the lift plate.

9. The hand truck of claim 6, further comprising:
a pivotal guard rail attached to the lower end of the frame having a raised vertical position, and a lowered position over the lift plate.

10. A hand truck comprising:
a frame of parallel bar members, consisting of two parallel vertical support posts having an upper end and a lower end, and a mid-portion between the upper and the lower end;
a handrail extending rearwardly from the upper end of the frame;
wheels consisting of a pair of wheels attached to the lower end of the two vertical support posts of the frame;
a lift plate attached to the lower end of the frame for supporting loads thereon;
an upright fan attached to the frame adjacent to the mid-portion of the frame for directing air forward to the hand truck;
pivot members on each side of the fan attached to the two parallel vertical support posts, allowing the fan to be tilted upward and tilted downward;
a light attached to the upper end of the frame, the light having forward facing LEDs (light emitting diodes) for projecting in a forward direction from the hand truck; and
a rotate light mechanism for solely allowing the light to rotate upward to direct the light upward, and for allowing the light to rotate downward to direct the light downward;
an open top tray with storage compartments attached to the two parallel vertical support posts above the upright fan; and
an elongated power strip having ends attached to the two parallel vertical support posts, adjacent to and below the upright fan, the strip having a plurality of plug-in outlets, and a cord that allows the power strip to be plugged into an electrical outlet, the power strip for providing power to the fan, the power strip includes:
at least one USB port and a battery power supply.

11. The hand truck of claim 10, further comprising:
a left guard member on a left side of the lift plate; and
a right guard member on a right side of the lift plate.

12. The hand truck of claim 10, further comprising:
a pivotal guard rail attached to the lower end of the frame having a raised vertical position, and a lowered position over the lift plate.

\* \* \* \* \*